US008515456B2

(12) United States Patent
Yoon

(10) Patent No.: US 8,515,456 B2
(45) Date of Patent: Aug. 20, 2013

(54) COMMUNICATION DEVICE AND METHOD OF PROVIDING LOCATION INFORMATION THEREIN

(75) Inventor: Mu Hy Yoon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 12/141,642

(22) Filed: Jun. 18, 2008

(65) Prior Publication Data

US 2009/0098882 A1 Apr. 16, 2009

(30) Foreign Application Priority Data

Oct. 15, 2007 (KR) ........................ 10-2007-0103564

(51) Int. Cl.
*H04W 24/00* (2009.01)
(52) U.S. Cl.
USPC .................... 455/456.3; 455/457; 455/414.3; 340/992; 340/993
(58) Field of Classification Search
None
See application file for complete search history.

(56) References Cited

U.S. PATENT DOCUMENTS

| 6,175,740 | B1 * | 1/2001 | Souissi et al. ............... 455/456.3 |
| 6,920,319 | B2 * | 7/2005 | Knutsson et al. ........... 455/422.1 |
| 2005/0054352 | A1 | 3/2005 | Karaizman |
| 2006/0055525 | A1 * | 3/2006 | Kubota et al. ................. 340/461 |
| 2006/0199612 | A1 * | 9/2006 | Beyer et al. ................. 455/556.2 |
| 2006/0270421 | A1 * | 11/2006 | Phillips et al. ................ 455/457 |
| 2007/0232342 | A1 | 10/2007 | Larocca |
| 2009/0005018 | A1 * | 1/2009 | Forstall et al. ............. 455/414.1 |
| 2009/0005975 | A1 * | 1/2009 | Forstall et al. ................ 701/209 |
| 2010/0304727 | A1 * | 12/2010 | Agrawal et al. ............ 455/414.3 |

FOREIGN PATENT DOCUMENTS

| EP | 1484686 A1 | 12/2004 |
| EP | 2 051 489 A2 | 4/2009 |
| WO | WO 03/008992 A2 | 1/2003 |

* cited by examiner

*Primary Examiner* — Marcos Batista
*Assistant Examiner* — Keith Fang
(74) *Attorney, Agent, or Firm* — Birch, Stewart, Kolasch & Birch, LLP

(57) ABSTRACT

A communication device, computer program product and method of providing location information therein are disclosed. The communication device includes a wireless communication unit for receiving location information on another communication device and a controller for setting location based information on another communication device using the received location information, and controlling the set location based information to be displayed.

28 Claims, 99 Drawing Sheets

Location Information Providing Service

Input selection condition of registration request terminal.

A station exit #7

Location Information Providing Service

Input selection condition of registration request terminal.

1. Kang Namgil ☑
2. Kim Gijun ☐
3. Kim Giyoung ☑
4. Kim Youngsoo ☐
5. Kim Chulsoo ☑

OK (a)

→

Location Information Providing Service

Input selection condition of registration request terminal.

Family
1. Dad ☑
2. Mom ☑
3. Sister ☐

OK (b)

FIG. 18A
FIG. 18B
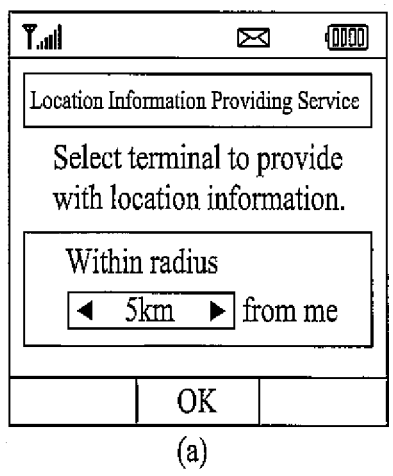
(a)
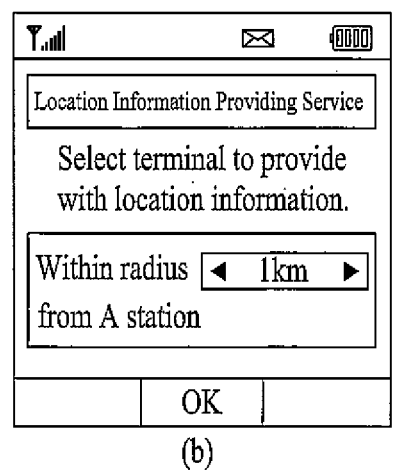
(b)

FIG. 18C
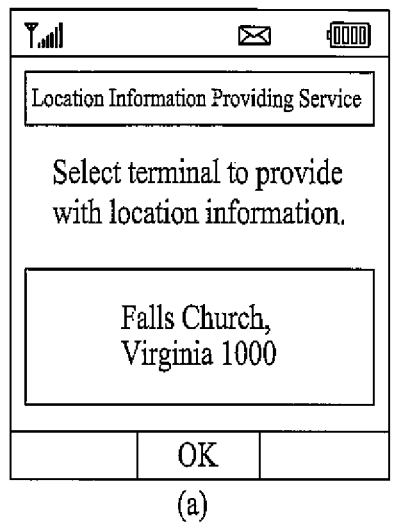
(a)
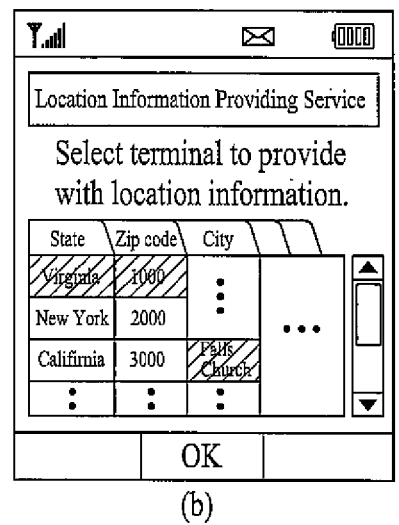
(b)
FIG. 18D
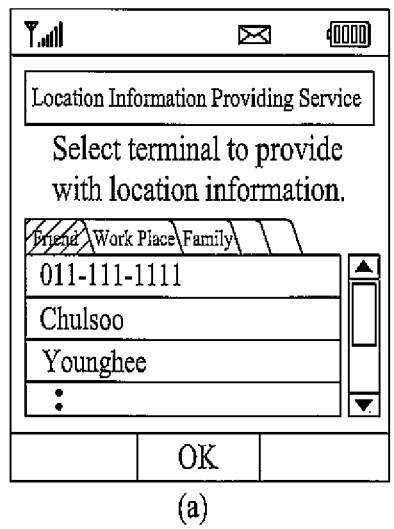
(a)
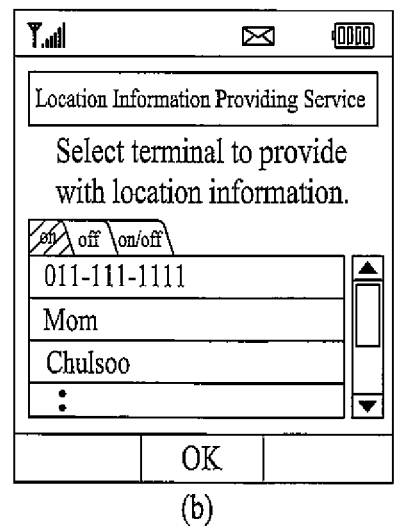
(b)

FIG. 20B
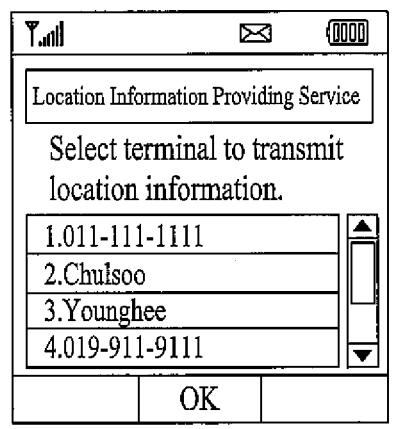
FIG. 20C
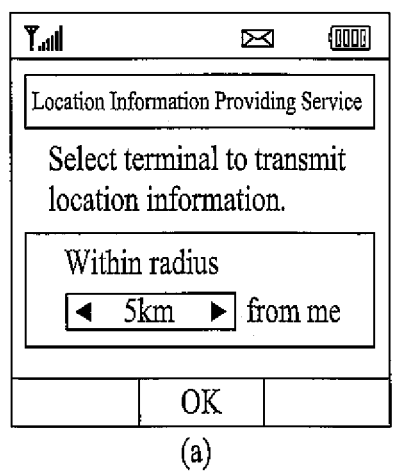
(a)
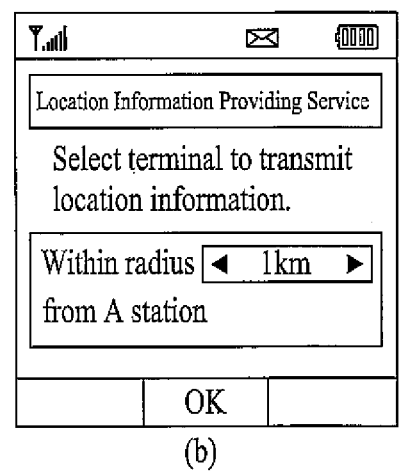
(b)

(a)  (b)

(a)            (b)

FIG. 29A
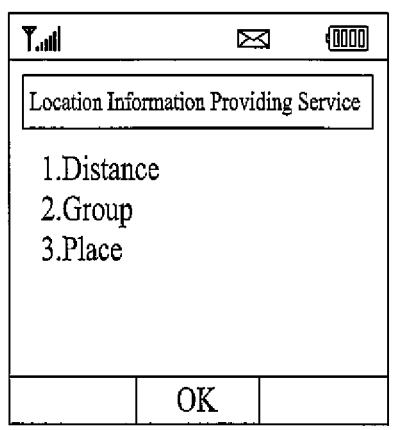
FIG. 29B
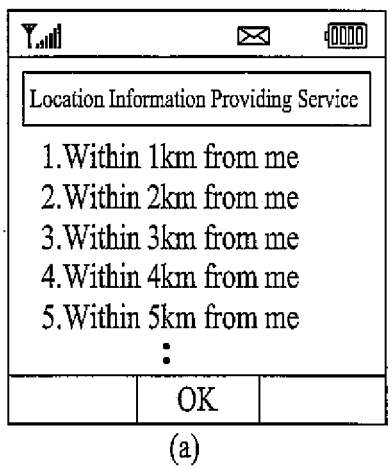
(a)
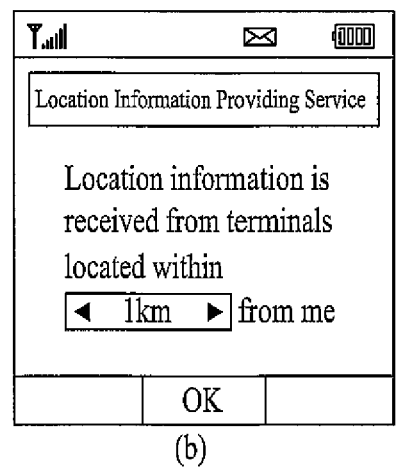
(b)

FIG. 29C
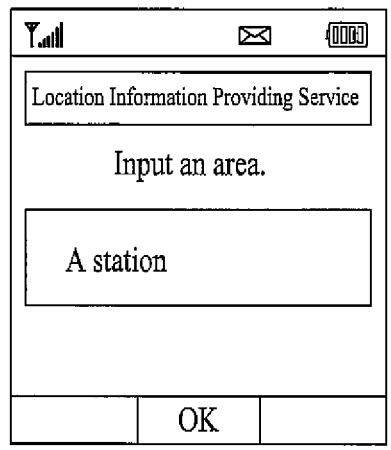
(a)
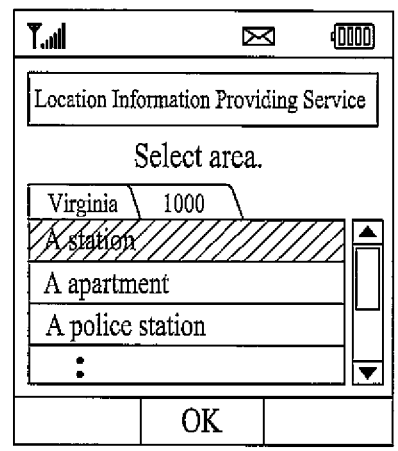
(b)
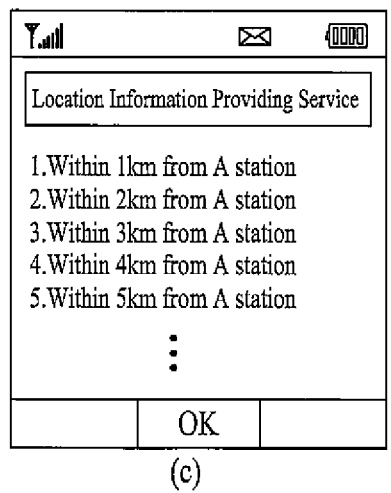
(c)
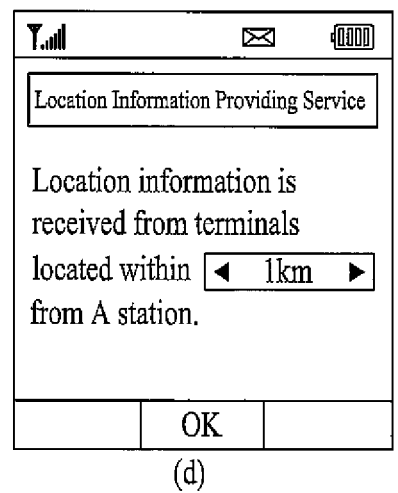
(d)

FIG. 29D (a)
Location Information Providing Service
Select a specific terminal.
011-111-1111
Chulsoo
Younghee
..
OK (b)
Location Information Providing Service
1. Within 1km from Chulsoo
2. Within 2km from Chulsoo
3. Within 3km from Chulsoo
4. Within 4km from Chulsoo
5. Within 5km from Chulsoo
..
OK (d)
Location Information Providing Service
Location information is received from terminals located within [1km ▲▼] from Chulsoo.
OK

FIG. 33D
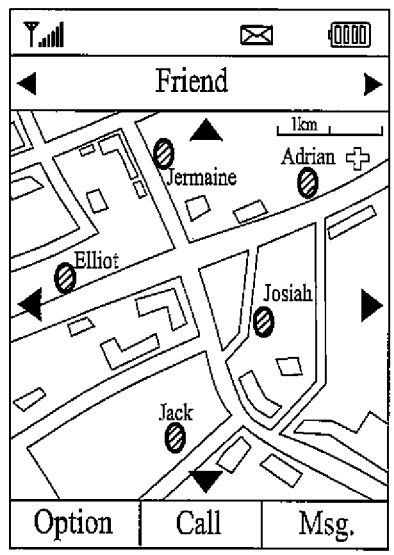
(a)
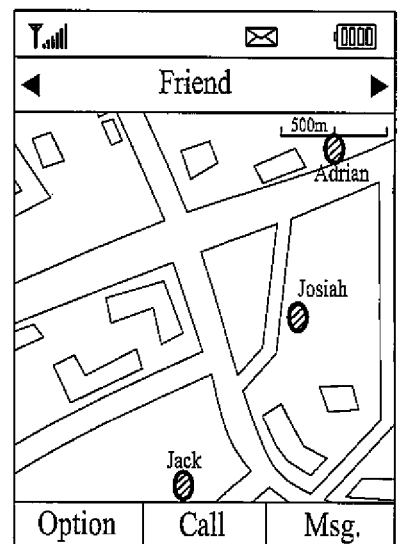
(b)
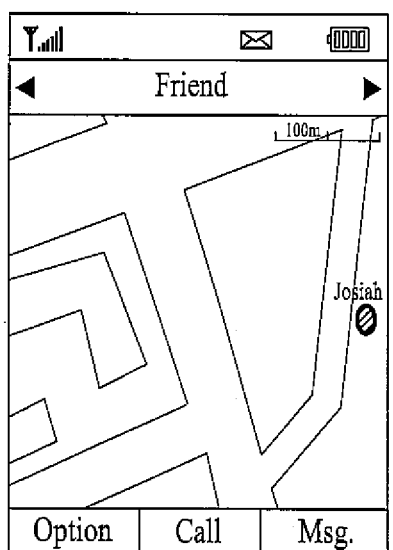
(c)

FIG. 37
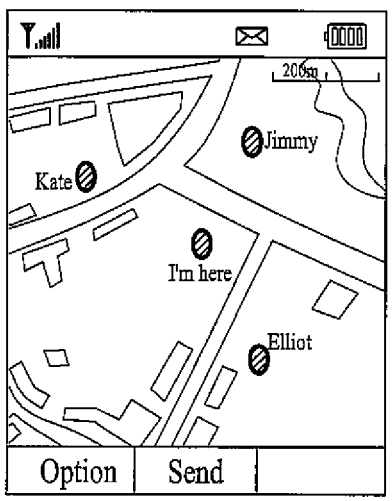
(a)
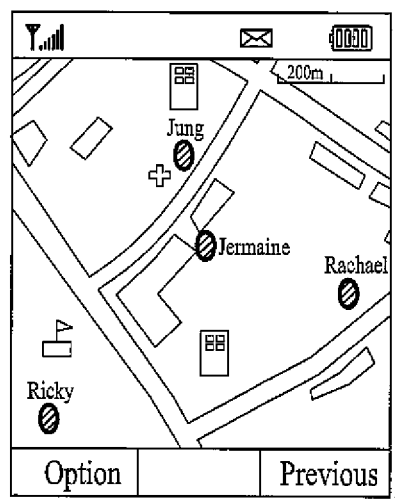
(b)
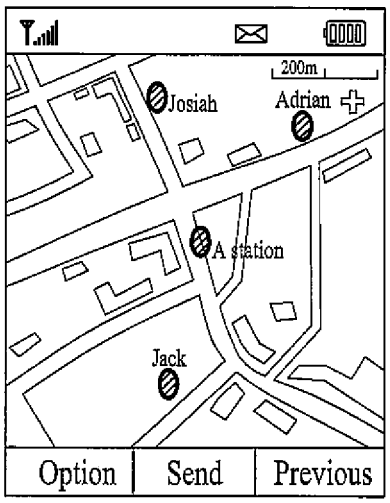
(c)

FIG. 38
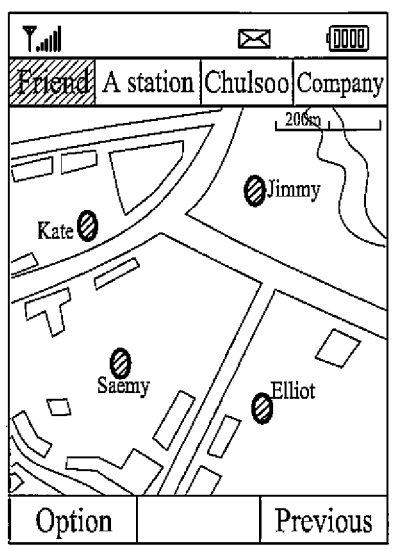
(a)
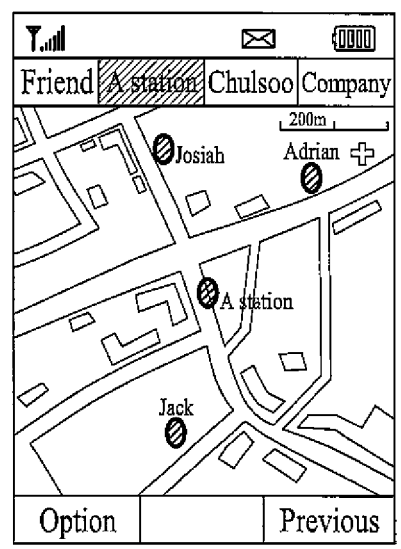
(b)
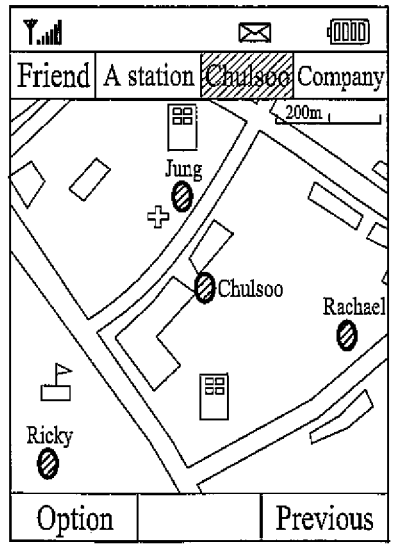
(c)

FIG. 39
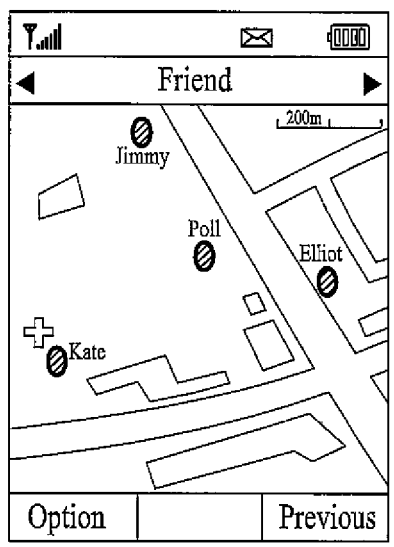
(a)
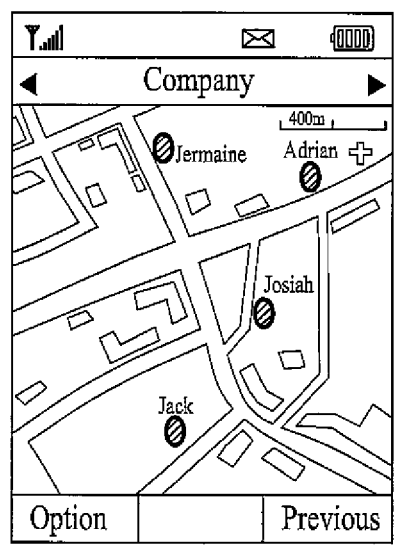
(b)

FIG. 47
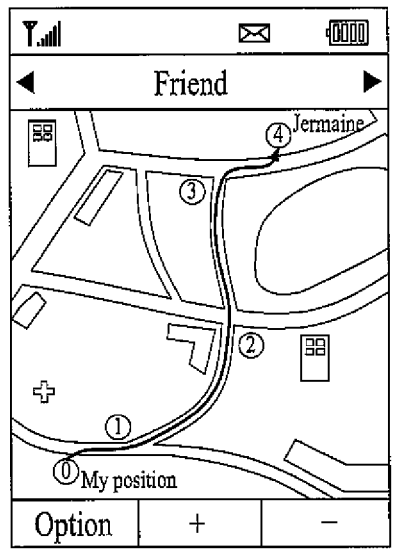
(a)
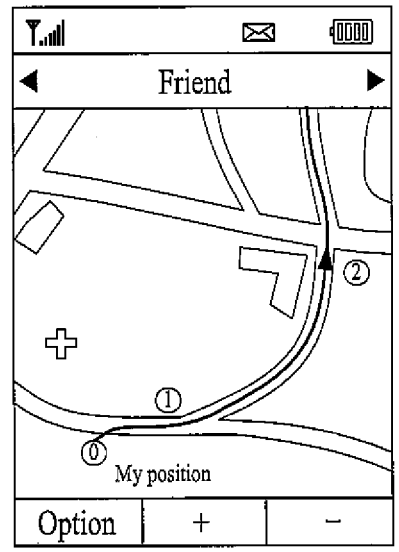
(b)
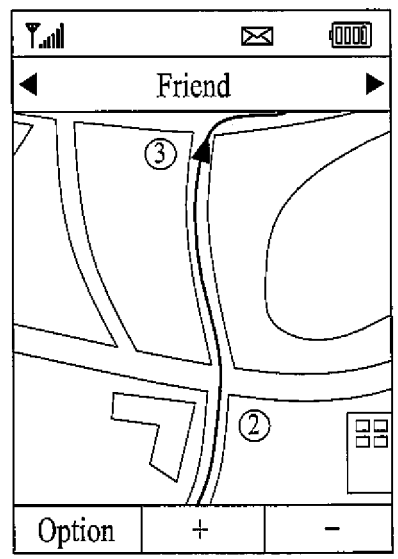
(c)
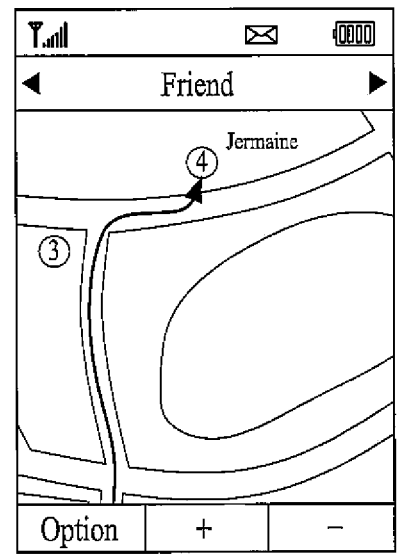
(d)

FIG. 48
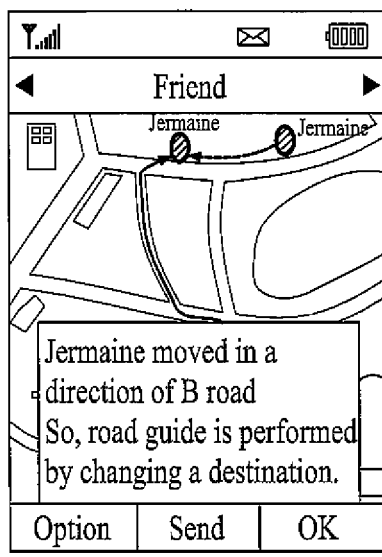
(a)
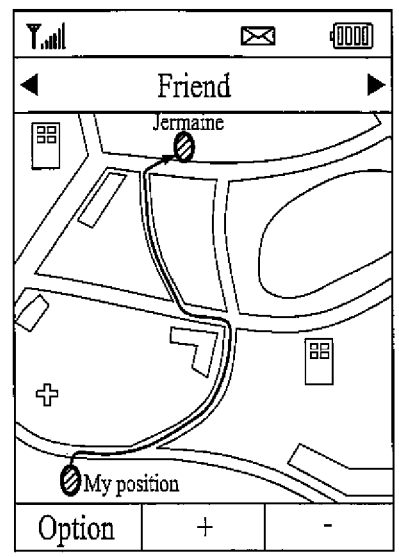
(b)
FIG. 49
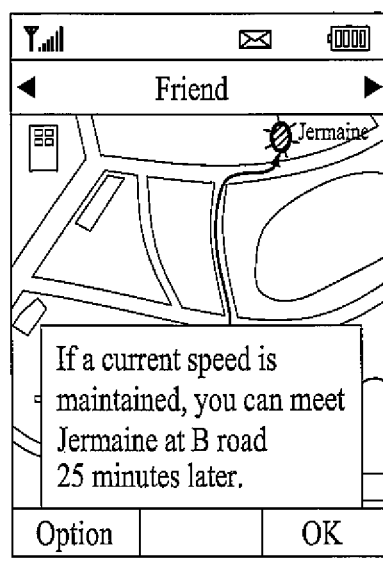
(a)
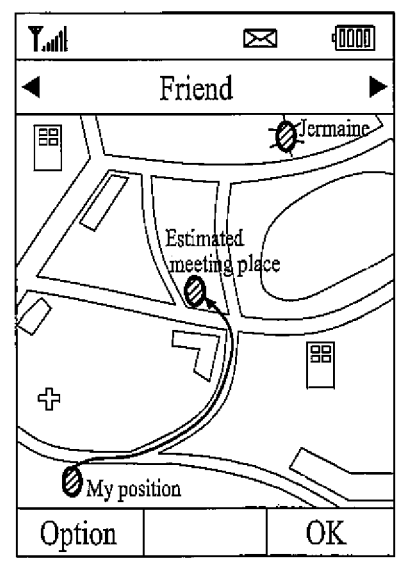
(b)

FIG. 50
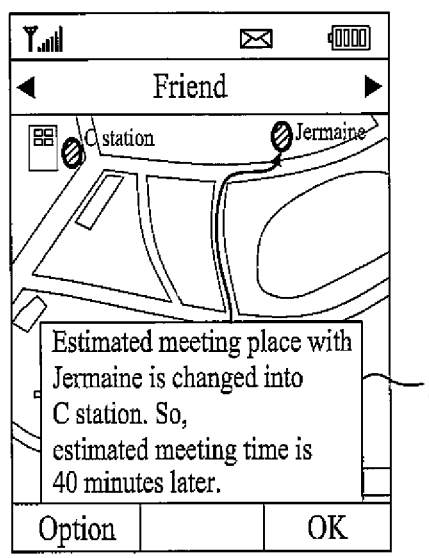
(a)
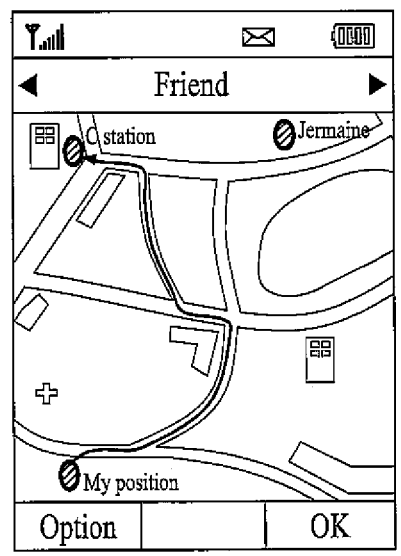
(b)

FIG. 57
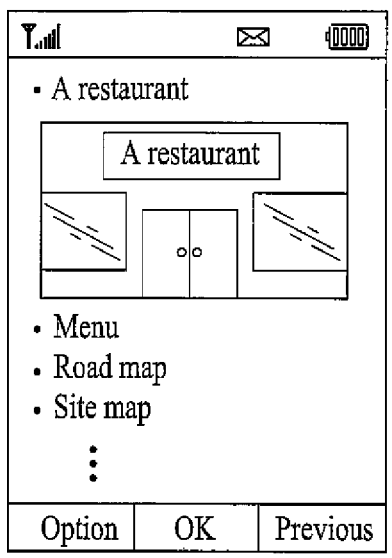
FIG. 58
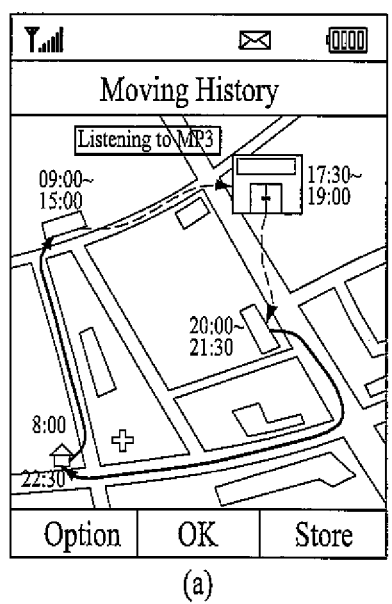 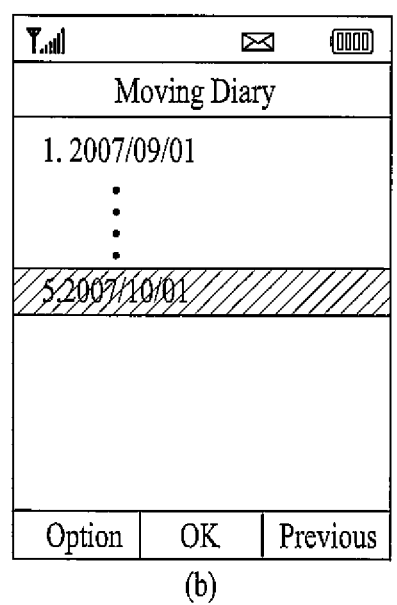
(a)             (b)

FIG. 65
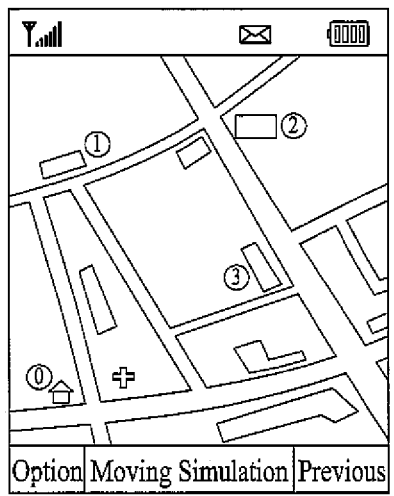
(a)
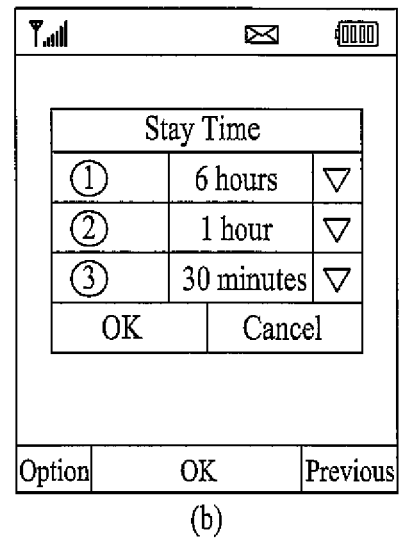
(b)
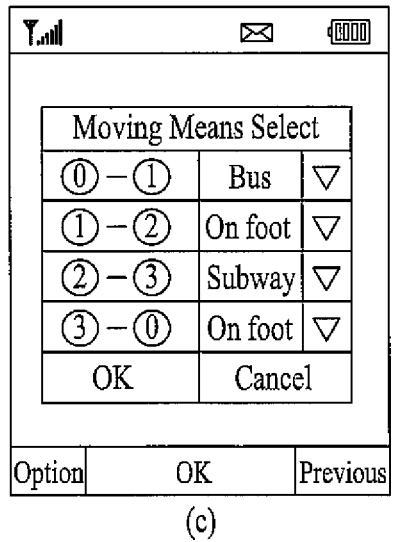
(c)
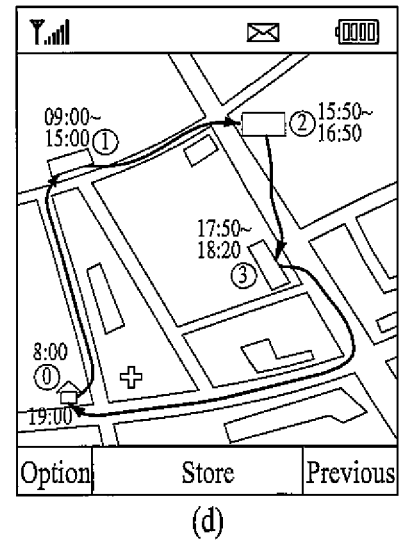
(d)

FIG. 74
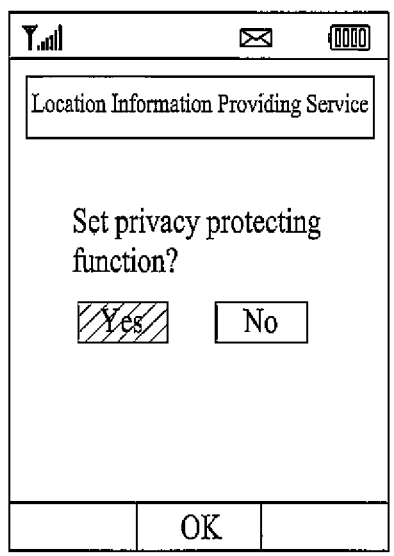
(a)
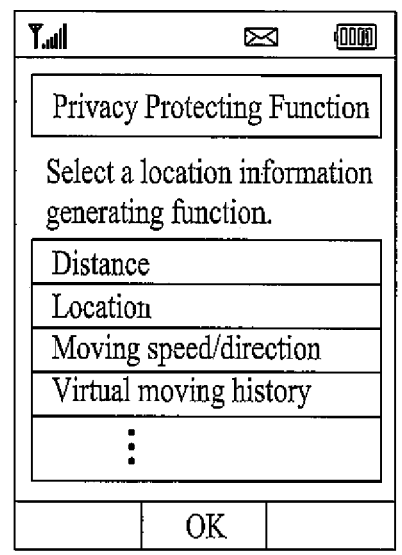
(b)

FIG. 75C
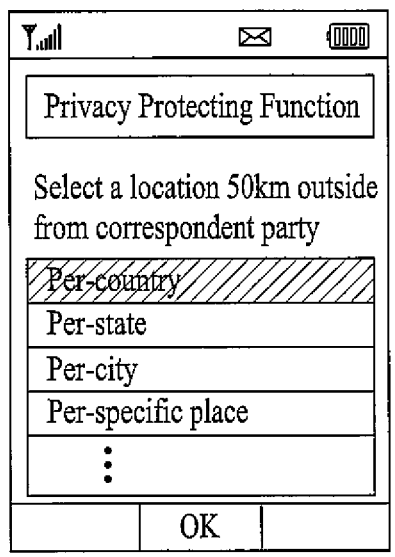
(a)
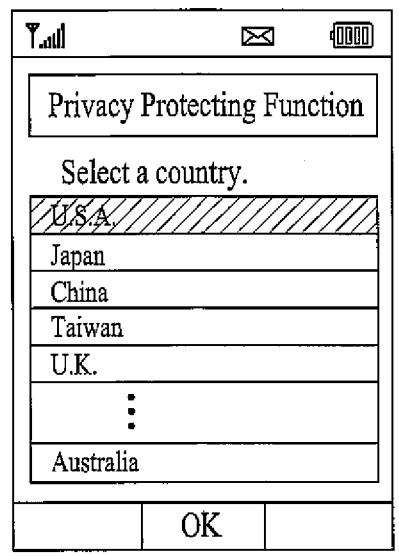
(b)
FIG. 75D
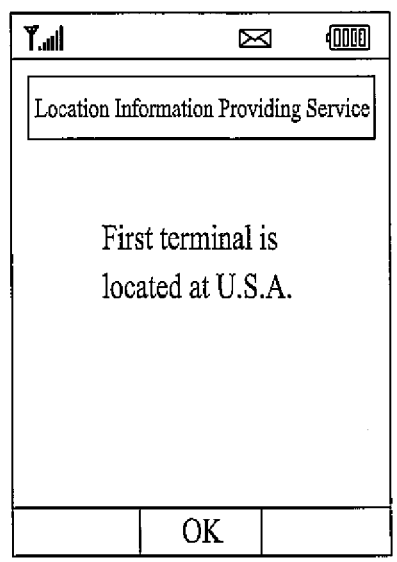

FIG. 80
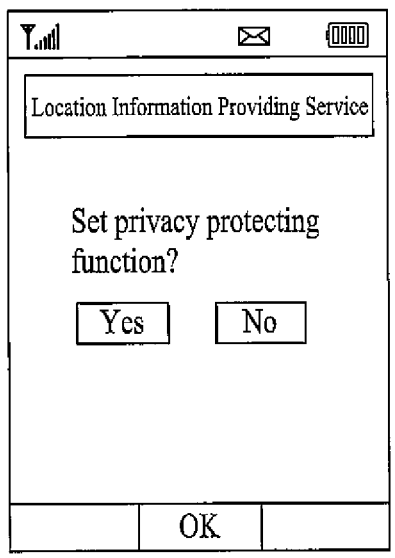
(a)
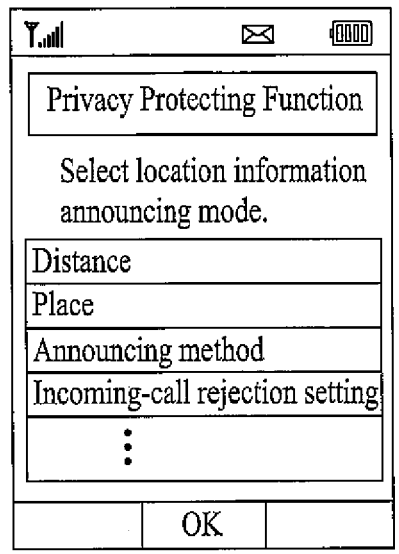
(b)
FIG. 81A
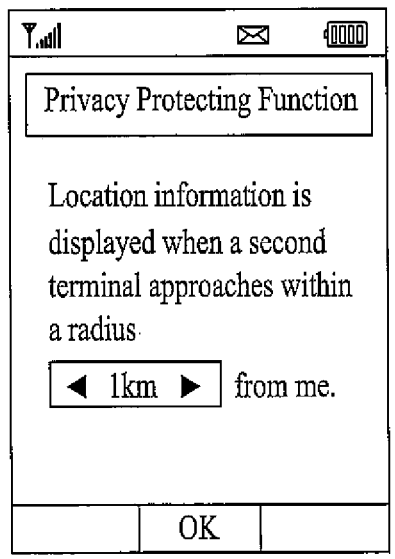

FIG. 81D

COMMUNICATION DEVICE AND METHOD OF PROVIDING LOCATION INFORMATION THEREIN

CROSS REFERENCE TO RELATED APPLICATIONS

This application claims the benefit of the Korean Patent Application No. 10-2007-0103564, filed on Oct. 15, 2007, which is hereby incorporated by reference as if fully set forth herein.

BACKGROUND OF THE INVENTION

1. Field of the Invention

The present invention relates to a communication device, and more particularly, to a communication device and method of providing location information therein. Although the present invention is suitable for a wide scope of applications, it is particularly suitable for generating a moving history using location information.

2. Discussion of the Related Art

A communication device is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, communication devices have been configured to receive broadcast and multicast signals which permit viewing of content such as videos and television programs.

Efforts are ongoing to support and increase the functionality of communication devices. Such efforts include software and hardware improvements, as well as changes and improvements in the structural components which form the communication device.

Moreover, many efforts are ongoing to research and develop a method for providing a service similar to an intercommunication device instant messaging service in association with a location based service.

SUMMARY OF THE INVENTION

Accordingly, the present invention is directed to an apparatus, computer program product and method thereof that substantially obviate one or more problems due to limitations and disadvantages of the related art.

An object of the present invention is to provide a variety of services based on a location of communication device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication device according to the present invention includes a wireless communication unit for receiving location information on another communication device and a controller for setting location based information on another communication device using the received location information, and controlling the set location based information to be displayed.

In another aspect of the present invention, a method of providing location information in a communication device includes receiving location information on another communication device, setting location based information on another communication device using the received location information and displaying the set location based information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 13A to 13D are state diagram of a screen on which a process for registering a mobile terminal of one embodiment of the present invention with a location information providing service according to a second embodiment of the present invention is shown;

FIGS. 18A to 18D are state diagrams of a screen on which a process for selecting a location information receiving terminal in a mobile terminal according to one embodiment of the present invention is shown;

FIGS. 20A to 20F are state diagrams of a screen on which a process for selecting a location information transmitting terminal in a mobile terminal according to one embodiment of the present invention is shown;

FIGS. 29A to 29G are state diagrams of a screen on which a process for selecting a location information providing terminal in a mobile terminal according to one embodiment of the present invention is shown;

FIGS. 33A to 33D are state diagrams of a screen on which a location information displaying process is displayed in accordance with a map mode;

FIGS. 37 to 45 are state diagrams to explain a function performing a function in a mobile terminal according to one embodiment of the present invention;

FIGS. 47 to 52 are state diagrams to explain a flowchart for a road guiding method of a mobile terminal according to one embodiment of the present invention;

FIGS. 55 to 63 are state diagrams to explain a method of generating a moving history of a mobile terminal according to one embodiment of the present invention;

FIGS. 65 to 69 are state diagram to explain a method of generating a moving history of a mobile terminal according to one embodiment of the present invention;

FIG. 74 is a diagram of a screen on which a process for setting of a privacy protecting function in a mobile terminal according to one embodiment of the present invention is displayed;

FIGS. 75A to 75D are diagrams of a screen for displaying a case that a distance is selected from a condition list in a mobile terminal according to one embodiment of the present invention;

FIG. 80 is a diagram of a screen in accordance with setting of a privacy protecting function and an announcing mode in a mobile terminal according to one embodiment of the present invention;

FIGS. 81A to 81D are diagrams of a screen for displaying a process for setting a condition restricted per an announcing mode in a mobile terminal according to one embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

First of all, a communication device according to one embodiment of the present invention can include a mobile type or a fixed type in accordance with a presence or non-presence of its mobility. The following description is made on the assumption that a communication device includes a mobile terminal for example. And, it is to be understood that various implementations of the present invention are not limited to the mobile terminal.

Figure 1:
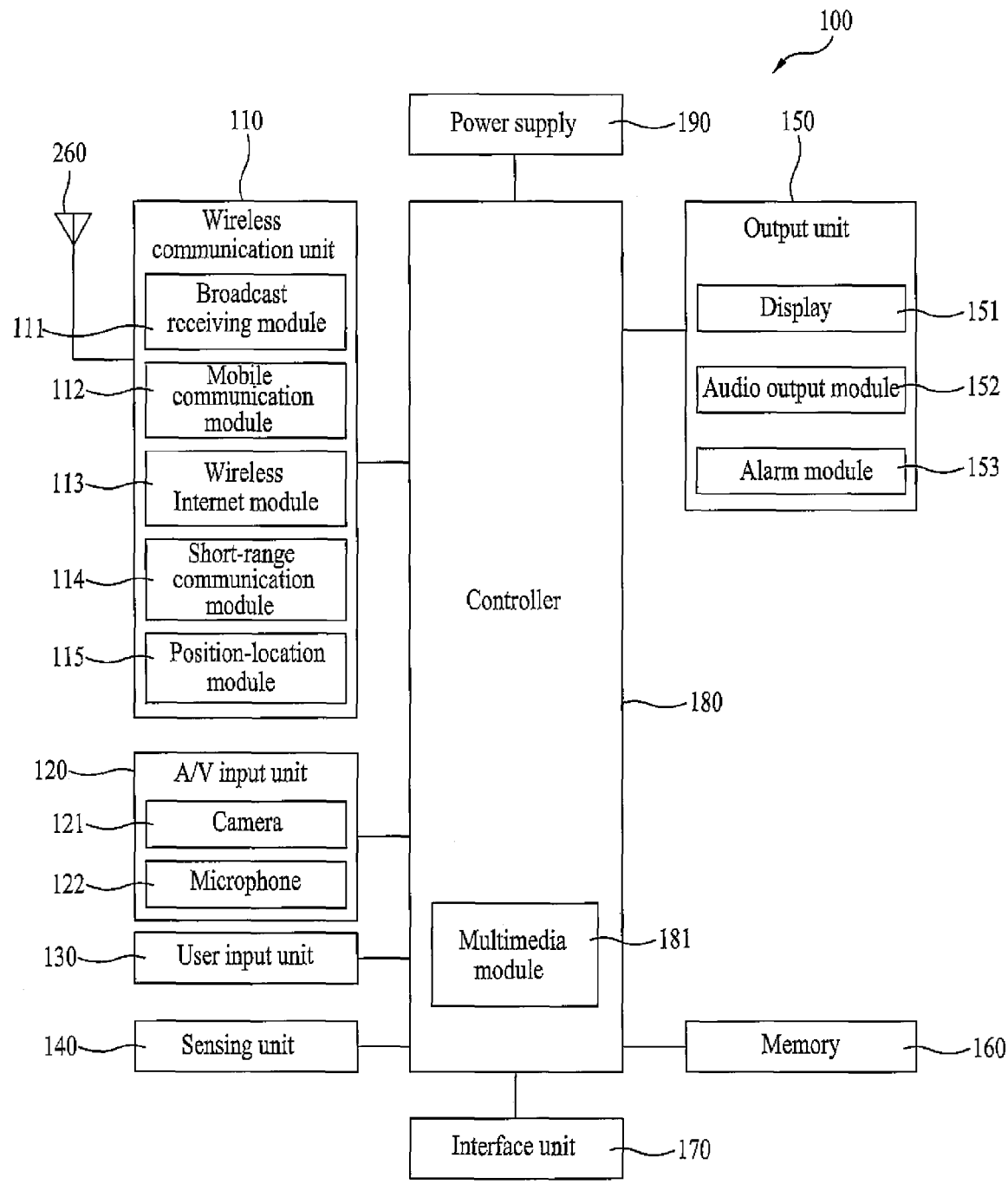
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
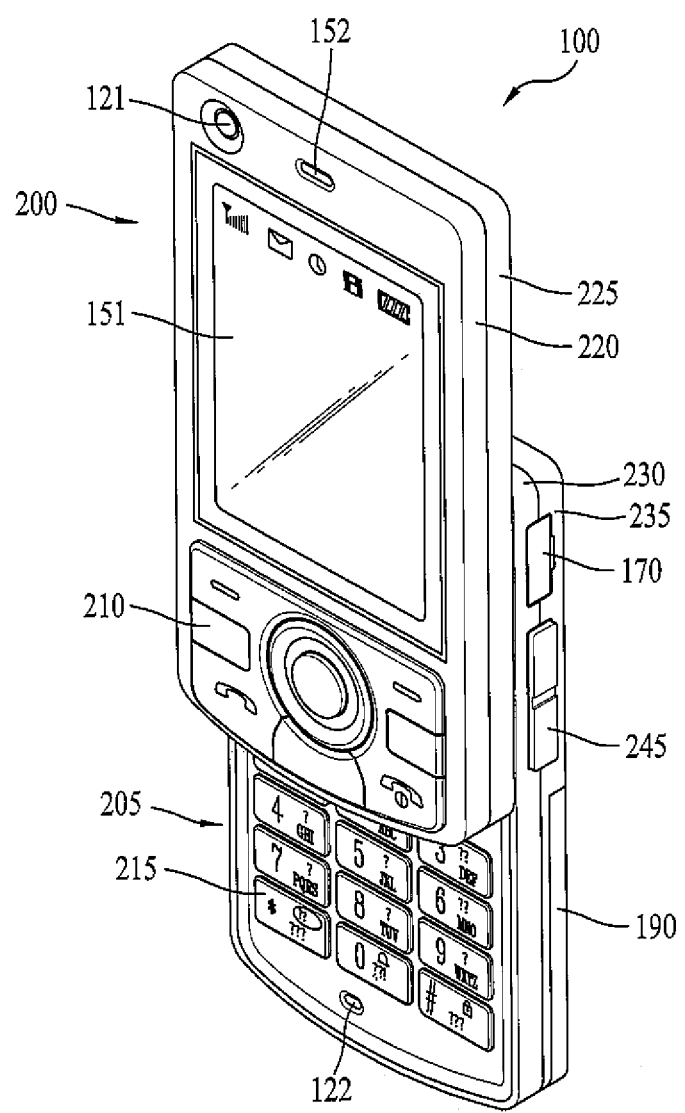
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
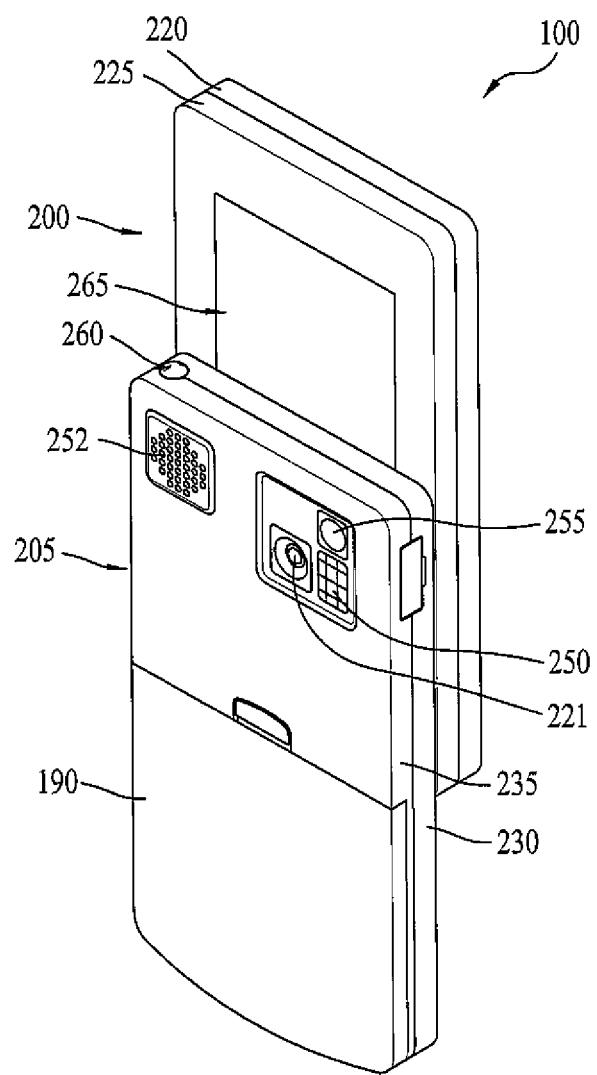
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
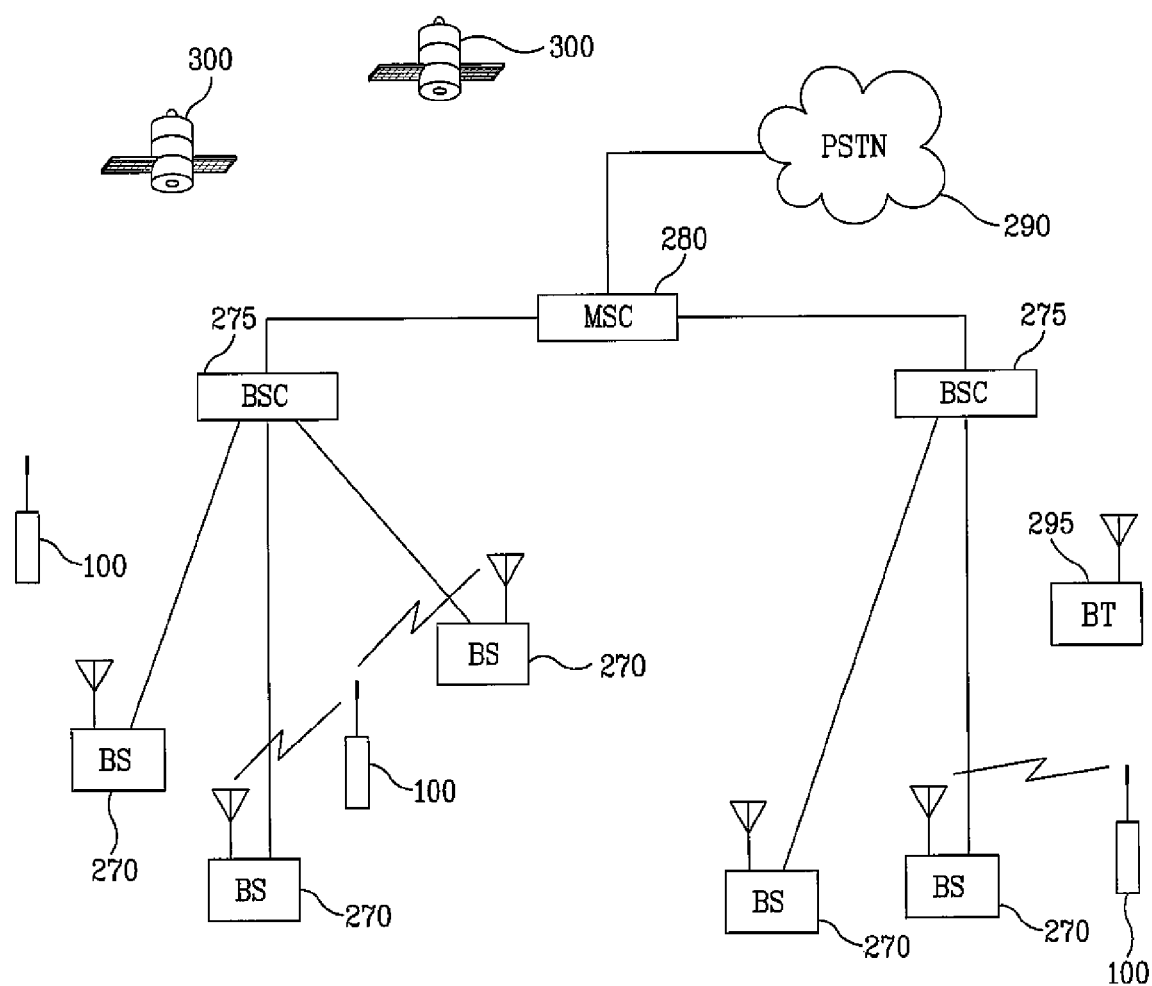
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

A mobile terminal according to one embodiment of the present invention is capable of performing a road guiding function. And, its example is shown in FIG. 5.

Figure 5:
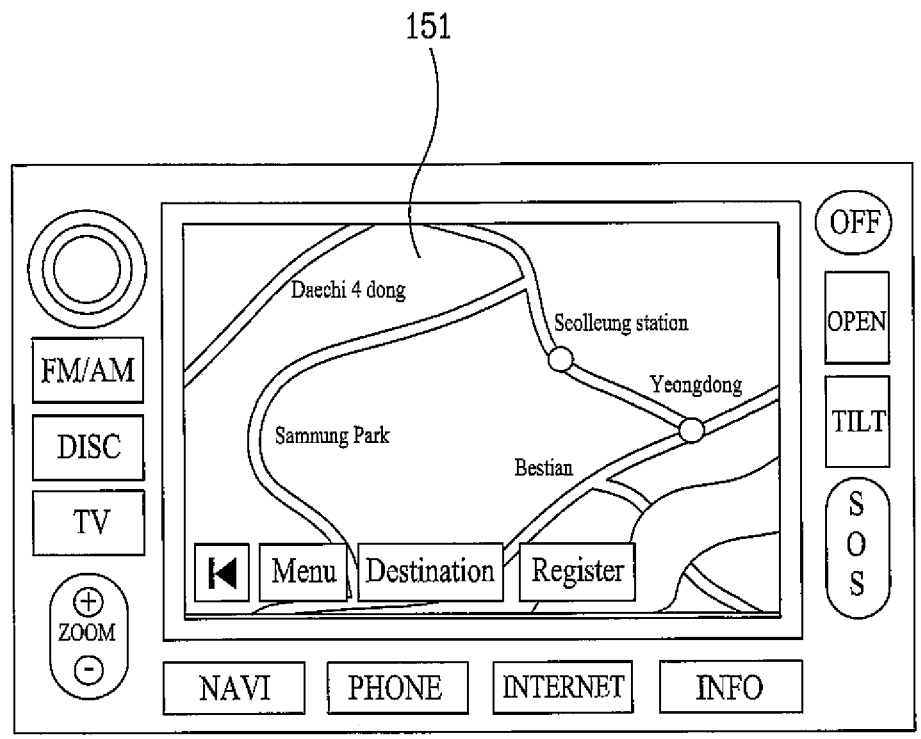
FIG. 5 and FIG. 6 are state diagrams for examples that a mobile terminal is performing a road guiding function.
Figure 6:
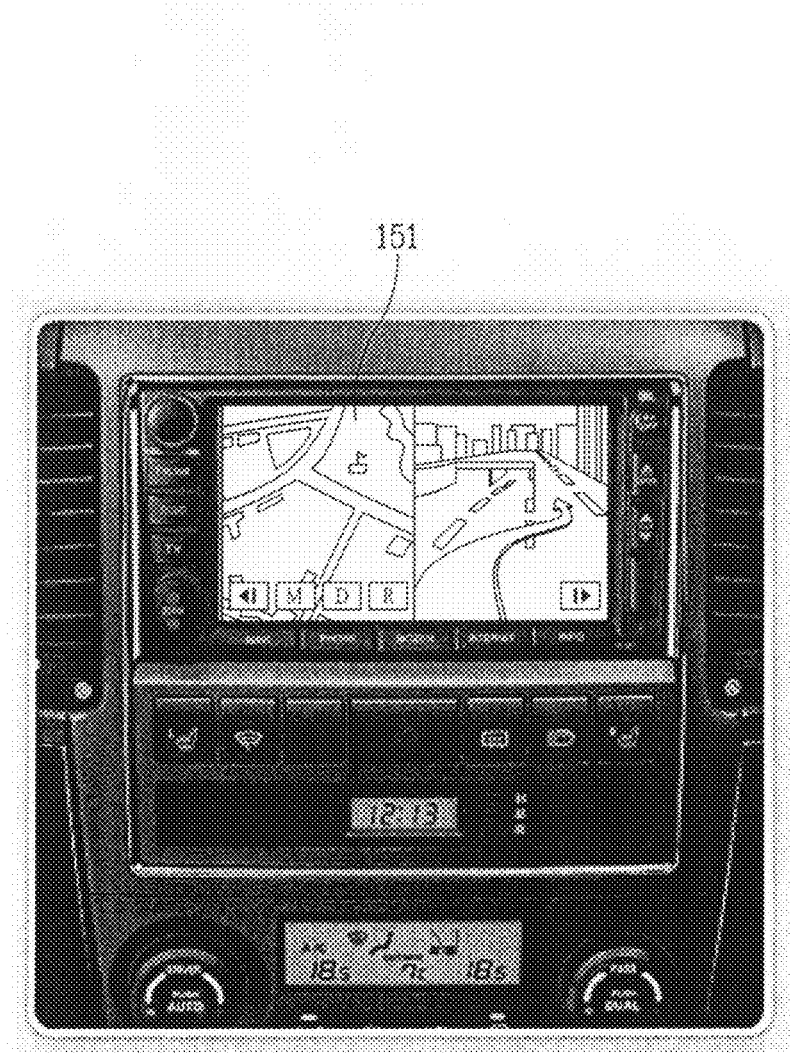

FIG. 5 and FIG. 6 are state diagrams for examples that a mobile terminal is performing a road guiding function.

Referring to FIG. 5, a map having a current location displayed thereon is displayed on the display module 151. In this case, a user is facilitated to find a destination using the displayed map.

And, a mobile terminal capable of performing a road guiding function can be implemented into a navigation system provided to a vehicle. This example is shown in FIG. 6.

According to one embodiment of the present invention, a mobile terminal is able to provide a user with various services associated with location information using its location information or location information on a specific terminal. In this case, it is able to obtain the location information from locations of base stations of a network to which the terminal belongs or location relevant data received from a satellite.

And, it is a matter of course that the vehicle navigation system shown in FIG. 5 or FIG. 6 can be detachably attached to a vehicle. Moreover, the mobile phone type mobile terminal 100 shown in FIG. 2 or FIG. 3 can be detachably attached to a vehicle as well to fully perform functions of the vehicle navigation system.

According to one embodiment of the present invention, a mobile terminal is able to provide a user with various services associated with location information using its location information or location information on a specific terminal. In this case, it is able to obtain the location information from locations of base stations of a network to which the terminal belongs or location relevant data received from a satellite.

In the following description, various services provided in association with the location information are generally named 'location information providing service'. For clarity and convenience of explanation, a mobile terminal will be divided into a first terminal and a second terminal. Of course, a mobile terminal can include at least two terminals including a first terminal and a second terminal.

Operations of a system for implementing a location information providing service according to the present invention are explained with reference to FIG. 7 as follows.

Figure 7:
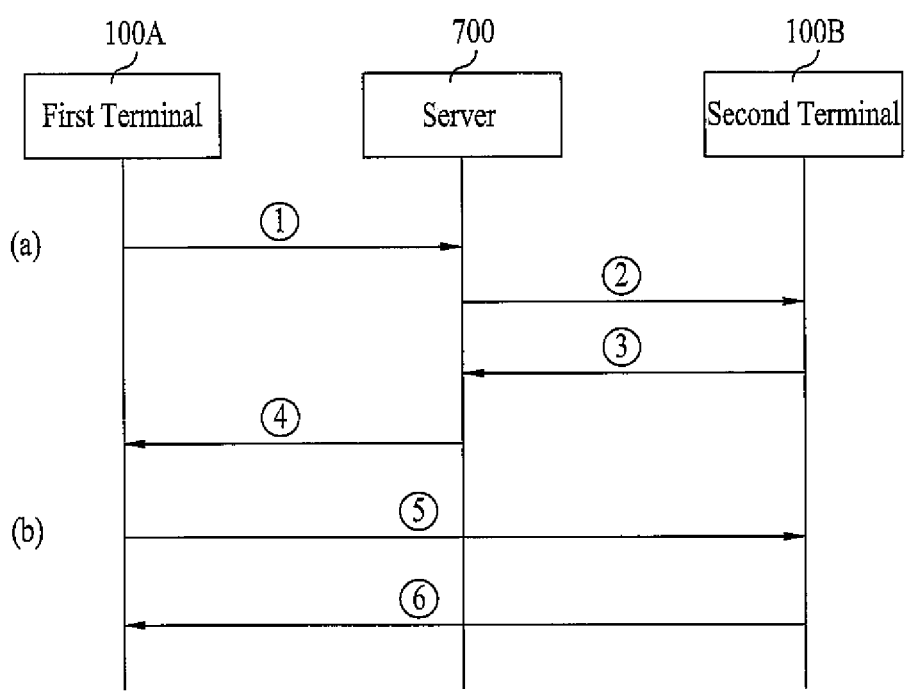
FIG. 7 is a structural diagram of a system for implementing a location information providing service according to one embodiment of the present invention.

FIG. 7 is a structural diagram of a system for implementing a location information providing service according to one embodiment of the present invention.

Referring to FIG. 7, a first terminal 100A and a second terminal 100B are able to: (a) indirectly transmit and receive various kinds of information including location information via a server 700; or (b) directly transmit and receive various kinds of information including location information without using the server 700.

According to (a), in implementing a location information providing service, the first or second terminal 100A or 100B is able to use information, which is received from the server 700, on a correspondent terminal. According to (b), in implementing a location information providing service, the first or second terminal 100A or 100B is able to use information which is directly received from the correspondent terminal.

The second terminal 100B is able to generate information based on location on the first terminal 100A using location information (e.g., coordinate information) received from the first terminal 100A. And, the second terminal 100B is able to receive the information based on location generated by the first terminal 100A from the first terminal 100A or the server 700 as well.

In particular, second terminal 100B is able to register the first and second terminals 100A and 100B with the location information providing service to transmit and receive mutual location information using the location information providing service. And, second terminal 100B is able to designate and register the first and second terminals 100A and 100B as terminals for transmitting and receiving mutual location information via the location information providing service.

Various embodiments of a method of providing location information in a mobile terminal according to the present invention are explained as follows.

First of all, location base information in the following description can include various kinds of information, which is generated using location information including coordinate information and the like, associated with a terminal location.

In particular, the information based on location can include at least one selected from the group consisting of administrative (e.g., postal) address information, POI (point of interest) information, setup name information and relative location information. And, it is also understood that the location base information can include the location information, which includes the coordinated information and the like, itself.

The administrative (e.g., postal) address information can hierarchically include a broad-classification area (e.g., country), a first middle-classification area (e.g., state, county, metropolitan area), a second middle-classification area (e.g., city, county, etc.), a first narrow-classification area (neighborhood), a second narrow-classification area (street number, building name), and the like. For instance, the administrative (e.g., postal) address information can be selectively generated from a group ranging from the broad-classification area to the narrow-classification area. In this case, location information (particularly, coordinate information) per the administrative (e.g., postal) address information is beforehand stored in the memory 160 or can be received from outside via the wireless communication unit 110.

The POI information may means a name or special item information, which is set for a specific place. For instance, the POI information can include such a name as 'xx mart', 'xx restaurant', 'xx department store' and the like or such special item information as 'local Korean restaurant', 'Recommended date place', 'Weekend visit place' and the like. In this case, location information (particularly, coordinate information) per the POI information is beforehand stored in the memory 160 or can be received from outside via the wireless communication unit 110.

The setup name information may mean a name or special item information set up for a specific place by a user. For instance, the setup name information can include 'yesterday meeting place', 'first data place', 'restaurant for good taste', 'company', 'house', 'school' and the like. In this case, location information (particularly, coordinate information) per the setup name information is beforehand stored in the memory 160 or can be received from outside via the wireless communication unit 110.

The relative location information may mean information based on such a moving pattern between one point to another point as a moving distance, a moving time, a moving speed, a moving direction and the like or information based on such a relative location with reference to a specific point (e.g., a location of a specific mobile terminal) as a distance, a moving speed, a moving direction and the like. In this case, location information (particularly, coordinate information) on a specific mobile terminal is beforehand stored in the memory 160 or can be received from outside via the wireless communication unit 110.

And, resolution, which will be explained later, may mean a level in accordance with a detailed extent of information based on location that is provided in case that a mobile terminal provides its information based on location to a correspondent terminal. The resolution may mean a level in accordance with a detailed extent of information based on location that will be displayed in displaying information based on location of another terminal. The first terminal is able to set the resolution for each of a plurality of different terminals or in common to at least one different terminal corresponding to a specific condition (e.g., a same group, a predetermined radius range, etc.)

Thus, in FIG. 7, line 1 represents to transmit information including location information from the first terminal 100A to the server 700, line 2 represents to transmit information including location information from the server 700 to the second terminal 100B, line 3 represents to transmit information including location information from the second terminal 100B to the server 700, line 4 represents to transmit information including location information from the server 700 to the first terminal 100A, line 5 represents to transmit information including location information from the first terminal 100A to the second terminal 100B, and line 6 represents to transmit information including location information from the second terminal 100B to the first terminal 100A.

First Embodiment

In the following description, a method of hierarchically generating information based on location in accordance with resolution and a method of providing information based on location according to one embodiment of the present invention are explained with reference to the accompanying drawings. For clarity and convenience of explanation, it is assumed that a mobile terminal described in the following description selectively includes the elements shown in FIG. 1.

First of all, a method of hierarchically generating information based on location in accordance with resolution is explained in detail with reference to FIGS. 8 to 9F. In the following description, a mobile terminal for generating/providing information based on location is named 'first terminal' and a different mobile terminal provided with information based on location is named 'second terminal'.

Figure 8:
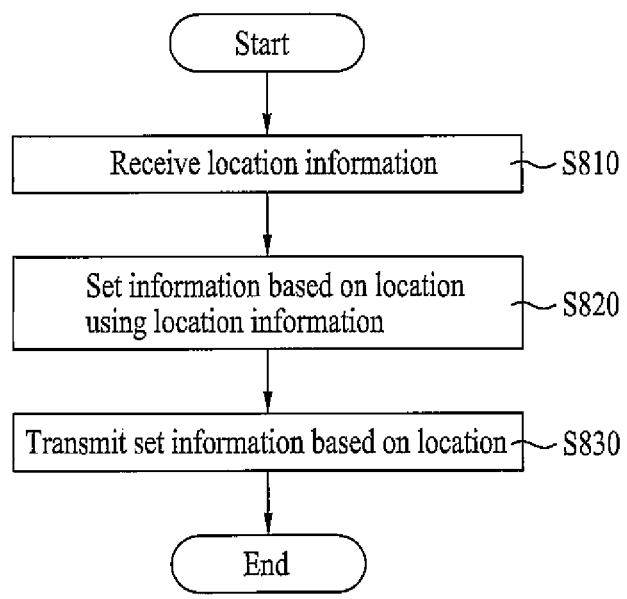
FIG. 8 is a flowchart of a process for generating information based on location according to one embodiment of the present invention.

FIG. 8 is a flowchart of a process for generating and providing information based on location in a first terminal.

Referring to FIG. 8, a first terminal receives location information via the wireless communication unit 110 [S810].

In the receiving step S810, the first terminal is able to receive location information by at least one selected from the group consisting of a broadcasting system, a mobile communication system, a data communication system, a short-range communication system, a GPS and the like.

For instance, the first terminal is able to use the broadcast receiving module 111 in case of the broadcasting system, the mobile communication module 112 in case of the mobile communication system, the wireless internet module 113 in case of the data communication system, the short-range communication module 114 in case of the short-range communication system or the position-location module 115 in case of the GPS.

In this case, the location information is the information that indicates a location of the first terminal and may include coordinate information represented as longitude, latitude, altitude, speed, time and the like.

Moreover, the receiving step S810 may be periodically executed. The receiving step S180 may be executed in case that the location information is updated. The receiving step S810 may be executed in case that a location information providing server or the first terminal makes a request.

Besides, the controller 180 is able to receive a location information reception announcing signal from the wireless communication unit 110 in case of a location information reception. The controller 180 is able to periodically or always monitor a location information reception by the wireless communication unit 110. So, the controller 180 is able to detect that location information is received by the wireless communication unit 110.

Furthermore, the location information received in the receiving step S810 can be stored in the memory 160.

The first terminal sets information based on location using the location information received in the receiving step S810 [S820]. In this case, the first terminal is able to store reference information necessary for generation of information based on location in the memory 160 beforehand or receive the reference information from outside via the wireless communication unit 110. And, an operation of setting the information based on location can be performed by the controller 180 or by the position-location module 115 in accordance with a control signal of the controller 180.

For instance, the first terminal obtains the coordinate information received in the receiving step S810 and then searches coordinate information per the administrative (e.g., postal) address information, the POI information, the setup name information or the relative location information as the reference information necessary for the generation of information based on location for coordinate information matching the obtained coordinate information. The first terminal is able to set the information based on location to the administrative (e.g., postal) address information, POI information, setup name information or relative location information corresponding to the coordinate information matching the obtained coordinate information.

In the setting step S820, the first terminal is able to hierarchically set the information based on location to correspond to the resolution set for the second terminal. It is understood that there may exist a plurality of second terminal. In this case, the set resolution and the set information based on location can be stored in the memory 160. Meanwhile, if a resolution level is set to a highest value for the second terminal, the first terminal is able to set the information based on location to the coordinate information itself.

In the following description, the resolution setting by the first terminal is explained in detail.

First of all, a condition for the resolution setting can be selected by a user or can be randomly selected by the first terminal. For convenience and clarity of explanation, it is assumed that the resolution can be set to a level ranging from a first level to a tenth level. And, it is also assumed that the information based on location gets more detailed toward the tenth level from the first level. Alternatively, it is able to set the information based on location to get more detailed toward the first level from the tenth level. And, the resolution level can be modified by a user's manipulation or can be frequently modified in accordance with a location of the second terminal.

The first terminal is able to set the resolution for the second terminal in accordance with a location association of the second terminal with itself.

For instance, the first terminal is able to set the resolution to a higher level if the location association of the second terminal with the first terminal increases (e.g., the classification of the matched administrative area gets smaller). In particular, if 'country and state' matches rather than 'country' only, it can be said that the location association is higher. It is understood that the resolution can be set to a higher level if the location association decreases to the contrary.

The resolution setting in accordance with the location association with reference to the administrative (e.g., postal) address information can be explained in more detail with reference to FIGS. 9A to 9F. For clarity and convenience of explanation, it is assumed that the resolution is set to a higher level if the location association becomes higher.

FIGS. 9A to 9F are diagrams of a screen for setting resolution in accordance with location correlation according to one embodiment of the present invention.

Figure 9A:
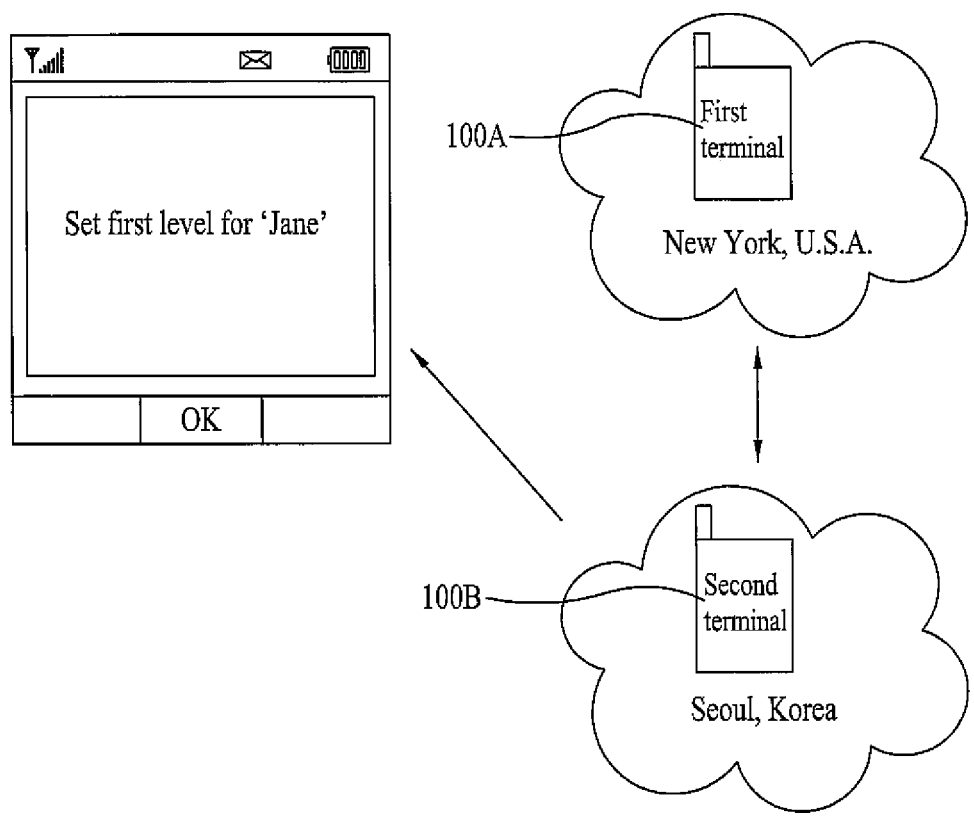
FIGS. 9A to 9F are diagrams of a screen for setting resolution in accordance with location correlation according to one embodiment of the present invention.

Referring to FIG. 9A, if the second terminal 100B is located in a country different from a country where the first terminal 100A is located, the first terminal 100A is able to set a first level having a lowest detail extent of the provided information based on location.

Figure 9B:
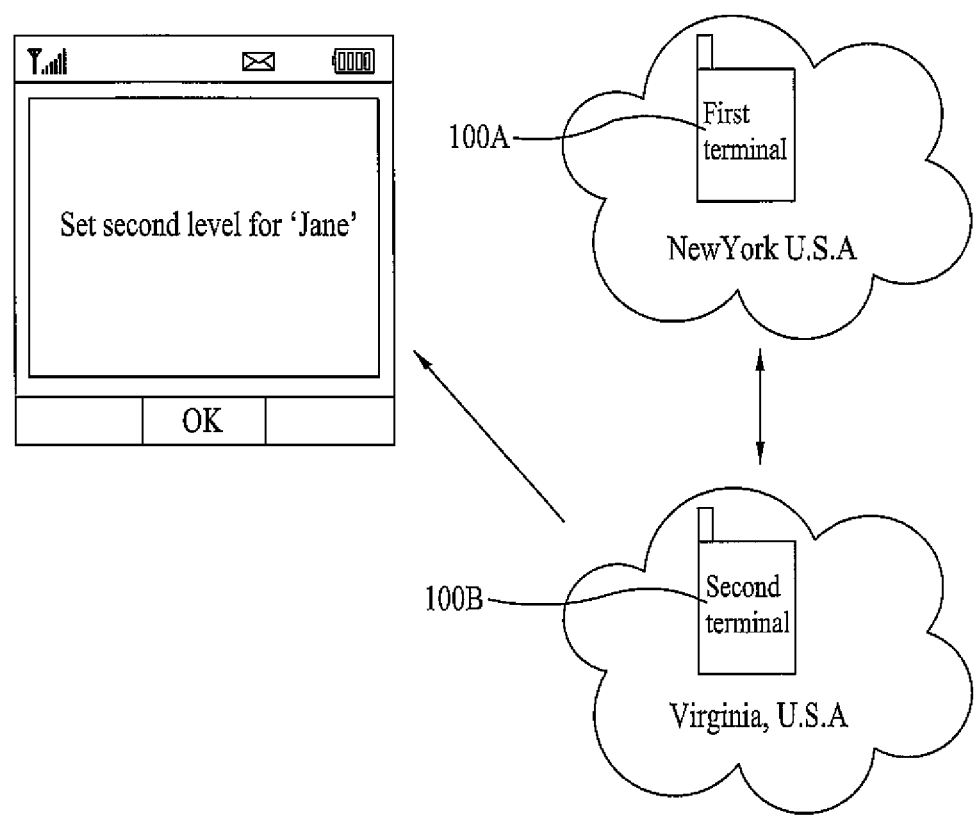

Referring to FIG. 9B, if the second terminal 100B is located at 'state' 'county' or 'metropolitan area' different from that of the first terminal 100A in the same country of the first terminal 100A, the first terminal 100A is able to set a second level having a second lowest detail extent of the provided information based on location.

Figure 9C:
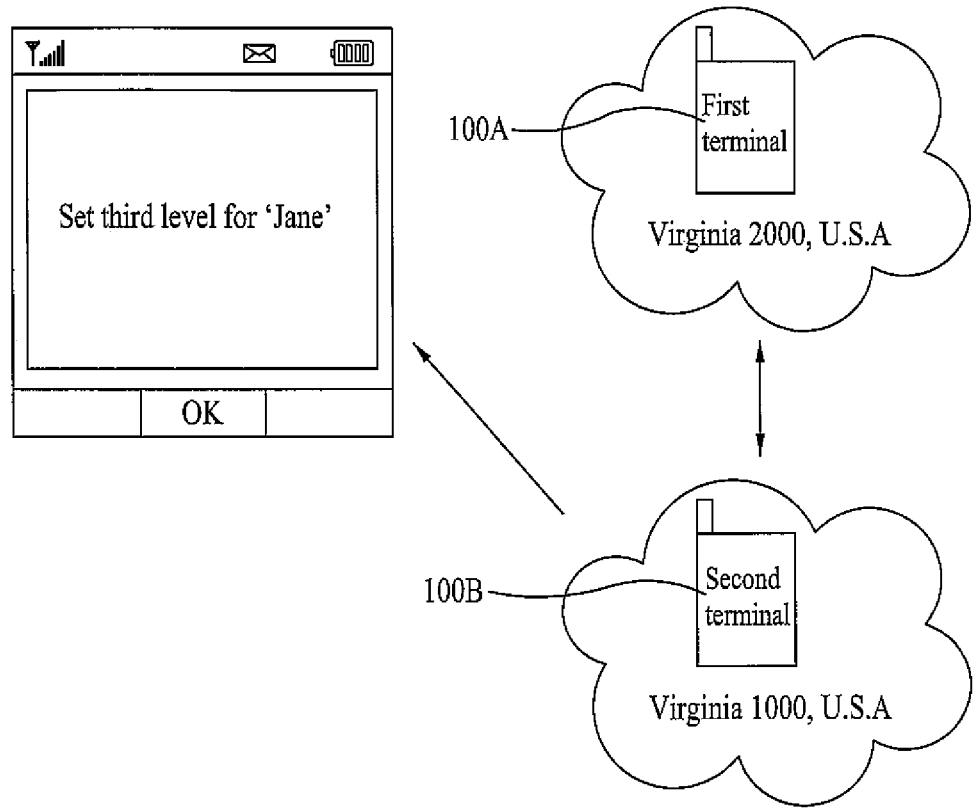

Referring to FIG. 9C, if the second terminal 100B is located at a region (i.e., zip code) different from that of the first terminal 100A in the same country/state of the first terminal 100A, the first terminal 100A is able to set a third level having a third lowest detail extent of the provided information based on location.

Figure 9D:
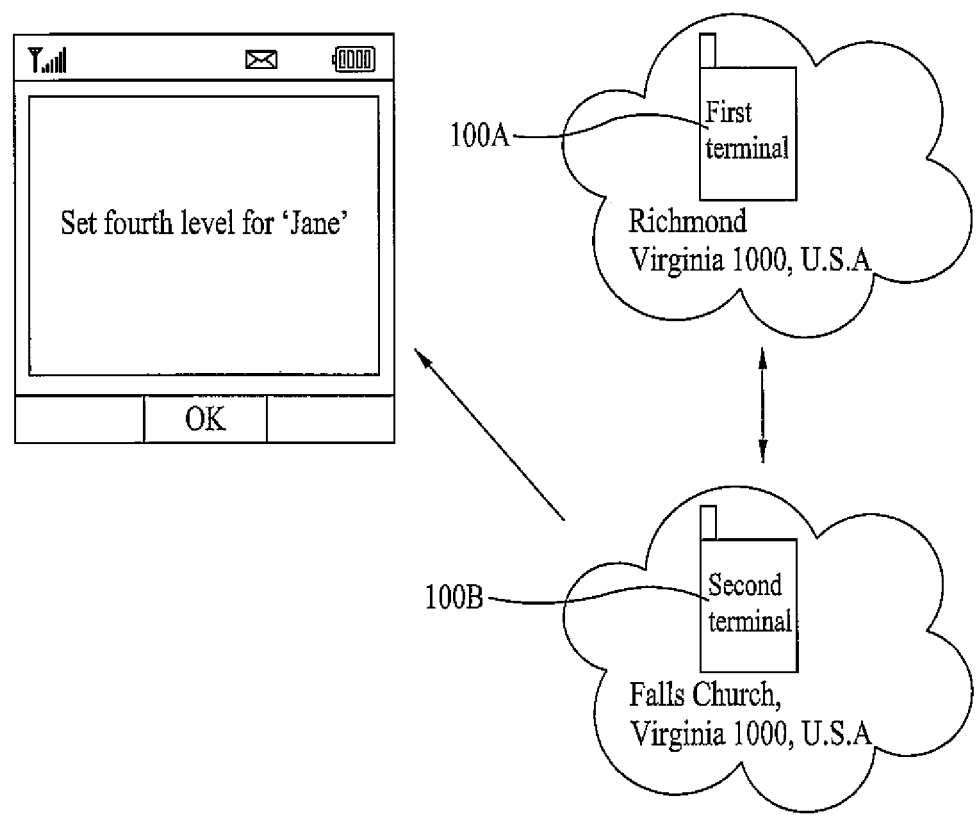

Referring to FIG. 9D, if the second terminal 100B is located at a city different from that of the first terminal 100A in the same country/state/zip code of the first terminal 100A, the first terminal 100A is able to set a fourth level having a fourth lowest detail extent of the provided information based on location.

Figure 9E:
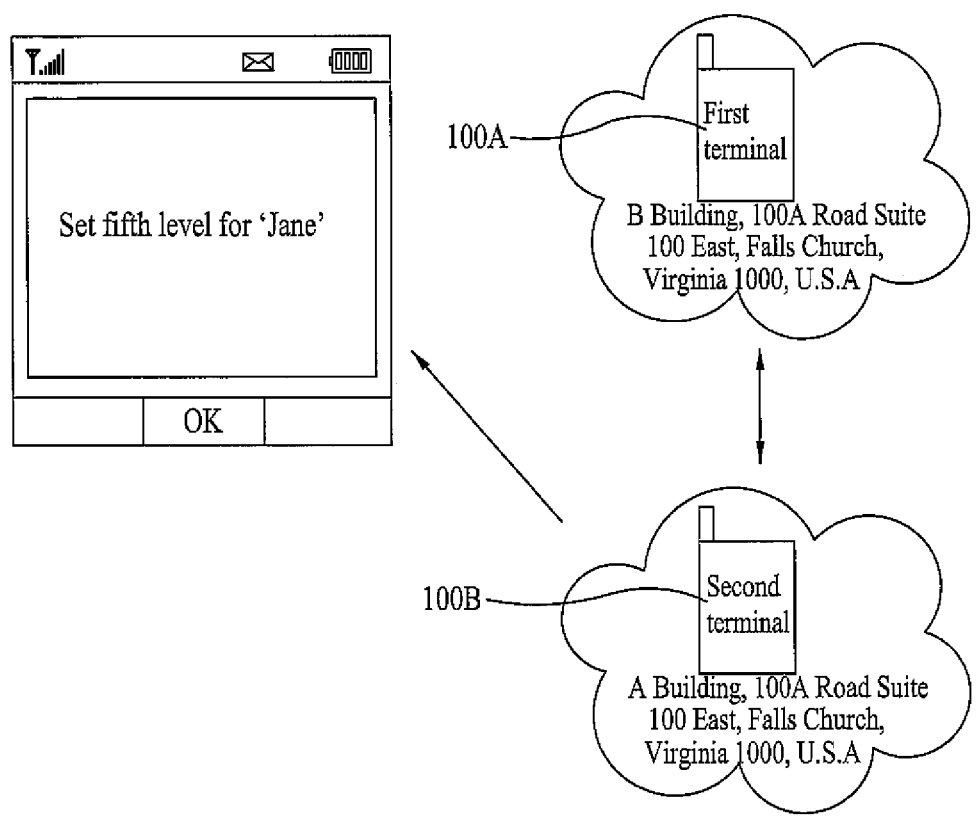

Referring to FIG. 9E, if the second terminal 100B has detailed address information (e.g., building name) different from that of the first terminal 100A in the same country/state/city/region (i.e., zip code) of the first terminal 100A, the first terminal 100A is able to set a fifth level having a fifth lowest detail extent of the provided information based on location.

Figure 9F:
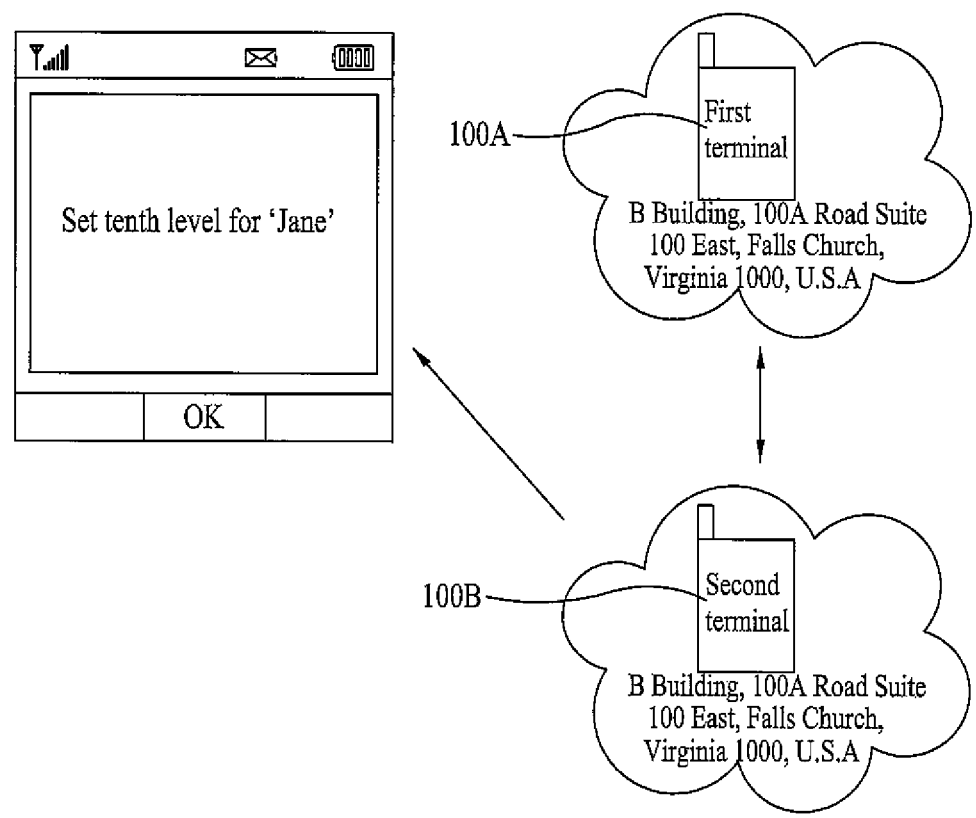

Referring to FIG. 9F, if the second terminal 100B has the same country/state/city/region (i.e., zip code)/detailed address information of the first terminal 100A, the first terminal 100A is able to set a tenth level having a highest detail extent of the provided information based on location.

In addition, the first terminal 100A is able to set the resolution in accordance with location association with reference to a distance from the second terminal 100B (option not shown in the drawing).

For instance, if the second terminal 100B gets closer to the first terminal 100A, the first terminal 100A is able to set the resolution enabling the information based on location provided to the second terminal 100B to have a more detailed level. On the contrary, if the second terminal 100B gets farther from the first terminal 100A, the first terminal 100A is able to set the resolution enabling the provided information based on location to have a more detailed level.

The first terminal 100A is able to set the resolution for the second terminal 100B in accordance with a intimacy/permission level (explained later) set by the second terminal 100B. In this case, the intimacy/permission level is automatically set by considering an extent of call/message transmission/reception between the first and second terminal 100Bs or can be directly specified by a user.

For instance, if the intimacy/permission level set for the second terminal 100B increases, the first terminal 100A is able to set the resolution enabling the information based on location provided to the second terminal 100B to have a more detailed level. On the contrary, if the intimacy/permission level decreases, the first terminal 100A is able to set the resolution enabling the provided information based on location to have a more detailed level.

The first terminal 100A is able to set a resolution for the second terminal 100B to a resolution directly inputted by a user. Of course, in case that at least one or more second terminal 100Bs are managed as a group, the first terminal 100A is able to set the resolution for the group.

In the following description, a process for a first terminal 100A to generate information based on location hierarchically in accordance with a resolution set for a second terminal 100B is explained in detail.

In this case, the hierarchical generation of the information based on location may mean that the generation is carried out by adjusting an extent of provision (in case of transmitting information based on location to the second terminal 100B) or display (in case of receiving information based on location from the second terminal 100B) of the information based on location to correspond to the resolution.

In the following description, the information based on location is limited to the administrative (e.g., postal) address information. In the following description, geographic entities common in U.S.A. are referenced. However, one skilled in the art would know that geographic entities of other nations may be, singly or in combination. For convenience and clarity of explanation, it is assumed that more detailed administrative (e.g., postal) address information is generated if a level of resolution increases. So, it is able to hierarchically generate the administrative (e.g., postal) address information in accordance with the level of resolution.

For instance, in case that overall administrative (e.g., postal) address information that can be generated using location information on the first terminal 100A is '10 #1004, Apartment-A, 100 A Road Suite 100 East, Falls Church, Va. 1000, U.S.A.', information based on location generated to correspond to the resolution of the second terminal 100B can be represented as Table 1.

TABLE 1

| Resolution | Administrative (e.g., postal) address Information |
|---|---|
| 1st level | Not provided |
| 2nd level | U.S.A. |
| 3rd level | Virginia, U.S.A. |
| 4th level | Virginia 1000, U.S.A. |
| 5th level | Falls Church, Virginia 1000, U.S.A. |
| 6th level | 100 A Road Suite 100 East, Falls Church, Virginia 1000, U.S.A. |
| 7th level | Apartment-A, 100 A Road Suite 100 East, Falls Church, Virginia 1000, U.S.A. |
| 8th level | 10 Apartment-A, 100 A Road Suite 100 East, Falls Church, Virginia 1000, U.S.A. |
| 9th level | 10 #1004, Apartment-A, 100 A Road Suite 100 East, Falls Church, Virginia 1000, U.S.A. |
| 10th level | Coordinate information |

Meanwhile, in case of receiving the information based on location on the second terminal 100B, the first terminal 100A is able to hierarchically generate the information based on location of the second terminal 100B, which will be displayed to correspond to the resolution set for the second terminal 100B, in accordance with Table 1. for instance, if the information based on location on the second terminal 100B is 'Falls Church, Va. 1000, U.S.A.' and if a third level of resolution is set for the second terminal 100B, the first terminal 100A is able to generate 'Virginia, U.S.A.' as the information based on location, which will be displayed, on the second terminal 100B.

Alternatively, for instance, a timing point (with reference to a distance from the first terminal 100A to the second terminal 100B) of providing information based on location in accordance with resolution of the second terminal 100B and an update period can be represented as Table 2. The per-resolution distance and the update period can be individually set.

| Resolution | Distance | Update Period |
|---|---|---|
| 1st level | Within radius 100 m | 5 hours |
| 2nd level | Within radius 500 m | 3 hours |
| 3rd level | Within radius 1 km | 2 hours |
| 4th level | Within radius 5 km | 1 hour |
| 5th level | Within radius 10 km | 30 minutes |
| 6th level | Within radius 20 km | 20 minutes |
| 7th level | Within radius 50 km | 10 minutes |
| 8th level | Within radius 100 km | 5 minutes |
| 9th level | Within radius 500 km | 1 minute |
| 10th level | Within every radius | Real time |

As shown in Table 1 and Table 2, it is assumed that one of the first to tenth levels can be selectively set for a single second terminal 100B. And, it is also assumed that there exits ten second terminal 100Bs corresponding to the first to tenth levels, respectively.

Meanwhile, the first terminal 100A transmits the information based on location hierarchically generated by the controller 180 or the position-location module 115 to the second terminal 100B via the wireless communication unit 110 [S830].

The first terminal 100A, as explained in the receiving step S810, is able to transmit the information based on location to the second terminal 100B using the broadcast receiving module 111 in case of the broadcast system, the mobile communication module 112 in case of the mobile communication system, the wireless internet module 113 in case of the data communication system, the short-range communication module 114 in case of the short-range communication system or the position-location module 115 in case of the GPS.

And, the transmitting step S830 can be executed in case of making a registration request of the location information providing service to the second terminal 100B. This will be explained in detail as follows.

Moreover, the transmitting step S830 can be executed in case that the second terminal 100B accesses the location information providing service. This will be explained in detail as follows.

In the following description, a method of providing location information in case of registration with a location information providing service is explained with reference to FIGS. 10 to 14D. In this case, the registration may mean the registration with the location information providing service or the registration as a terminal for transmitting/receiving mutual location information via the location information providing service among the beforehand registered terminals.

Figure 10:
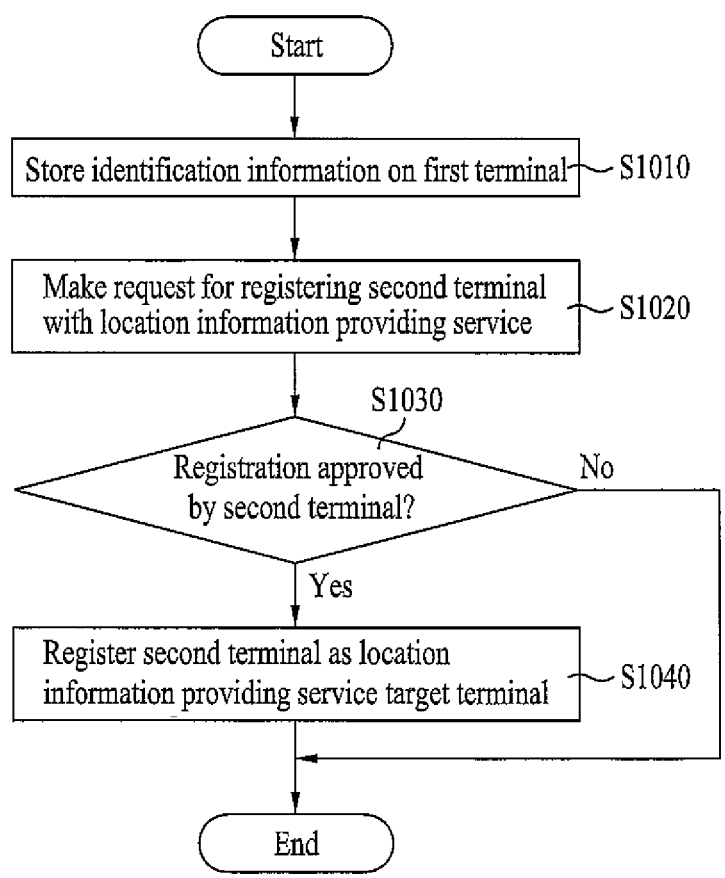
FIG. 10 is a first flowchart of a process for registering a mobile terminal with a location information providing service according to one embodiment of the present invention.

FIG. 10 is a first flowchart of a process for registering a mobile terminal with a location information providing service according to one embodiment of the present invention.

Referring to FIG. 10, the first terminal 100A stores identification information on the first terminal 100A [S1010].

In the storing step S1010, the first terminal 100A stores its identification information in the memory 160. Alternatively or in addition, the first terminal 100A is registered with a server and then stores its identification information in the server.

In this case, the identification information is information for identifying the first terminal 100A or a user of the first terminal 100A in using a location information providing service. And, the identification information can include a terminal serial number, an international mobile equipment identity (IMEI) number (or another mobile equipment ID), a user ID and password subscribed in a location information providing service, a name registered with a location information providing service, a terminal phone number, a subscribed e-mail address, a subscriber homepage address and the like. So, the server is able to authenticate location information providing service use authority of the first terminal 100A using the identification information on the first terminal 100A. A different terminal is able to identify that the first terminal 100A is the terminal having made the request for the location information providing service to the different terminal using the identification information on the first terminal 100A which is received from the first terminal 100A or the server.

The first terminal 100A makes a request for a registration with a location information providing service to the second terminal 100B via the wireless communication unit 110 [S1020]. For instance, in case of using the mobile communication terminal 112, the registration request can be carried out using such a messaging service as SMS (short message service), MMS (multimedia messaging service) and the like. It is understood that the requesting step S1020 can be carried out using every system capable of transmitting/receiving data between terminals as well as the aforesaid messaging service.

The first terminal 100A carries out the requesting step S1020 via the server or can directly perform the requesting step S1020 on the second terminal 100B without using the server. In some cases, even if the registration is not requested by the first terminal 100A, it is able to make a request for registration with a location information providing service to at least one terminal randomly selected by the server. In this case, a registration requesting procedure by the first terminal 100A may be unnecessary.

In the requesting step S1020, the identification information or the information based on location on the first terminal 100A can be transmitted to the second terminal 100B. This is to inform the second terminal 100B of the terminal having made the request for the location information providing service to the second terminal 100B and a location thereof.

Prior to the execution of the requesting step S1020, the first terminal 100A is able to hierarchically generate information based on location information to be transmitted in the requesting step S1020, in accordance with a resolution set for the second terminal 100B as a registration request target.

Alternatively, prior to the execution of the requesting step S1020, the first terminal 100A is able to specify a type and provision extent of the identification information or the information based on location which will be transmitted in the requesting step S1020 among the overall identification information or the overall information based on location relevant to the first terminal 100A.

The provision extent of the information based on location may differ in accordance with the intimacy/permission level set for the second terminal 100B. For instance, in case that the intimacy/permission level is high, it may be able to transmit coordinate information (basic information for generating the aforesaid overall location information) as it is. In case that the intimacy/permission level is low, it is able to transmit distance information (e.g., the first terminal 100A is located within the radius 5 km of the second terminal 100B) only.

If the registration with the location information providing service is approved by the second terminal 100B, the first terminal 100A is registered as a target terminal of the location information providing service [S1030, S1040].

The first terminal 100A can be provided with feedback whether or not the registration with the location information providing service was approved by the second terminal 100B by the server or the second terminal 100B via the wireless communication unit 110. If the registration with the location information providing service was approved by the second terminal 100B, the first terminal 100A, the second terminal 100B or the server can register the first terminal 100A and second terminal 100B as mutual target terminals of the location information providing service. The location information providing service target terminal information is stored in the memory 160 of each of the first and second terminal 100Bs or the server and then managed.

Figure 11:
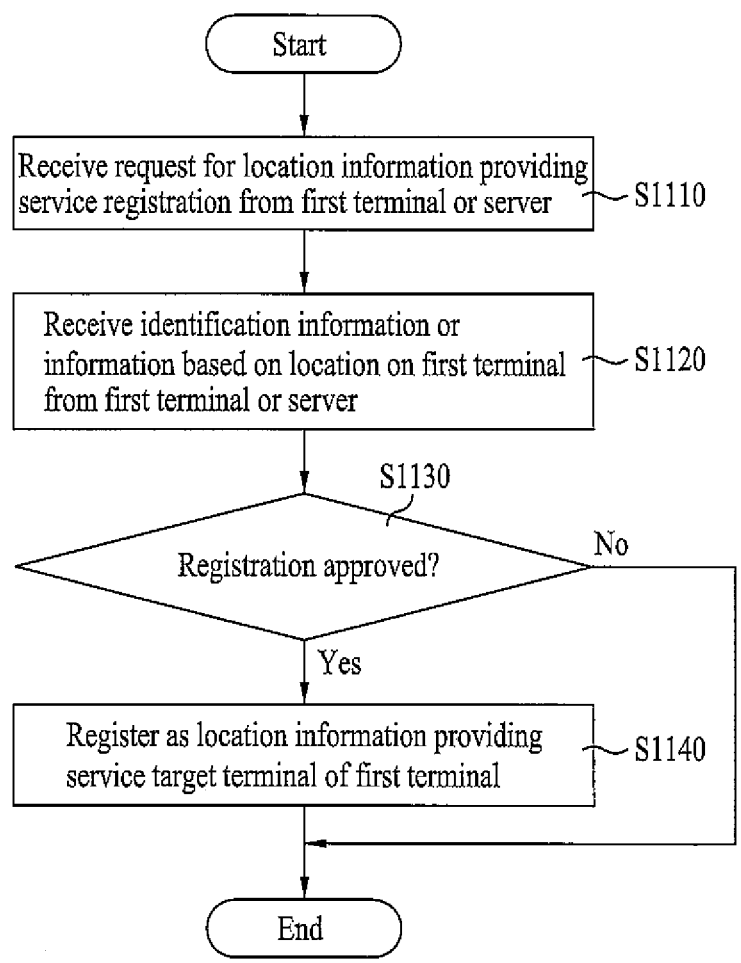
FIG. 11 is a second flowchart of a process for registering a mobile terminal with a location information providing service according to one embodiment of the present invention.

FIG. 11 is a second flowchart of a process for registering a mobile terminal with a location information providing service according to one embodiment of the present invention.

Referring to FIG. 11, the second terminal 100B receives a request for registration with a location information providing service from the first terminal 100A or the server via the wireless communication unit 110 [S1110].

Subsequently, the second terminal 100B received identification information or location information on the first terminal 100A from the first terminal 100A or the server [S1120].

The requesting and receiving steps S1110 and S1120 can be carried out using such a messaging service as SMS, MMS and the like. It is understood that the requesting and receiving steps S1110 and S1120 can be carried out using every system capable of transmitting/receiving data between terminals as well as the messaging service.

If the registration with the location information providing service is approved by the second terminal 100B, the second terminal 100B is registered as a target terminal of the location information providing service of the first terminal 100A [S1130, S1140]. In this case, the first terminal 100A, the second terminal 100B or the server can register the first and second terminal 100Bs as mutual target terminals of the location information providing service.

Figure 12:
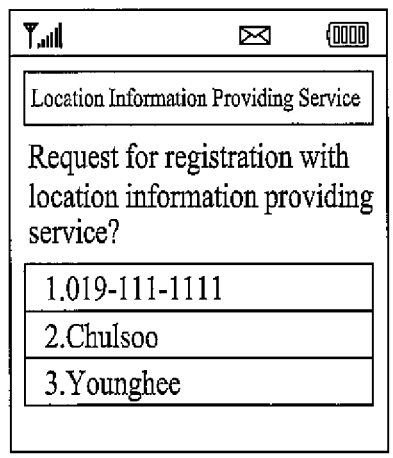
FIG. 12 is a state diagram of a screen on which a process for registering a mobile terminal of one embodiment of the present invention with a location information providing service according to a first embodiment of the present invention is shown.

FIG. 12 is a state diagram of a screen on which a process for registering a mobile terminal of one embodiment of the present invention with a location information providing service according to a first embodiment of the present invention is displayed.

Referring to FIG. 12, the first terminal 100A is able to select at least one target terminal to make a request for a registration with a location information providing service, in accordance with a selection made by a user. In this case, the user may directly input a phone number of the target terminal or may select the target terminal by searching phone numbers or names stored in a phonebook or names set for the phone numbers. The user is able to select at least one or more terminals for which resolution levels above/below predetermined levels are set, respectively.

In FIG. 12, the first terminal 100A makes the registration with the location information providing service to terminals corresponding to phone number '011-111-1111', name 'Chulsoo' and name 'Younghee', respectively.

FIGS. 13A to 13D are state diagram of a screen on which a process for registering a mobile terminal of one embodiment of the present invention with a location information providing service according to a second embodiment of the present invention is displayed.

Figure 13A:
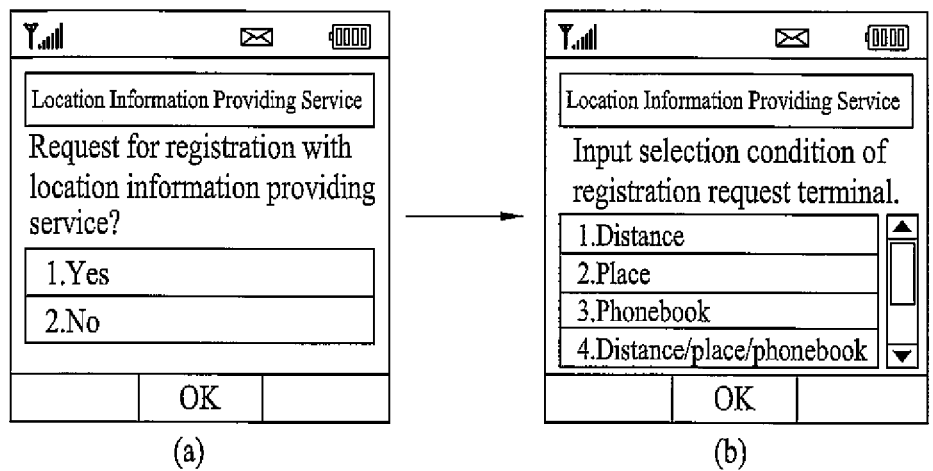

Referring to FIG. 13A, the first terminal 100A displays a sentence that queries whether a request for a registration with a location information providing service will be made or not on a screen [a].

If the request ('yes') is selected in the state [a], the first terminal 100A displays a selection condition list of a terminal (hereinafter named 'registration request terminal') to which the registration with the location information providing service will be made [b].

The selection condition list displayed in the state [b] can include a distance, a place, a phonebook and distance/place/phonebook. Also, a distance/phonebook option (not shown) may be selected.

Figure 13B:
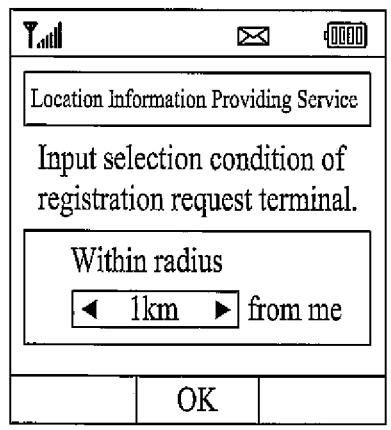

In case that the distance is selected from the selection condition list, the first terminal 100A is able to display an image shown in FIG. 13B. Referring to FIG. 13B, the first terminal 100A is able to select terminals located within a predetermined radius from the first terminal 100A as registration request terminals. In this case, the predetermined distance is directly inputted by a user using a numeral key or a direction key or can be inputted by being selected from a list including settable radiuses.

If the place is selected from the selection condition list, the first terminal 100A is able to display an image shown in FIG. 13C. Referring to FIG. 13C, the first terminal 100A is able to select terminals located in a specific place as registration request terminals. In this case, a user is able to directly input a specific place (e.g., 'A Station exit #7') via an input window or can input the specific place by selecting it from a place list.

If the phonebook is selected from the selection condition list, the first terminal 100A is able to display an image shown in FIG. 13D. Referring to (a) of FIG. 13D, the first terminal 100A is able to select a terminal, which corresponds to at lest one name selected from the list of names registered for phone numbers stored in the first terminal 100A, as a registration request terminal. Referring to (b) of FIG. 13D, in case that phone numbers stored in the first terminal 100A are managed as a group, the first terminal 100A is able to select a terminal, which corresponds to at lest one name selected from the list of names set for phone numbers belonging to a specific group, as a registration request terminal.

Figure 14A:
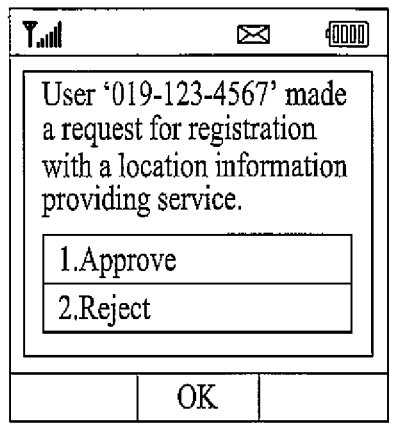
FIGS. 14A to 14C are state diagram of a screen on which a process for registering a mobile terminal of one embodiment of the present invention with a location information providing service according to a third embodiment of the present invention is shown.
Figure 14B:
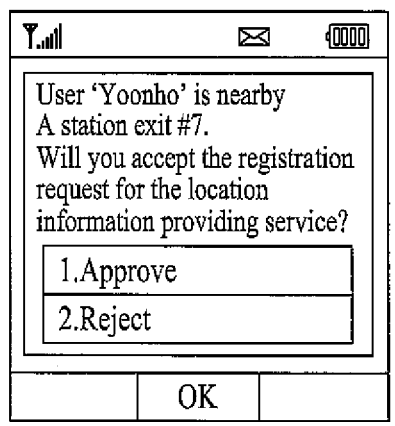
Figure 14C:
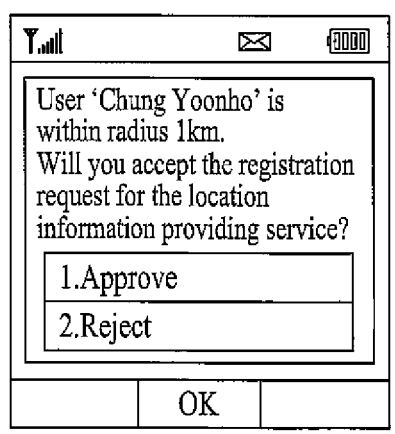

FIGS. 14A to 14C are state diagram of a screen on which a process for registering a mobile terminal of one embodiment of the present invention with a location information providing service according to a third embodiment of the present invention is displayed.

Referring to FIG. 14A, in case of receiving a registration request for a location information providing service from the first terminal 100A, the second terminal 100B displays identification information on the first terminal 100A, e.g., phone number of '019-123-4567' and also displays that a user of '019-123-4567' has made the request for the registration with the location information providing service.

Referring to FIG. 14B, in case of receiving a registration request for a location information providing service from the first terminal 100A, if the second terminal 100B stores 'Yoonho' as a name for the first terminal 100A, the second terminal 100B displays a current location (e.g., nearby exit #7 at A station) with reference to a place of a user 'Yoonho' and also displays that the user 'Yoonho' has made the request for the registration with the location information providing service.

Referring to FIG. 14C, in case of receiving a registration request for a location information providing service from the first terminal 100A, if the second terminal 100B stores 'Chung Yoonho' as a name for the first terminal 100A, the second terminal 100B displays a current location (e.g., within radius 1 km from the second terminal 100B) with reference to a distance of the user 'Chung Yoonho' and also displays that the user 'Chung Yoonho' has made the request for the registration with the location information providing service.

In FIGS. 14A to 14C, the second terminal 100B displays a window, which enables a selection for whether to approve the registration request for the location information providing service, on a portion of a screen. If 'Approve' is selected via the displayed window, the second terminal 100B notifies the first terminal 100A or the server that the registration with the location information providing service has been approved. If 'Reject' is selected via the displayed window, the second terminal 100B notifies the first terminal 100A or the server that the registration with the location information providing service has been rejected.

FIGS. 15A to 15D are state diagram of a screen on which a process for registering a mobile terminal of one embodiment of the present invention with a location information providing service according to a fourth embodiment of the present invention is displayed.

Figure 15A:
FIGS. 15A to 15D are state diagram of a screen on which a process for registering a mobile terminal of one embodiment of the present invention with a location information providing service according to a fourth embodiment of the present invention is shown.

Referring to FIG. 15A, in case of receiving a registration request for a location information providing service from the first terminal 100A, the second terminal 100B displays identification information on the first terminal 100A, e.g., phone number of '019-123-4567' and also displays that a user of '019-123-4567' has made the request for the registration with the location information providing service. In this case, the second terminal 100B displays a window, which enables a selection for whether to approve the registration request for the location information providing service, on a portion of a screen.

In the following description, explained is a screen state in case that 'Approve' is selected via the displayed window.

Figure 15B:
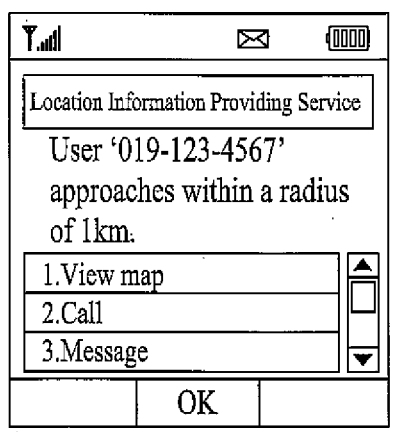

Referring to FIG. 15B, the second terminal 100B is able to display that the first terminal 100A approaches the second terminal 100B within a radius 1 km using information based on location (corresponding to the aforesaid relative location information) with reference to the distance of '019-123-4567'.

Figure 15C:
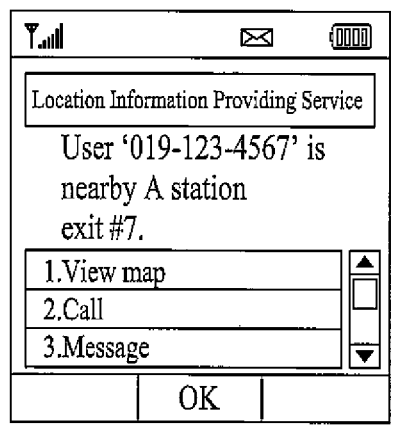

Referring to FIG. 15C, the second terminal 100B is able to display that the first terminal 100A is located around the exit #7 at A station using location information (corresponding to the aforesaid administrative (e.g., postal) address information) with reference to the place of '019-123-4567'.

Figure 15D:
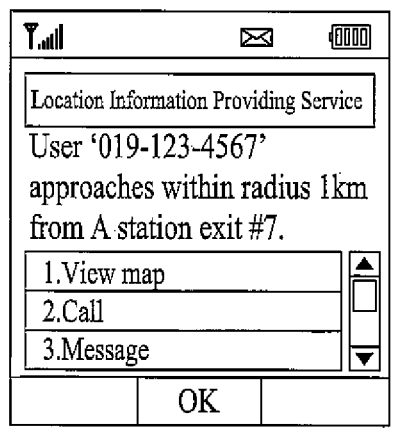

Referring to FIG. 15D, the second terminal 100B is able to display that the first terminal 100A approaches the second terminal 100B within a radius 1 km from the exit #7 at A station using location information (corresponding to a mixed type of the relative location information and the administrative (e.g., postal) address information) with reference to the place of '019-123-4567'.

In FIGS. 14A to 14C and FIGS. 15A to 15D, the second terminal 100B may include each terminal displaying each of the screens shown in the respective drawings or a single terminal capable of displaying the image on each of the screens shown in the drawings in accordance with a situation.

A location information providing method in case of a location information providing service access is explained with reference to FIGS. 16 to 27 as follows. For convenience and clarity of explanation, the following description is made by being restricted to the first and second terminal 100Bs among a plurality of terminals accessing a location information providing service.

Figure 16:
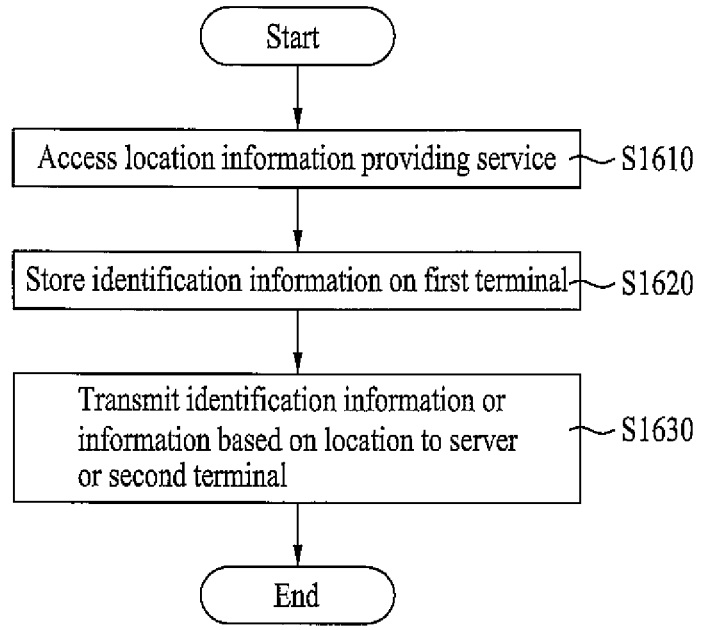
FIG. 16 is a flowchart of a process for transmitting location information in case of an location information providing service access of a mobile terminal according to one embodiment of the present invention.

FIG. 16 is a flowchart of a process for transmitting location information in case of a location information providing service access of a mobile terminal according to one embodiment of the present invention.

Referring to FIG. 16, the first terminal 100A accesses a location information providing service via the wireless communication unit 110 [S1610]. For instance, in case that a location information providing service is a service implemented on internet, the first terminal 100A is able to access the location information providing service via the wireless internet module 113.

The accessing step S1610 can be executed if a function key provided for the location information providing service access is selected by a user. In case that there exists an access timing point or an access place preset by a user, the first terminal 100A is able to execute the accessing step S1610 if the preset access timing point is met by the controller 180 or if it is recognized that the first terminal 100A is located at the access place.

If the accessing step S1610 is completed, the first terminal 100A is able to generically display identification information or information based on location on terminals currently accessing the location information providing service. In particular, the first terminal 100A is able to display the information per at least one group to which the accessing terminals belong.

The first terminal 100A stores the identification information on the first terminal 100A in the memory 160 or the server [S1620].

In this case, the identification information can be beforehand stored at a timing point of requesting a registration with the location information providing service or at a timing point of using the location information providing service randomly. So, the storing step S1620 can be omitted in some cases.

The first terminal 100A transmits the identification information or the information based on location on the first terminal 100A to the server or the second terminal 100B [S1630]. In this case, the server is able to transmit the identification information or the information based on location received from the first terminal 100A to the second terminal 100B.

For instance, the information based on location transmitted in the transmitting step S1630 may have a format that is hierarchically generated to correspond to a resolution set for the second terminal 100B.

The first terminal 100A is able to select at least one mobile terminal (hereinafter named 'location information receiving terminal') that will receive the information based on location transmitted in the transmitting step S1630. Of course, the location information receiving terminal can include every terminal registered to mutually perform the location information providing service with the first terminal 100A.

In the following description, the selecting process is explained in detail with reference to FIGS. 18A to 18D as follows.

FIGS. 18A to 18D are state diagrams of a screen on which a process for selecting a location information receiving terminal in a mobile terminal according to one embodiment of the present invention is shown.

Referring to FIG. 18A, the first terminal 100A displays a list including selection conditions of a mobile terminal that will receive information based on location. In this case, the selection condition list can include selection conditions such as a distance, a place name, a group and the like.

FIG. 18B shows a case that a distance is selected from the selection condition list.

Referring to (a) of FIG. 18B, the first terminal 100A is able to select mobile terminals located within a predetermined radius from the first terminal 100A as location information receiving terminals. Referring to (b) of FIG. 18B, the first terminal 100A is able to select mobile terminals located within a predetermined radius from a specific place as location information receiving terminals.

FIG. 18C shows a case that a place is selected from the selection condition list.

Referring to (a) of FIG. 18C, if an administrative (e.g., postal) address (e.g., Falls Church, Va. 1000) corresponding to a specific place is inputted to a place input window, the first terminal 100A is able to all mobile terminals located at the inputted administrative (e.g., postal) address as location information receiving terminals. Referring to (b) of FIG. 18C, if a specific administrative (e.g., postal) address (e.g., Falls Church, Va. 1000) is selected using an address list, the first terminal 100A is able to select all terminals located at the selected administrative (e.g., postal) address as location information receiving terminals. In this case, the address list can be represented as a plurality of groups including a first group of 'state/county/metropolitan area', a second group of 'region (i.e., zip code)', a third group of 'neighborhood' and the like.

FIG. 18D shows a case that a group is selected from a selection condition list.

Referring to (a) of FIG. 18D, in case that a specific group is selected from a plurality of groups, the first terminal 100A is able to select mobile terminals belonging to the selected specific group as location information receiving terminals. In this case, the specific group can be selected by selecting an index for the specific group from indexes of a plurality of the groups. In this case, the group can be set for each of a plurality of mobile terminal registered with the location information providing service or can be set by interoperating with a group on a phonebook of the first terminal 100A. Referring to (b) of FIG. 18D, the first terminal 100A is able to select one of a mobile terminal in an access mode ('on'), a mobile terminal in a non-access mode ('off') and a mobile terminal in access/non-access ('on/off') mode as a location information receiving terminal. In this case, the first terminal 100A is able to display an index indicating each of the access modes ('on'), the non-access mode ('off') and the access/non-access mode ('on/off').

Besides, the first terminal 100A is able to select a specific one of all terminals, which are registered to mutually perform the location information providing service with the first terminal 100A, one by one, as a location information receiving terminal [not shown in the drawing].

Optionally, the first terminal 100A is able to select a mobile terminal located at the same 'state/county/metropolitan area', 'city' 'region (i.e., zip code)', 'neighborhood' or the like centering on an administrative area where it is located. In this case, for convenience of selection made by a user, the same 'state/county/metropolitan area', 'region (i.e., zip code)', 'neighborhood' or the like can be displayed on the screen in a manner of constructing a list [not shown in the drawing].

Optionally, the first terminal 100A is able to differently set information based on location, which is to be transmitted in the transmitting step S1630, per a mobile terminal or per a group to which at least one mobile terminal belongs.

The setting process is explained in detail with reference to FIG. 19 as follows.

Figure 19:
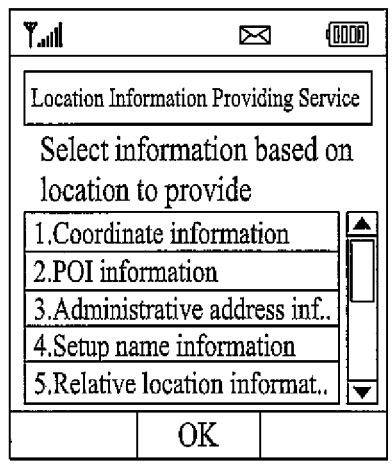
FIG. 19 is a state diagram of a screen on which a process for setting an extent of providing location information on a mobile terminal according to one embodiment of the present invention is shown.

FIG. 19 is a state diagram of a screen on which a process for setting an extent of providing location information on a mobile terminal according to one embodiment of the present invention is displayed.

Referring to FIG. 19, the first terminal 100A is able to set location base information to be transmitted to a mobile terminal or a group. And, the first terminal 100A displays a list for selecting the information based on location. In this case, the list can include coordinate information, POI information, administrative (e.g., postal) address information, setup name information, relative location information and the like.

For instance, the first terminal 100A is able to set further detailed location information on the first terminal 100A if the intimacy/permission level increases in accordance with the intimacy/permission level with the first terminal 100A. The first terminal 100A is able to set more generic location information on the first terminal 100A if the intimacy/permission level decreases in accordance with the intimacy/permission level with the first terminal 100A. For this, a resolution can be set in accordance with the intimacy/permission level. This is explained in the foregoing description.

The first terminal 100A is able to set the information based on location, which will be provided, to information based on location directly selected by a user.

First of all, when 'coordinate information' is selected from a list, the first terminal 100A can be set to provide coordinate information including latitude, longitude, altitude, time, speed and the like of its location point. So, the second terminal 100B is able to generate information based on a location on the first terminal 100A using the coordinate information. For instance, the first terminal 100A can be set to provide the coordinate information to a mobile terminal having a highest intimacy/permission level.

When 'POI information' is selected from a list, the first terminal 100A can be set to provide POI information on a position where the first terminal 100A is located. In some cases, it is able to set the POI information to be provided together with coordinate information or administrative (e.g., postal) address information corresponding to the POI information.

When 'administrative (e.g., postal) address information' is selected from a list, the first terminal 100A can be set to provide an administrative (e.g., postal) address with reference to an administrative area where the first terminal 100A is located. For instance, the first terminal 100A can be set to provide a detailed address (e.g., 10 #1004, Apartment-A, 100 A Road Suite 100 East, Falls Church, Va. 1000, U.S.A.) to a broadest address (e.g., U.S.A.) on the administrative area in order of higher intimacy/permission level, in accordance with intimacy/permission level. Optionally, it is able to set the administrative (e.g., postal) address information to be provided together with the coordinate information or POI information corresponding to the administrative (e.g., postal) address information.

When 'setup name information' is selected from a list, the first terminal 100A can be set to provide name information (e.g., school, company, library, etc.) set for a point where the first terminal 100A is located. Optionally, it is able to set the setup name information to be provided together with the coordinate information, POI information or administrative (e.g., postal) address information corresponding to the setup name information.

Finally, when 'relative location information' is selected from a list, the first terminal 100A can be set to provide relative location information on the first terminal 100A, e.g., a distance, a speed, a direction and the like with reference to a mobile terminal that will receive information based on location.

Figure 17:
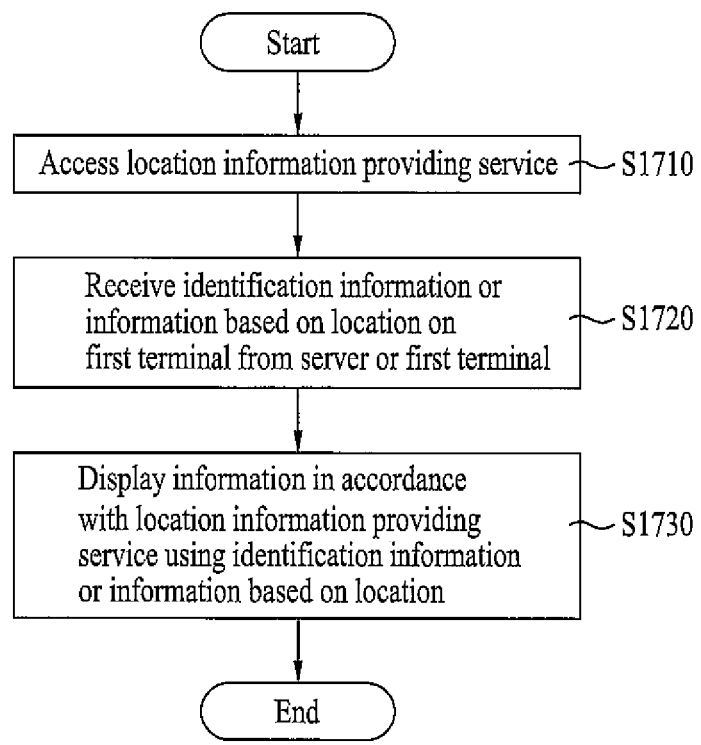
FIG. 17 is a flowchart for receiving and displaying location information in a mobile terminal according to one embodiment of the present invention.

FIG. 17 is a flowchart for receiving and displaying location information in a second terminal 100B according to one embodiment of the present invention.

Referring to FIG. 17, the second terminal 100B accesses a location information providing service via the wireless communication unit 110 [S1710].

The accessing step S1710 is identical to the former accessing step S1610 shown in FIG. 16. So, its details will be omitted in the following description.

The second terminal 100B receives identification information or information based on location on the first terminal 100A from the server or the first terminal 100A [S1720].

The second terminal 100B is able to select at least one mobile terminal (hereinafter named 'location information transmitting terminal') which will transmit the information based on location received in the receiving step S1720. Of course, the location information transmitting terminal can include every terminal registered to mutually perform the location information providing service with the second terminal 100B without execution of a separate selection process.

The selecting process will be explained in detail with reference to FIGS. 20A to 20F as follows.

FIGS. 20A to 20F are state diagrams of a screen on which a process for selecting a location information transmitting terminal in a mobile terminal according to one embodiment of the present invention is displayed.

Figure 20A:
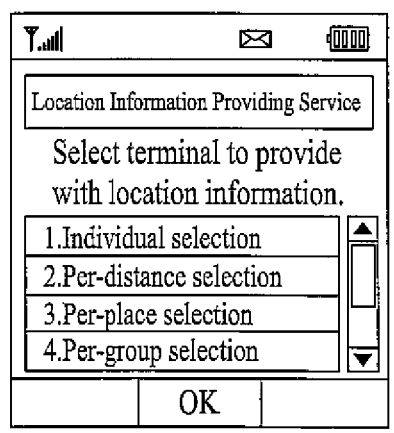

Referring to FIG. 20A, the second terminal 100B displays a list, which includes selection conditions of a mobile terminal that will transmit information based on location, on the display 151. In this case, the selection condition list can include selection conditions such as an individual selection, a per-distance selection, a per-place selection, a per-group selection and the like.

FIG. 20B shows a case that an individual selection is selected from a selection condition list.

Referring to FIG. 20B, the second terminal 100B is able to select a specific mobile terminal one by one from all terminals, which are registered to mutually perform a location information providing service with the second terminal 100B, as a location information transmitting terminal. In this case, to facilitate a user to make a selection, the second terminal 100B is able to display a list of some or all terminals registered to mutually perform a location information providing service with the second terminal 100B.

FIG. 20C shows a case that a per-distance selection is selected from a selection condition list.

Referring to (a) of FIG. 20C, the second terminal 100B is able to select mobile terminals, which are located within a predetermined radius (e.g., 5 km) from the second terminal 100B, as location information transmitting terminals. Referring to (b) of FIG. 20C, the second terminal 100B is able to select mobile terminals, which are located within a predetermined radius (e.g., 1 km) from a specific place (e.g., A station), as location information transmitting terminals.

Figure 20D:
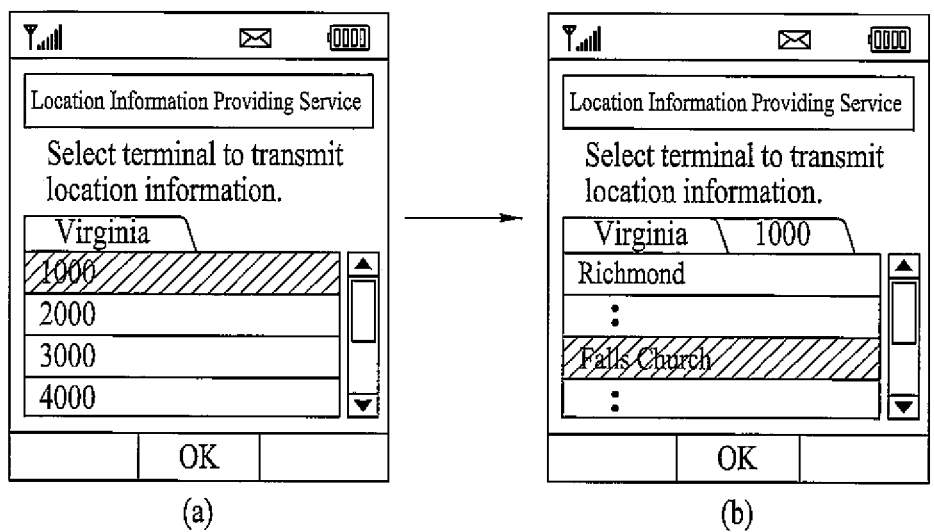
Figure 20E:
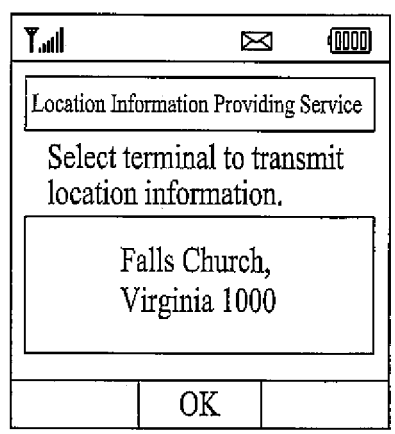

FIG. 20D and FIG. 20E show cases that a per-place selection is selected from a selection condition list.

Referring to FIG. 20D, the second terminal 100B selects a higher administrative area (e.g., Virginia) from a first address list, selects a first lower administrative area (e.g., 1000) belonging to the higher administrative area from a second address list, and selects a second lower administrative area (e.g., Falls Church) belonging to the first lower administrative area from a third address list [a, b]. So, the second terminal 100B is able to select all mobile terminals, which are located at the place (e.g., Falls Church, Va. 1000) corresponding to both of the first and second lower administrative areas, as location information transmitting terminals.

Referring to FIG. 20E, if an administrative (e.g., postal) address corresponding to a specific place is inputted to a place input window, the second terminal 100B is able to all mobile terminal, which are located at the inputted administrative (e.g., postal) address, as location information transmitting terminals.

Figure 20F:
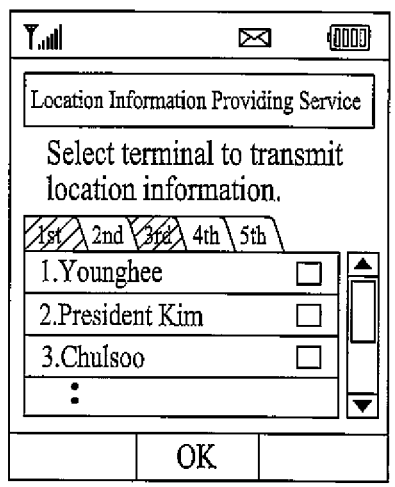

FIG. 20F shows a case that a per-group selection is selected from a selection condition list.

Referring to FIG. 20F, if a specific group is selected from a plurality of groups, the second terminal 100B is able to select mobile terminals belonging to the selected specific group as location information transmitting terminals. In this case, the specific group can be selected if an index for the specific group is selected from a plurality of indexes of a plurality of the groups. And, a plurality of the specific groups can be selected as well.

Although not shown in the drawing, the second terminal 100B is able to select one of a mobile terminal in an access mode ('on'), a mobile terminal in a non-access mode ('off') and a mobile terminal in access/non-access ('on/off') mode as a location information receiving terminal. In this case, the second terminal 100B is able to display an index indicating each of the access modes ('on'), the non-access mode ('off') and the access/non-access mode ('on/off').

Although not shown in the drawing, the second terminal 100B is able to select a mobile terminal located at the same 'state/county/metropolitan area', 'city', 'region (i.e., zip code)', 'neighborhood' or the like centering on an administrative area where it is located.

Returning to FIG. 17, the second terminal 100B displays various kinds of information in accordance with the location information providing service using the identification information or the information based on location received in the receiving step S1720 [S1730].

The second terminal 100B is able to set location information, which will be displayed in the displaying step S1730, per a mobile terminal or a group to which at least one mobile terminal belongs.

The setting process is explained in detail with reference to FIG. 21 as follows.

Figure 21:
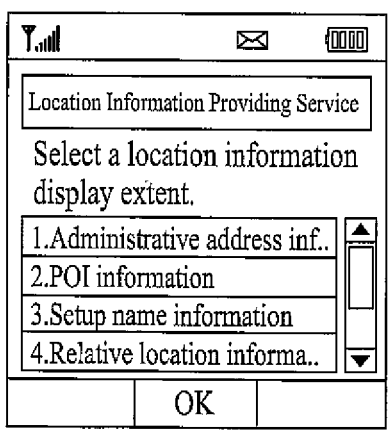
FIG. 21 is a state diagram of a screen on which a process for setting a location information display extent in a mobile terminal according to one embodiment of the present invention is shown.

FIG. 21 is a state diagram of a screen on which a process for setting a location information display extent in a mobile terminal according to one embodiment of the present invention is displayed.

Referring to FIG. 21, the second terminal 100B is able to set a display extent of location information per a mobile terminal or per a group. And, the second terminal 100B displays a list for selecting the location information display extent. In this case, the list can include administrative (e.g., postal) address information, POI information, setup name information, relative location information and the like.

Generally, in accordance with intimacy/permission level with a location information transmitting terminal, the second terminal 100B can be set to display detailed information based on location if the intimacy/permission level increases or can be set to display generic information based on location if the intimacy/permission level decreases. Meanwhile, a user is able to directly select a location information display extent.

First of all, in case that 'administrative (e.g., postal) address information' is selected from a list, the second terminal 100B can be set to provide an administrative (e.g., postal) address with reference to administrative area information on the location information transmitting terminal. For instance, the second terminal 100B can be set to provide an entire administrative (e.g., postal) address (e.g., 10 #1004, Apartment-A, 100 A Road Suite 100 East, Falls Church, Va. 1000, U.S.A.) to a generic address (e.g., Virginia) in order of higher intimacy/permission level, in accordance with intimacy/permission level.

In case that 'POI' information is selected from a list, the second terminal 100B can be set to display POI information on the location information transmitting terminal. For instance, 'restaurant for good taste', 'recommended xx mart', 'famous place for date' or the like can be displayed as POI information.

In case that 'setup name information' is selected from a list, the second terminal 100B can be set to display name information (e.g., school, company, library, etc.) set for a point where the location information transmitting terminal is located. For instance, in case that setup name information per coordinate information or administrative (e.g., postal) address information exists in the second terminal 100B, the second terminal 100B receives coordinate information or administrative (e.g., postal) address information from the location information transmitting terminal and then displays setup name information corresponding to the received information.

The displaying step S1730 is explained in detail with reference to FIGS. 22A to 27C as follows. For convenience and clarity of explanation, it is assumed that the second terminal 100B sets a name of the first terminal 100A to 'Jane' or it is assumed that the first terminal 100A uses a name 'Jane' in using a location information providing service.

Figure 22A:
FIG. 22A and FIG. 22B are state diagrams of a screen for announcing that a location information providing service is accessed in a mobile terminal according to one embodiment of the present invention.
Figure 22B:
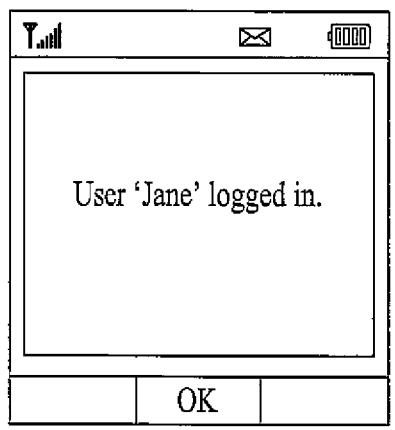

FIG. 22A and FIG. 22B are state diagrams of a screen for announcing that a first terminal 100A accesses a location information providing service.

Referring to FIG. 22A, in case that a phone number of the first terminal 100A is '019-234-5678', the second terminal 100B is able to display a sentence announcing that a user '019-234-5678' has logged in. It is understood that every item of identification information capable of identifying the first terminal 100A can be displayed as well as the phone number.

Referring to FIG. 22B, if a name of the first terminal 100A is set to 'Jane', the second terminal 100B is able to display a sentence announcing that a user 'Jane' has logged in.

FIGS. 23A to 23D are state diagrams of a screen on which area value information is displayed in accordance with intimacy/permission level with a first terminal 100A according to one embodiment of the present invention.

In the following description, for convenience and clarity of explanation, it is assumed that the whole administrative (e.g., postal) address information is '100A Road Suite 100 East, Falls Church, Va. 1000'. And, it is also assumed that intimacy/permission level can be set to a level ranging level 1 to level 4 in order of lower intimacy/permission level. For convenience and clarity of explanation, it is assumed that further detailed administrative (e.g., postal) address information is displayed in accordance with higher intimacy/permission level.

Figure 23A:
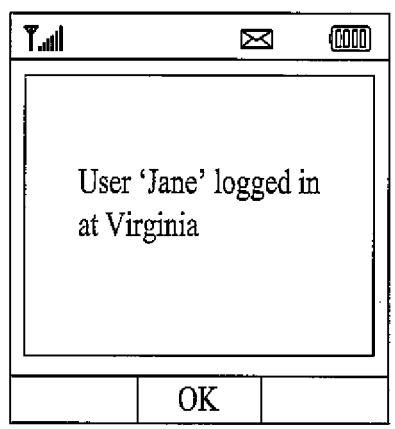
FIGS. 23A to 23D are state diagrams of a screen on which area value information is displayed in accordance with intimacy/permission level with a mobile terminal according to one embodiment of the present invention.

Referring to FIG. 23A, in case that intimacy/permission level with the first terminal 100A is level 1, the second terminal 100B is able to display a sentence announcing that a user 'Jane' has logged in at Virginia.

Figure 23B:
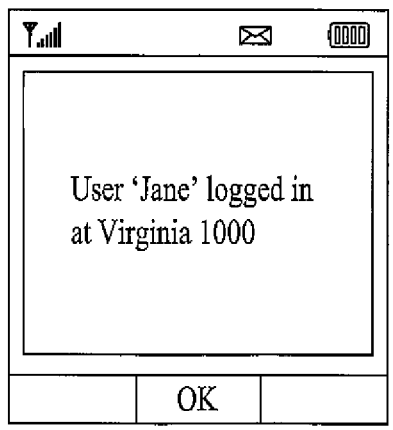

Referring to FIG. 23B, in case that intimacy/permission level with the first terminal 100A is level 2, the second terminal 100B is able to display a sentence announcing that a user 'Jane' has logged in at Virginia 1000.

Figure 23C:

Referring to FIG. 23C, in case that intimacy/permission level with the first terminal 100A is level 3, the second terminal 100B is able to display a sentence announcing that a user 'Jane' has logged in at Falls Church, Va. 1000.

Figure 23D:
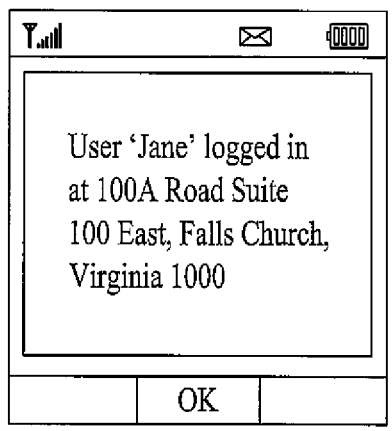

Referring to FIG. 23D, in case that intimacy/permission level with the first terminal 100A is level 4, the second terminal 100B is able to display a sentence announcing that a user 'Jane' has logged in at 100A Road Suite 100 East, Falls Church, Va. 1000.

Figure 24A:
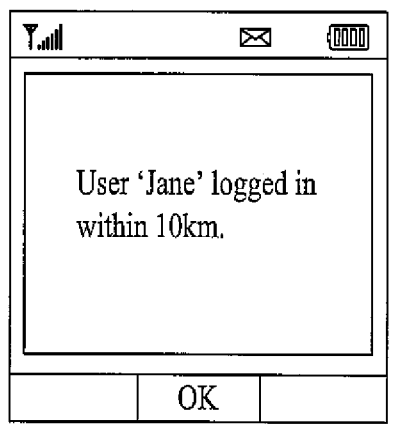
FIGS. 24A and 24B are state diagrams of a screen on which location information is displayed with reference to a distance of a mobile terminal according to one embodiment of the present invention.
Figure 24B:
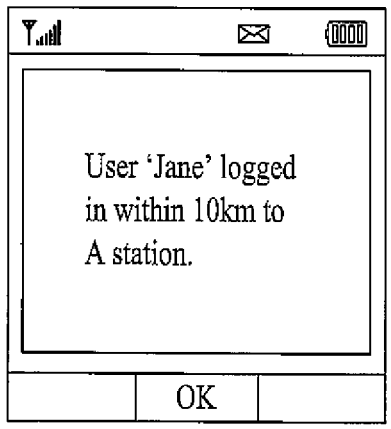

FIGS. 24A and 24B are state diagrams of a screen on which location information is displayed with reference to a distance of a first terminal 100A according to one embodiment of the present invention.

Referring to FIG. 24A, in case of deciding that the first terminal 100A is located within 10 km from the second terminal 100B, the second terminal 100B is able to display a sentence announcing that a user 'Jane' has logged in within 10 km.

Referring to FIG. 24B, in case of deciding that the first terminal 100A is located at a specific point, e.g., within 10 km from A station, the second terminal 100B is able to display a sentence announcing that a user 'Jane' has logged in within 5 km.

Figure 25:
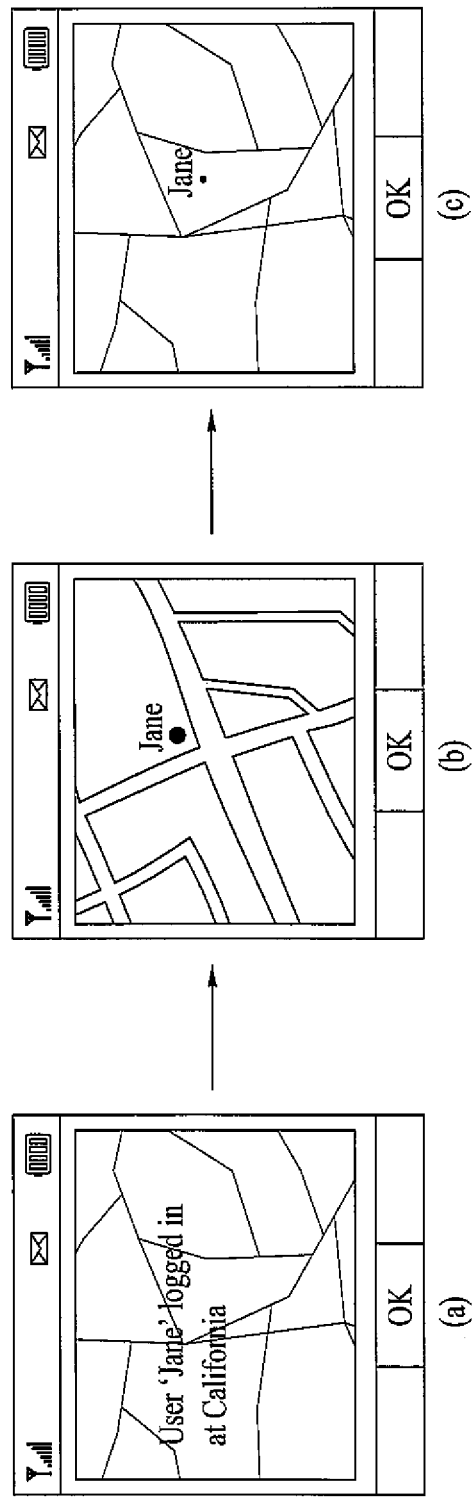
FIG. 25 is a state diagram of a screen on which information based on location on a mobile terminal according to one embodiment of the present invention is displayed using a map image.

FIG. 25 is a state diagram of a screen on which information based on location on a first terminal 100A is displayed using a map image according to one embodiment of the present invention.

Referring to (a) of FIG. 25, in case that the first terminal 100A logs in at a specific place, e.g., California, the second terminal 100B displays a map image on which a location of the first terminal 100A is displayed and also displays a sentence announcing that a user 'Jane' has logged in at California. For instance, the second terminal 100B is able to display more detailed administrative (e.g., postal) address information (e.g., Calif., San Francisco) or more generic address information (e.g., U.S.A.) in accordance with a resolution set for the first terminal 100A.

Referring to (b) of FIG. 25, the second terminal 100B zooms in a map image on a reduced scale of reference and then enlarges to display a location of the first terminal 100A on the zoomed-in map image. For instance, in accordance with a resolution set for the first terminal 100A, if a resolution level is equal to or greater than a predetermined level, a map image can be zoomed in on a reduced scale greater than a reference reduced scale. If a resolution level is smaller than a predetermined level, a map image can be zoomed in on a reduced scale smaller than a reference reduced scale.

Referring to (c) of FIG. 25, the second terminal 100B zooms out the map image and then keep displaying a location of the first terminal 100A on the zoomed-out map image.

FIGS. 26A to 26E are state diagrams of a screen on which location information is displayed in accordance with area correlation with a first terminal 100A according to one embodiment of the present invention. For clarity and convenience of explanation, it is assumed that a current location of a second terminal 100B is 'A Building, 100 A Road Suite 100 East, Falls Church, Va. 1000, U.S.A.'.

In this case, an area correlation means a matched extent of administrative (e.g., postal) address information. For instance, if the area correlation increases, detailed administrative (e.g., postal) address information is matched. If the area correlation decreases, generic detailed administrative (e.g., postal) address information is matched.

Figure 26A:
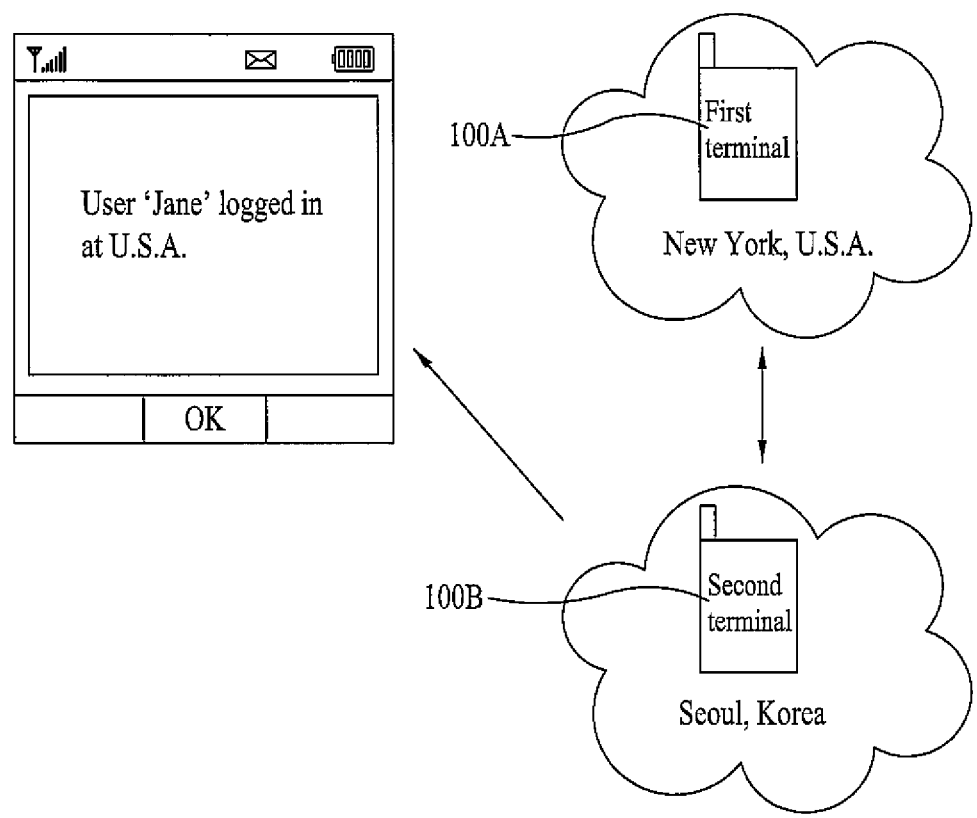
FIGS. 26A to 26E are state diagrams of a screen on which location information is displayed in accordance with area correlation with a mobile terminal according to one embodiment of the present invention.

Referring to FIG. 26A, in case that a current administrative (e.g., postal) address of the first terminal 100A is 'New York, U.S.A.', the second terminal 100B recognizes that the first terminal 100A is located at the country 'U.S.A.' different from that of the second terminal 100B and is then able to display a sentence announcing that a user 'Jane' has logged in at U.S.A.

Figure 26B:
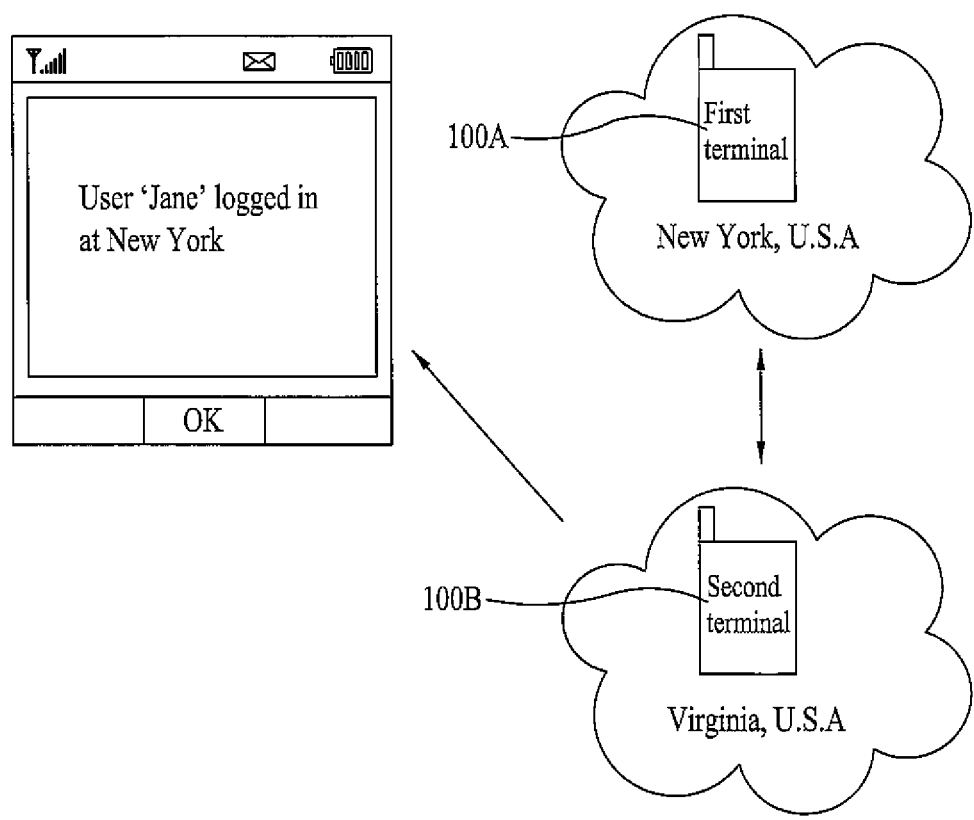

Referring to FIG. 26B, in case that a current administrative (e.g., postal) address of the first terminal 100A is 'New York, U.S.A.', the second terminal 100B recognizes that the first terminal 100A is located at a state/county/metropolitan area 'New York' different from that of the second terminal 100B and is then able to display a sentence announcing that a user 'Jane' has logged in at New York.

Figure 26C:
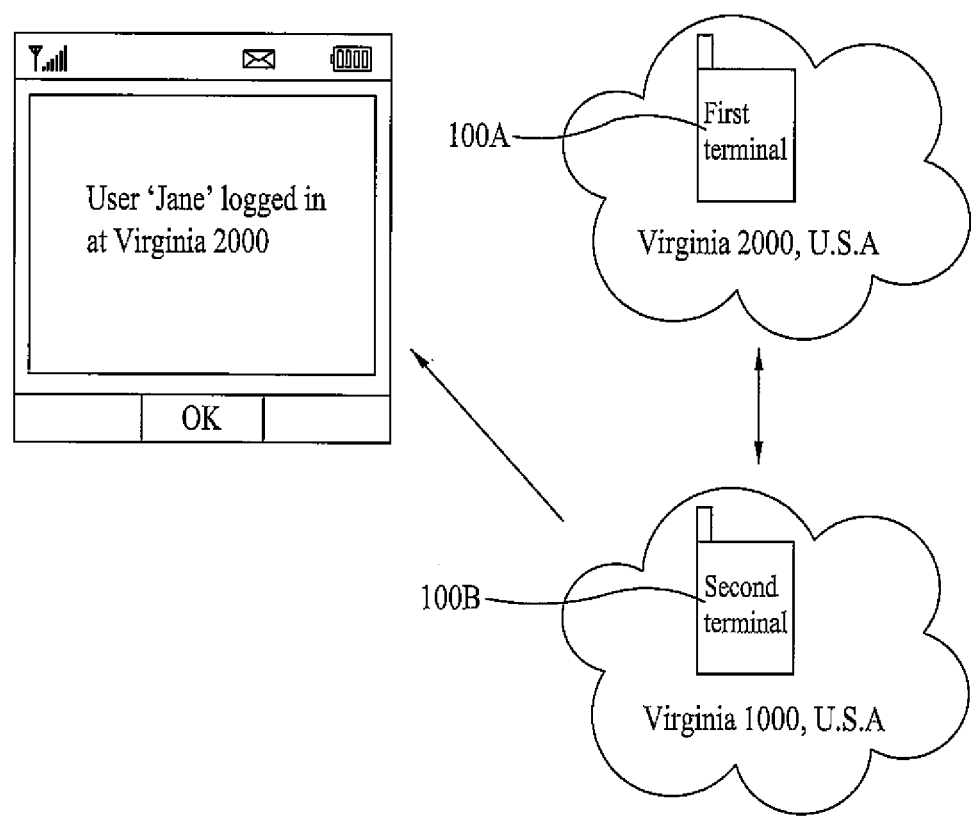

Referring to FIG. 26C, in case that a current administrative (e.g., postal) address of the first terminal 100A is 'Virginia 2000, U.S.A.', the second terminal 100B recognizes that the first terminal 100A is located at a location different from that of the second terminal 100B and is then able to display a sentence announcing that a user 'Jane' has logged in at Virginia 2000.

Figure 26D:
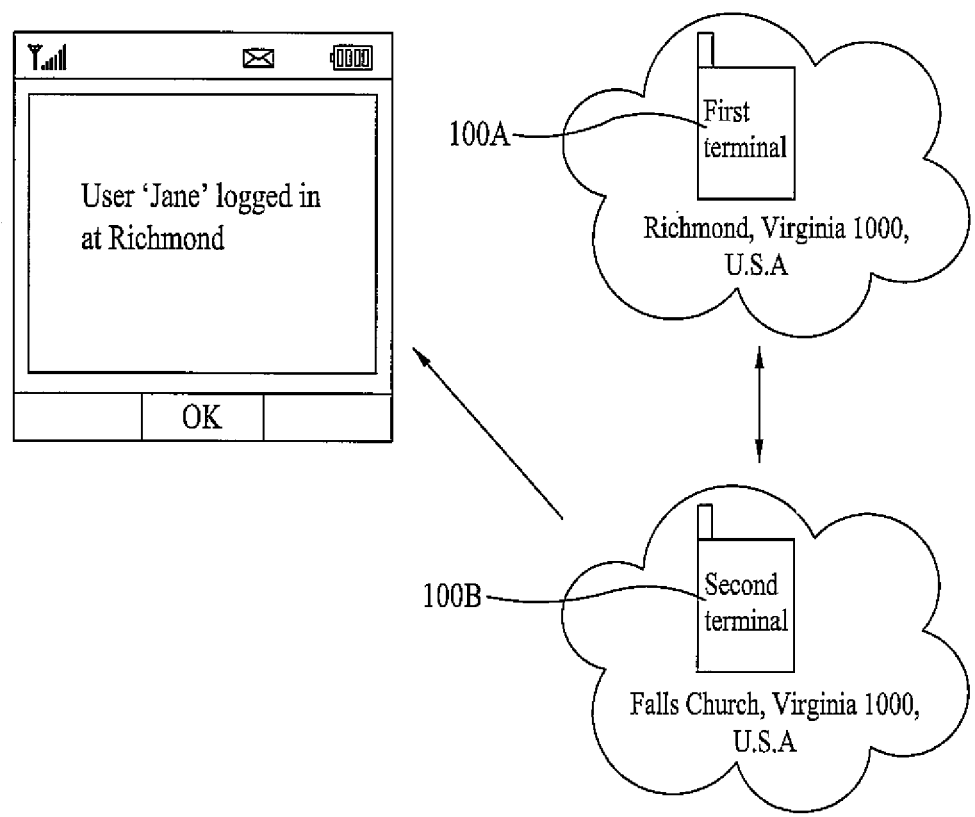

Referring to FIG. 26D, in case that a current administrative (e.g., postal) address of the first terminal 100A is 'Richmond, Va. 1000, U.S.A.', the second terminal 100B recognizes that the first terminal 100A is located at a city different from that of the second terminal 100B and is then able to display a sentence announcing that a user 'Jane' has logged in at Richmond.

Figure 26E:
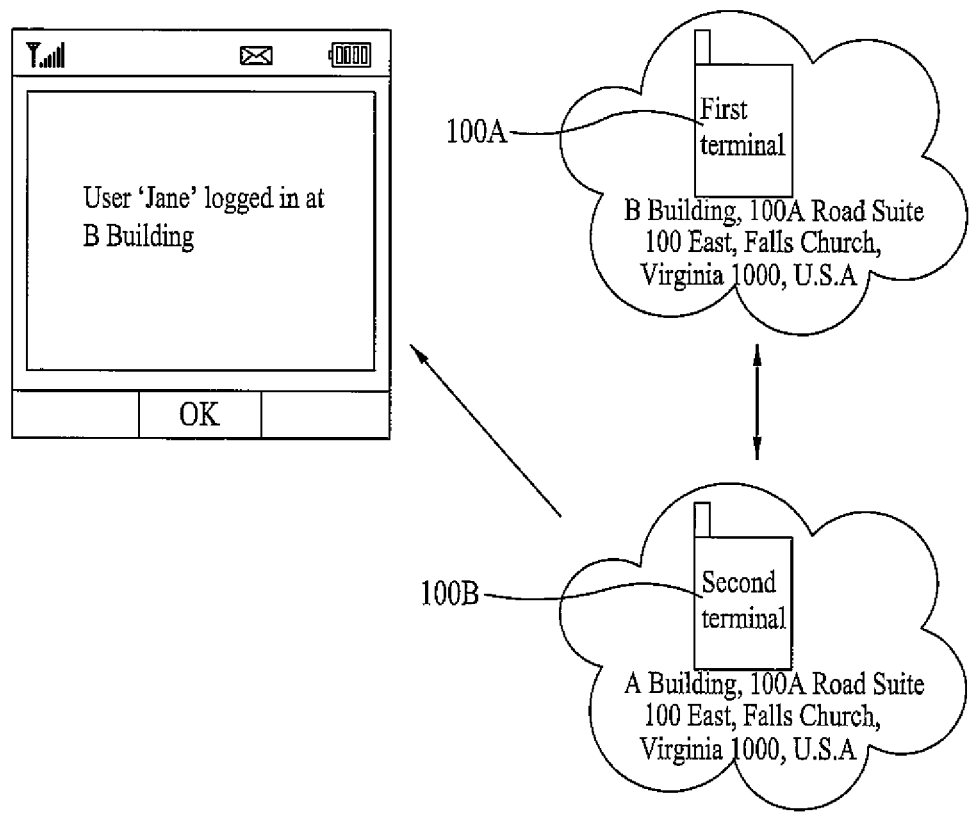

Referring to FIG. 26E, in case that a current administrative (e.g., postal) address of the first terminal 100A is 'B Building, 100 A Road Suite 100 East, Falls Church, Va. 1000, U.S.A', the second terminal 100B recognizes that the first terminal 100A is located at a B building different from that of the second terminal 100B and is then able to display a sentence announcing that a user 'Jane' has logged in at B Building.

In FIGS. 26A to 26E, it is understood that the second terminal 100B is able to display location information in accordance with intimacy/permission level or resolution set for the first terminal 100A.

In FIGS. 26A to 26E, although not shown in the drawings, the second terminal 100B may display a matched administrative (e.g., postal) address together.

Figure 27A:
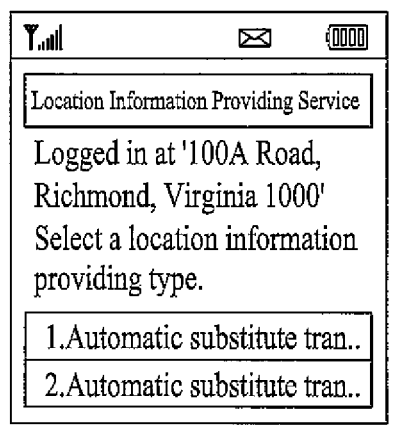
FIGS. 27A to 27C are state diagrams of a screen on which location information is displayed in accordance with a location information providing type in a mobile terminal according to one embodiment of the present invention.
Figure 27B:
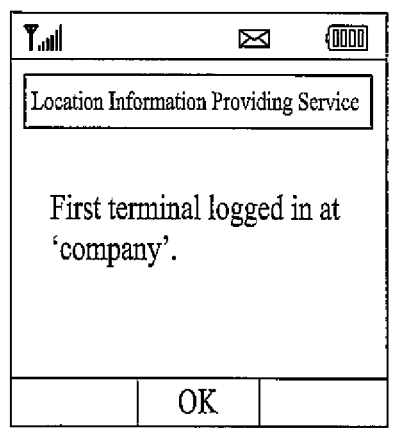
Figure 27C:
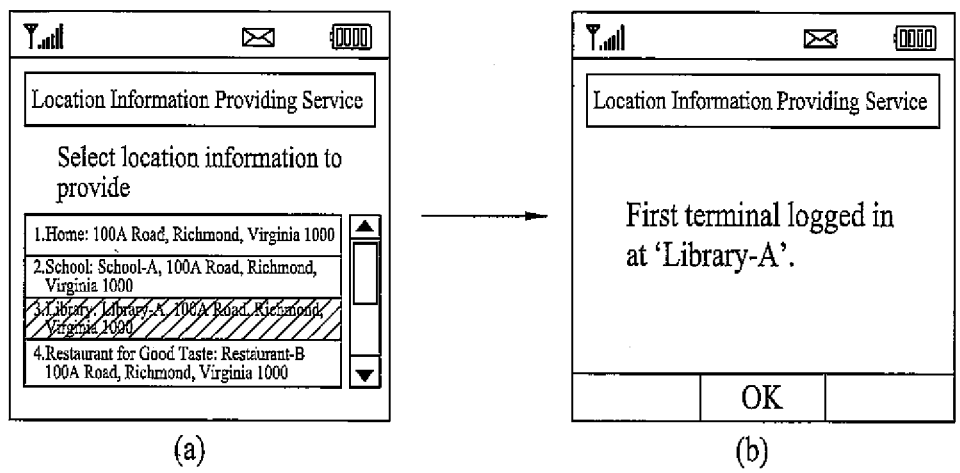

FIGS. 27A to 27C are state diagrams of a screen on which information based on location is displayed in accordance with a location information providing type in a mobile terminal according to one embodiment of the present invention. For convenience and clarity of explanation, it is assumed that current administrative (e.g., postal) address information on a first terminal 100A is '100 A Road, Richmond, Va. 1000'. And, it is also assumed that a place name set for this is 'company'.

Referring to FIG. 27A, the first terminal 100A displays a window for selecting either automatic substitute transmission or manual substitute transmission as a location information providing type. In this case, the automatic substitute transmission may mean that authentic information based on location and/or a place name set for the authentic information based on location is transmitted in transmitting information based on location on a first terminal 100A to other mobile terminals. And, the manual substitute transmission may mean that virtual information based on location and/or a place name set for the virtual information based on location is transmitted in transmitting information based on location on a first terminal 100A to other mobile terminals.

For instance, in case that the automatic substitute transmission is selected, the first terminal 100A transmits its authentic information based on location and/or a place name set for the authentic information based on location. Meanwhile, in case that the manual substitute transmission is selected, the first terminal 100A transmits information based on location, which is inputted/selected by a user or set beforehand, and/or a place name set for the information based on location.

In accordance with intimacy/permission level with the second terminal 100B, the first terminal 100A is able to set the automatic substitute transmission to default if the intimacy/permission level is high. The first terminal 100A is able to set the manual substitute transmission to default if the intimacy/permission level is low. This is because it is more necessary to provide the authentic information based on location if the intimacy/permission level increases.

In case that the automatic substitute transmission is selected by the first terminal 100A, the second terminal 100B, as shown in FIG. 27B, receives authentic administrative (e.g., postal) address information '100 A Road, Richmond, Va. 1000' and a place name 'company' set for it from the first terminal 100A and is then able to display a sentence announcing that the first terminal 100A has logged in at 'company'.

In case that the manual substitute transmission is selected by the first terminal 100A, the second terminal 100B, as shown in FIG. 27C, receives virtual administrative (e.g., postal) address information 'Library-A, Richmond, Va. 2000' and a place name 'library' set for it from the first terminal 100A and is then able to display a sentence announcing that the first terminal 100A has logged in at 'library'. As mentioned in the foregoing description, the administrative (e.g., postal) address information and place name set for it, which are transmitted in the manual substitute transmission, may mean virtual information based on location selected/generated in accordance with user's intention instead of real location information on the first terminal 100A.

In FIG. 27B and FIG. 27C, in case that a place name corresponding to the administrative (e.g., postal) address information received from the first terminal 100A is preset, the second terminal 100B may display the preset place name.

Second Embodiment

In the following description, a method of providing location information in accordance with a location information providing service according to one embodiment of the present invention shall be explained with reference to the accompanying drawings. In this case, it is assumed that a mobile terminal of the present invention and at least one mobile terminal agree on transmitting and receiving information based on location mutually via a location information providing service.

Figure 28:
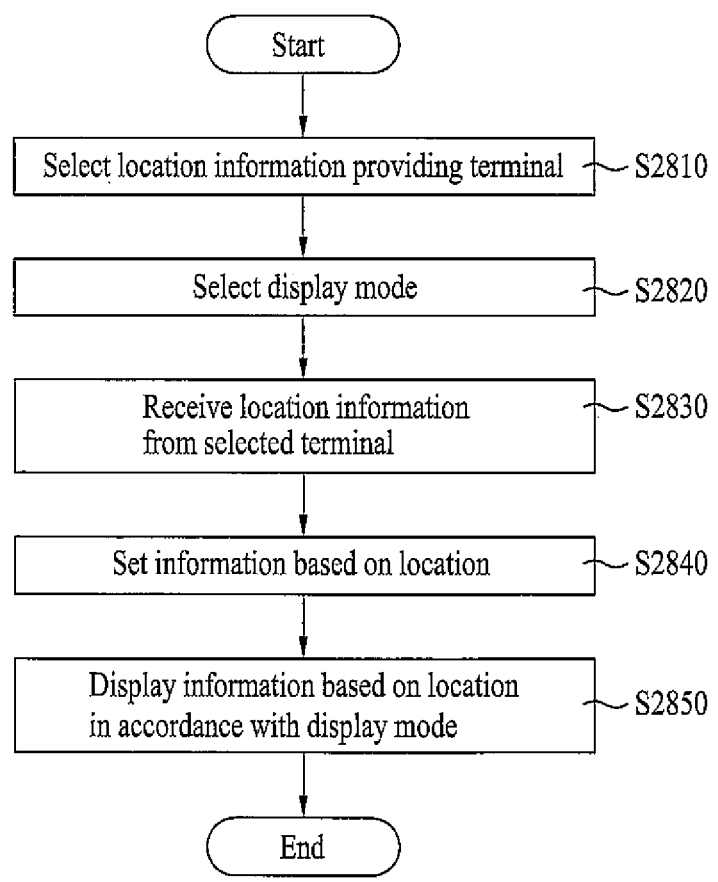
FIG. 28 is a flowchart of a location information providing process in accordance with a location information providing service access of a mobile terminal according to one embodiment of the present invention.

FIG. 28 is a flowchart of a location information providing process in accordance with a location information providing service access of a mobile terminal according to one embodiment of the present invention.

Referring to FIG. 28, a mobile terminal selects at least one mobile terminal (hereinafter named 'location information providing terminal') attempting to be provided with location information in accordance with user's manipulation of the user input unit 130 [S2810].

In this case, the location information may include coordinate information itself that indicates a location of the location information providing terminal or information based on location generated using coordinate information. In this case, the information based on location can be set by the location information providing terminal or a server (explained later). In case that the location information providing terminal already sets a resolution for the mobile terminal, the information based on location may be hierarchically generated to correspond to the resolution set for the mobile terminal.

The location information providing terminal selected in the selecting step S2810 may include a mobile terminal accessing (on) and/or non-accessing (of) the location information providing service among mobile terminals registered with the location information providing service or mobile terminals registered to mutually provide location information among the former mobile terminals registered with the location information providing service.

In particular, in case that a resolution for the location information providing terminal is set, the mobile terminal can select at least one location information providing terminal per a resolution level. For instance, it is able to select a location information providing terminal for which a specific level, a level over the specific level or a level below the specific level is set.

The selecting step S2810 is explained in detail with reference to FIGS. 29A to 2G as follows.

FIGS. 29A to 29G are state diagrams of a screen on which a process for selecting a location information providing terminal in a mobile terminal according to one embodiment of the present invention is shown.

Referring to FIG. 29A, the mobile terminal displays a condition list for selecting a location information providing terminal on a screen via the display 151.

For instance, the condition list can include a distance, a group, a place and the like.

In the following description, a selecting process of a location information providing terminal is explained in detail per a condition.

FIG. 29B is a state diagram of a screen on which a selecting process is displayed with reference to a distance from a mobile terminal.

Referring to (a) of FIG. 29B, if a distance is selected from a condition list, a mobile terminal is able to display a list of distances from the mobile terminal on a screen. For instance, if 'within 2 km from me' is selected from the per-distance list, the first terminal 100A is able to select all mobile terminals located within 2 km from the mobile terminal as location information providing terminals.

Referring to (b) of FIG. 29B, in case that a distance is selected from a condition list, if a specific distance is inputted by a user via a distance input window, the mobile terminal is able to display a sentence announcing that location information will be received from mobile terminals located within the inputted specific distance. For instance, if the inputted specific distance is 1 km, the mobile terminal is able to select all other mobile terminals located within 1 km from the former mobile terminal.

FIG. 29C is a state diagram of a screen on which a selecting process with reference to a distance from a specific place is displayed.

Referring to (a) or (b) of FIG. 29C, if a distance is selected from a condition list, a mobile terminal is able to select a specific place as a reference of a distance. In particular, the mobile terminal, as shown in (a) of FIG. 29C, is able to select a specific place corresponding to an address inputted by a user via an address input window. Alternatively, the mobile terminal, as shown in (b) of FIG. 29C, is able to select a specific place corresponding to an address selected using an address list.

For clarity and convenience of explanation, it is assumed that the specific place selected in (a) or (b) of FIG. 29C is 'A station'.

Referring to (c) of FIG. 29C, the mobile terminal is able to display a list of distances from A station on the screen. For instance, if 'within 2 km from A station' is selected from the per-distance list, the mobile terminal is able to select all other mobile terminal located within 2 km from A station as location information providing terminals.

Referring to (d) of FIG. 29C, if a user inputs a specific distance via a distance input window, the mobile terminal is able to display a sentence announcing that location information will be received from mobile terminals located within the inputted specific distance from A station. For instance, if the inputted specific distance is 1 km, the mobile terminal is able to select all other mobile terminals located within 1 km from A station.

FIG. 29D is a state diagram of a screen on which a selecting process with reference to a distance from a specific mobile terminal is displayed.

Referring to (a) of FIG. 29D, if a distance is selected from a condition list, the mobile terminal is able to display at least one mobile terminal having agreed to mutually provide location information via a location information providing service. In this case, the mobile terminal is able to display the mobile terminal list using at least one of a name registered with a location information providing service, a phone number and a name set for a phone number stored in the mobile terminal.

For clarity and convenience of explanation, it is assumed that 'Chulsoo' is selected from the mobile terminal list displayed on the screen shown in (a) of FIG. 29D.

Referring to (b) of FIG. 29D, the mobile terminal is able to display a list of distances from Chulsoo on the screen. For instance, if 'within 2 km from Chulsoo' is selected from the per-distance list, the mobile terminal is able to select all other mobile terminal located within 2 km from Chulsoo as location information providing terminals.

Referring to (c) of FIG. 29D, if a user inputs a specific distance via a distance input window, the mobile terminal is able to display a sentence announcing that location information will be received from mobile terminals located within the inputted specific distance from Chulsoo. For instance, if the inputted specific distance is 1 km, the mobile terminal is able to select all other mobile terminals located within 1 km from Chulsoo.

Figure 29E:
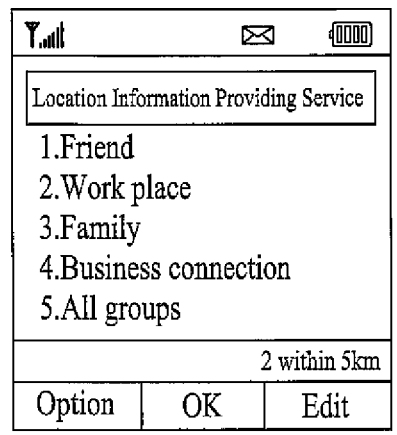

FIG. 29E is a state diagram of a screen on which a selecting process with reference to a group set by a mobile terminal is displayed.

Referring to FIG. 29E, a mobile terminal is able to display a per-group list on a screen. And, the mobile terminal is able to select mobile terminals belonging to a group selected from the per-group list as location information providing terminals.

In this case, the group means a specific category to which at least one mobile terminal having agreed to provide mutual location information via a location information providing service belongs. And, the group may be set by a user or may be beforehand set in the mobile terminal. In setting groups, if a group on a phonebook interoperates with a group on a location information providing service, the mobile terminal is able to reflect the group set on the phonebook.

The mobile terminal is able to display information on a currently activated group in the per-group list. For instance, if a group 'friend' is activated, the mobile terminal is able to display a sentence ['within 5 km: 2, total:8], which announces that two mobile terminals among total eight mobile terminals belonging to the group 'friend' are located within a predetermined distance (e.g., 5 km), on a lower end portion of the screen.

If 'option' area is activated using a soft key, the mobile terminal performs an operation of group addition and/or group deletion and the like. If 'edit' area is activated using a soft key, the mobile terminal performs an operation of group editing or the like.

Figure 29F:
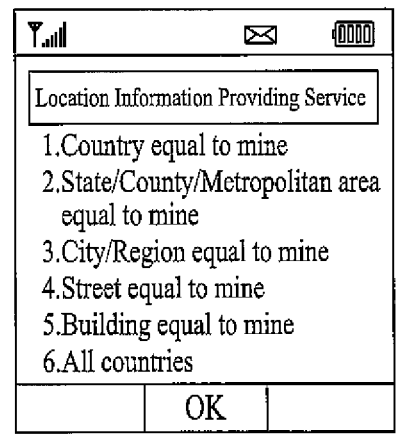

FIG. 29F is a state diagram of a screen on which a selecting process with reference to a place where a mobile terminal is located is displayed.

Referring to FIG. 29F, if a place is selected from a condition list, a mobile terminal is able to display a place list with reference to area correlation with the mobile terminal. In this case, the place list can include country equal to mine, state/county/metropolitan area equal to mine, 'city'/'region (i.e., zip code)' equal to mine, 'street' equal to mine, building equal to mine and the like. For instance, if 'street' equal to mine' is selected from a place list, the mobile terminal is able to select other mobile terminals located at the same 'street' of the mobile terminal as location information providing terminals.

Figure 29G:
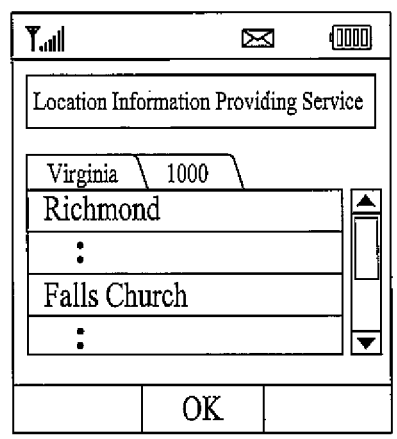

FIG. 29G is a state diagram of a screen on which a selecting process with reference to a specific place inputted to a mobile terminal is displayed.

Referring to FIG. 29G, a mobile terminal is able to select other mobile terminals, which are located at a specific administrative (e.g., postal) address selected using an address list, as location information providing terminals.

Returning to FIG. 28, the mobile terminal selects a mode (hereinafter named 'display mode') for displaying information based on location on the location information providing terminal selected in the selecting step S2810 [S2820]. In this case, the selecting step S2820 can be carried out by user's manipulation of the user input unit 130 or can be randomly executed by the mobile terminal.

Figure 30:
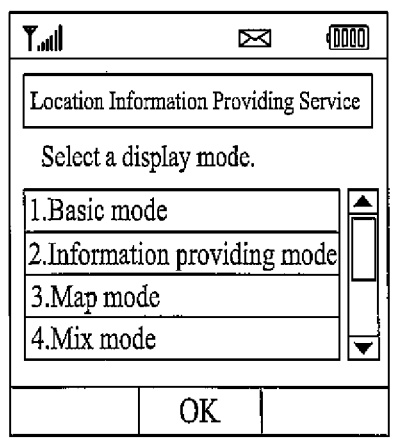
FIG. 30 is a state diagram of a screen on which a display mode list is displayed in a mobile terminal according to one embodiment of the present invention.

The mobile terminal is able to display a display mode list, as shown in FIG. 30, including display modules selectable via the display 151 to help a user select a display mode. So, the user is able to select a specific display mode from the display mode list shown in FIG. 30.

For instance, the display modes can include a basic mode, an information providing mode, a map mode, a mix mode and the like. The respective display modes will be explained in detail later.

The mobile terminal receives location information from the location information providing terminal selected in the selecting step S2820 via the wireless communication unit 110.

For instance, the mobile terminal uses the broadcast receiving module 111 in case of receiving location information via a broadcasting network. The mobile terminal uses the mobile communication module 112 in case of receiving location information via a mobile communication network. The mobile terminal uses the wireless internet module 113 in case of receiving location information via wireless internet. And, the mobile terminal uses the short-range communication module 114 in case of receiving location information via a short-range communication network.

Moreover, the mobile terminal is able to receive location information on the location information providing terminal from a server. In this case, the server means a server for managing location information on at least one or more mobile terminals registered with the location information providing service. So, the server receives corresponding location information from the location information providing terminal and stores and/or manages the received location information. And, the server is also able to transmit the location information to a specific mobile terminal.

Optionally, in some cases, the receiving step S2830 may be executed prior to the display mode selecting step S2820.

The mobile terminal sets information based on location on the location information providing terminal using the location information received in the receiving step S2830 [S2840]. Meanwhile, if the information based on location is received in the receiving step S2830, it is able to omit the setting step S2840. And, it is able to set new information based on location using the received information based on location.

In particular, in case that a resolution is set for the location information providing terminal, the mobile terminal is able to hierarchically set information based on location to correspond to the set resolution. For instance, assuming that detailed information based on location is provided in accordance with a higher level of the set resolution, the mobile terminal is able to set further detailed information based on location in accordance with a higher level of the resolution set as Table 1.

In this case, the information based on location can include at least one selected from the group consisting of absolute information based on an absolute location of the location information providing terminal, relative information based on a relative location between the mobile terminal and the location information providing terminal, and accumulative information in accordance with accumulation of the absolute information and the relative information. For instance, the absolute information can include administrative (e.g., postal) address information on a point where the location information providing terminal is located, POI information, setup name information, area information and the like. The relative information can include a distance of the location information providing terminal from the mobile terminal, traffic status information and the like. The accumulative information can include a moving direction of the location information providing terminal with reference to a location of the mobile terminal, a moving speed thereof and the like.

In case of deciding that a location of the location information providing terminal has been changed, the mobile terminal is able to set information based on location on the changed location. For instance, if coordinate information previously received and stored differs from currently received coordinate information, the mobile terminal can decide that a location of the location information providing terminal has been changed. And, the mobile terminal is able to set new information based on location using the currently received coordinate information.

The mobile terminal displays the information based on location received in the receiving step S2830 via the display 151. In particular, the mobile terminal displays the received information based on location in accordance with the display mode selected in the selecting step S2820 [S2850].

In the following description, the displaying step S2850 is explained in detail with reference to FIGS. 31A to 35. For clarity and convenience of explanation, it is assumed that mobile terminals belonging to a specific group are selected as location information providing terminals.

Figure 31A:
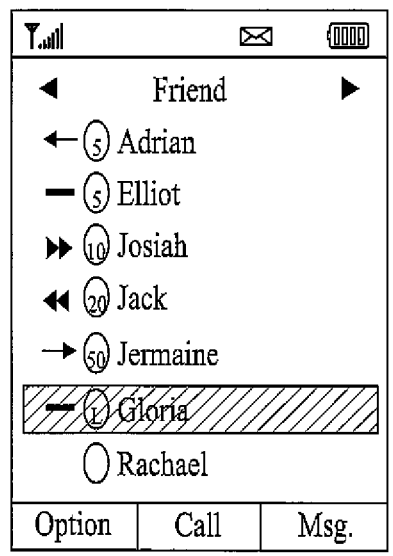
FIG. 31A and FIG. 31B are state diagrams of a screen on which a location information displaying process is displayed in accordance with a basic mode.
Figure 31B:
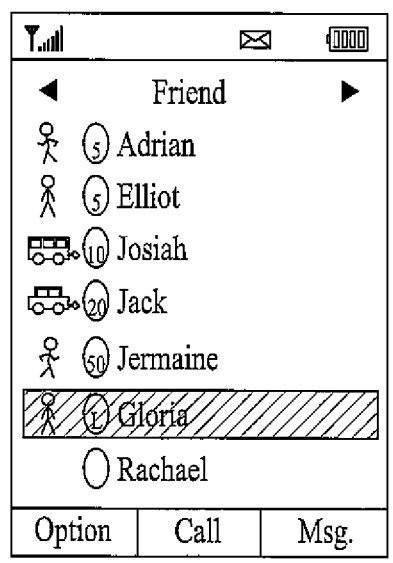

FIG. 31A and FIG. 31B are state diagrams of a screen on which a location information displaying process is displayed in accordance with a basic mode. In this case, a basic mode means a mode for displaying basic information based on location on location information providing terminals. For instance, the basic information based on location can include distance information, direction information, speed information and the like. For clarity and convenience of explanation, it is assumed that 'friend' is selected from a plurality of groups.

Referring to FIG. 31A and FIG. 31B, the mobile terminal displays names respectively set for mobile terminals belonging to a group 'friend' and also displays a distance from the former mobile terminal, a moving direction with reference to the former mobile terminal, and a moving speed with reference to the former mobile terminal as basic information based on location on the location information providing terminal corresponding to each of the latter mobile terminals.

For instance, '◄◄' indicates that the latter mobile terminal recedes fast from the former mobile terminal, '_' indicates that the latter mobile terminal recedes from the former mobile terminal, '-' indicates that the latter mobile terminal barely moves '→' indicates that the latter mobile terminal moves on toward the former mobile terminal, and '►►' indicates that the latter mobile terminal moves on toward the former mobile terminal fast.

'Left-running car icon' indicates that the latter mobile terminal recedes from the former mobile terminal at a speed over 30 km/h, 'left-running car icon' indicates that the latter mobile terminal recedes from the former mobile terminal at a speed between 20~30 km/h, and 'left-walking man icon' indicates that the latter mobile terminal recedes from the former mobile terminal at a speed between 5~20 km/h. 'Standing man icon' indicates that the latter mobile terminal stands still or moves on toward the former mobile terminal at a speed below 5 km/h, 'right-walking man icon' indicates that the latter mobile terminal moves on toward the former mobile terminal at a speed between 5~20 km/h, 'right-running bus icon' indicates that the latter mobile terminal moves on toward the former mobile terminal at a speed between 20~30 km/h, and 'right-running car icon' indicates that the latter mobile terminal moves on toward the former mobile terminal at a speed over 30 km/h.

And, a numeral represented within an oval indicates a distance from the mobile terminal to the location information providing terminal corresponding to each of the names. Meanwhile, 'L' within an oval indicates that the location information providing terminal is located outside a predetermined distance. And, an oval having nothing therein indicates that a location of the location information providing terminal is not obtained. Besides, it is able to indicate a distance of the location information providing terminal using a color of an oval.

Icons shown in FIG. 31A and FIG. 31B may be beforehand stored in the mobile terminal. A distance, icon, per-icon speed, color, font and the like can be set by a user or can be set as defaults by the mobile terminal.

Figure 32A:
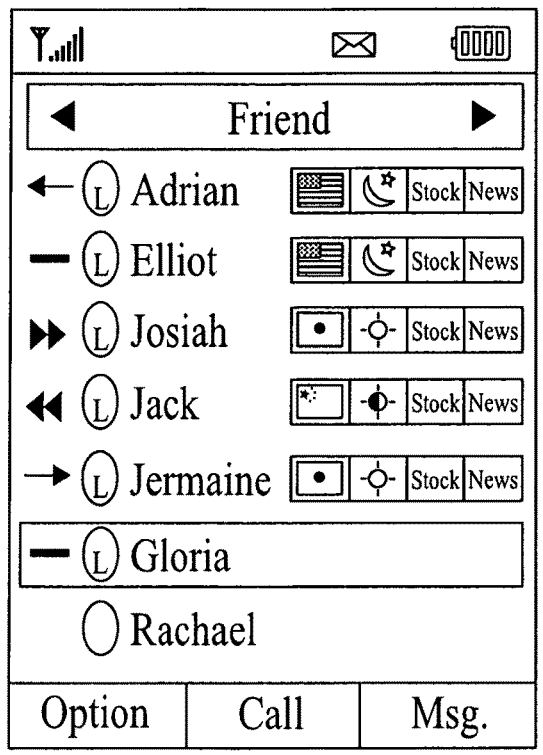
FIG. 32A and FIG. 32B are state diagrams of a screen on which a location information displaying process is displayed in accordance with an information providing mode.
Figure 32B:
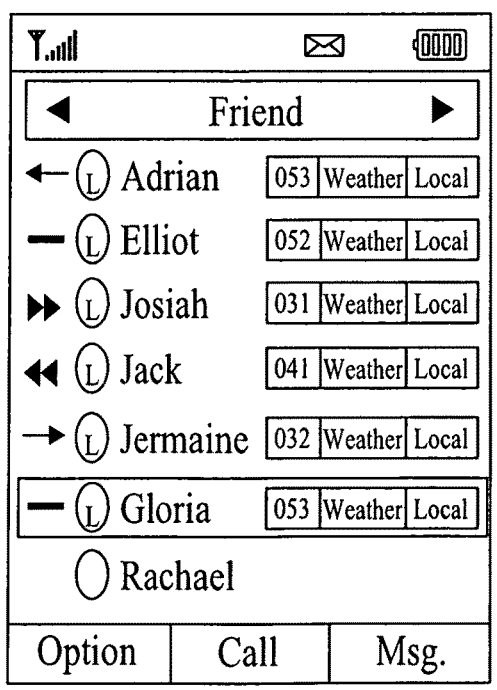

FIG. 32A and FIG. 32B are state diagrams of a screen on which a location information displaying process is displayed in accordance with an information providing mode. In this case, an information providing mode means a mode for variously providing information relevant to a country and/or city to which location information providing terminal corresponding to each name in addition to information based on location provided in the above-mentioned basic mode. For clarity and convenience of explanation, it is assumed that 'friend' is selected from a plurality of groups.

Referring to FIG. 32A and FIG. 32B, a mobile terminal displays names respectively set for mobile terminals belonging to a group 'friend' and also displays icons announcing that information relevant to a country and/or city where a location information providing terminal corresponding to each of the names is located can be provided.

In FIG. 32A, if the location information providing terminal is located at a foreign country, the mobile terminal displays icons indicating that information on a country where the location information providing terminal is located, time information, stock information, news information and the like can be provided. If a specific icon is selected by a user, the mobile terminal is able to display information corresponding to the selected icon. For instance, if 'national flag icon' is selected, the mobile terminal displays information relevant to country. If 'time icon' is selected, the mobile terminal displays information relevant to time and weather of the corresponding country. If 'stock icon' is selected, the mobile terminal displays stock information on the corresponding country. If 'news icon' is selected, the mobile terminal displays major news of the corresponding country.

In this case, the displayed information relevant to the country and/or city, at which the location information providing terminal is located, is provided in a manner that wireless internet is accessed by selecting an icon or can be received from the location information providing terminal together with location information.

In FIG. 32B, if the location information providing terminal is located at a different city in the same country, the mobile terminal respectively displays icons indicating that city information, weather information, local information and the like of the city where the location information providing terminal is located. If a user selects a specific icon, the mobile terminal is able to display information corresponding to the selected specific icon. For instance, if 'are code icon' is selected, the mobile terminal displays information relevant to the corresponding city. If 'weather icon' is selected, the mobile terminal displays weather information on the corresponding city. If 'local information icon' is selected, the mobile terminal is able to display local news of the corresponding city.

FIGS. 33A to 33D are state diagrams of a screen on which a location information displaying process is displayed in accordance with a map mode. In this case, the map mode means a mode for providing information based on location on a location information providing terminal using a map image. For clarity and convenience of explanation, it is assumed that 'friend' is selected from a plurality of groups.

A mobile terminal is able to carry out the map mode by setting at least one selected from the group consisting of a specific area (e.g., country unit, state unit, city unit, 'region (i.e., zip code)' unit, 'neighborhood' unit, etc.), an area where a biggest number of location information providing terminals are located, a predetermined distance/area with reference to me, and a predetermined distance/area with reference to a specific place/location information providing terminal.

Figure 33A:
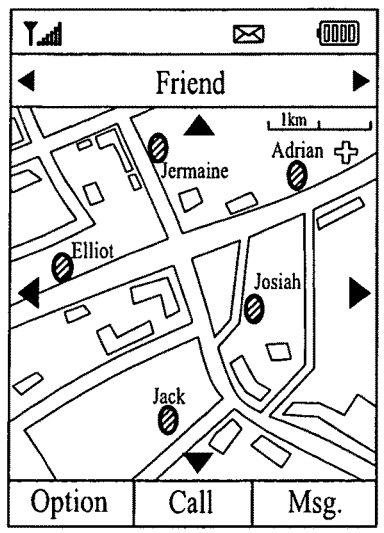

Referring to FIG. 33A, a mobile terminal displays locations of location information providing terminals belonging to a group 'friend' on a map image. In this case, it is able to display the locations using icons corresponding to the location information providing terminals, respectively. And, a name set for the corresponding location information providing terminal can be displayed together with the corresponding icon.

The mobile terminal is able to activate at least one selected from the group consisting of a group name, a map image and an individual icon. For instance, the mobile terminal is able to move on to another group while the group name is activated. The mobile terminal is able to increase and/or decrease a reduced scale while the map image is activated. The mobile terminal is able to shift a center on the map image while the map image is activated. And, the mobile terminal is able to transmit a call or message to the location information providing terminal corresponding to the individual icon while the individual icon is activated. In this case, the activation can be carried out using a direction key or a soft key. And, the activation can be carried out by touching a touchscreen if the screen includes a touchscreen.

Figure 33B:
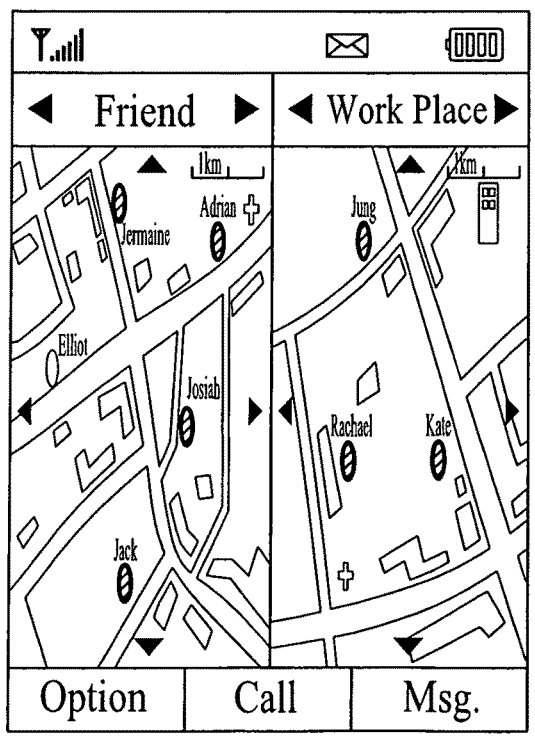

Referring to FIG. 33B, the mobile terminal divides a screen into two areas and then provides information based on location on location information providing terminals belonging to a first group (e.g., 'friend') using a map image in the first area. And, the mobile terminal is able to provide information based on location on location information providing terminals belonging to a second group (e.g., 'work place') using a map image in the second area.

Figure 33C:
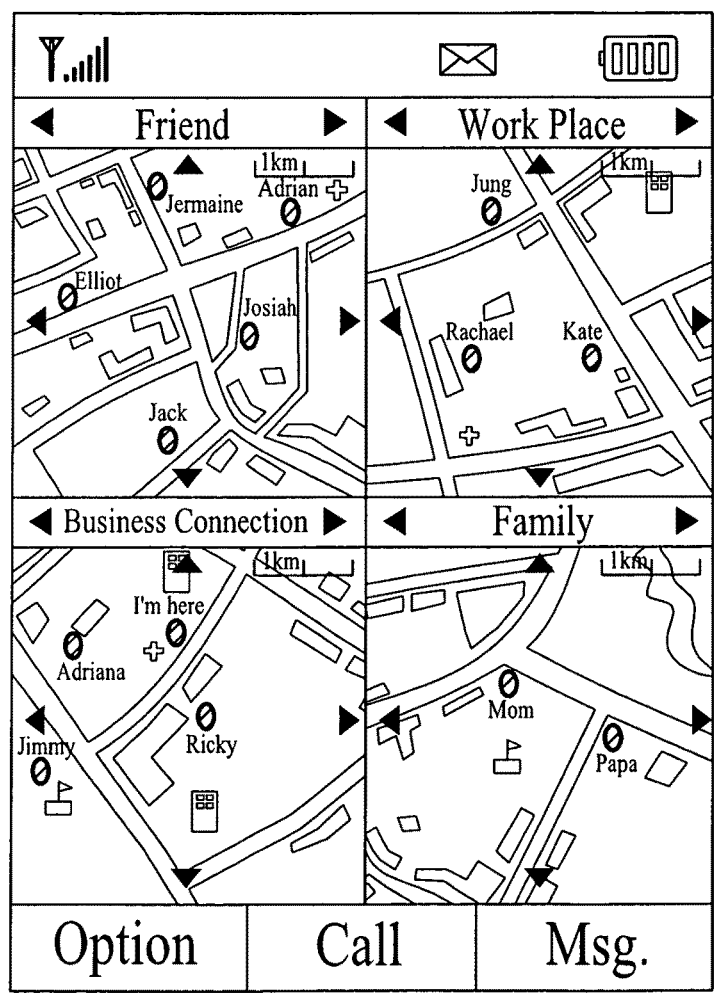

Referring to FIG. 33C, the mobile terminal divides a screen into four areas and then provides information based on location on location information providing terminals belonging to each group using a map image in each of the divided areas. It is understood that a division count is not limited.

Referring to FIG. 33B and FIG. 33C, the mobile terminal divides the screen into a plurality of areas and then provides a map image, on which locations of location information providing terminals belonging to a specific group are displayed, in each of a plurality of the areas.

Although not shown in the drawing, in providing a map image for each group, if a tag corresponding to a specific group is selected from a group list provided in a tag format, the mobile terminal is able to display a map image, on which locations of location information providing terminals belonging to the group corresponding to the selected tag are displayed, on a screen.

Although not shown in the drawing, the mobile terminal is able to display location information on a location information providing terminal selected in accordance with a different setting condition (e.g., per an area, per-distance, etc.) from the same group in a each of plurality of areas. For instance, this is usable for a case that a plurality of conditions including 'Richmond', '5 km from me', 'area where a biggest number of terminals belonging to a group are located' and the like are set within a group 'friend'.

Referring to FIG. 33D, a mobile terminal is able to provide information based on location using a map image to correspond to a resolution set for a location information providing terminal. For clarity and convenience of explanation, it is assumed that a reduced scale is increased in proportion to a resolution level. So, if a resolution level increases, a location of a location information providing terminal can be displayed on a map image in more detail.

For instance, if a resolution level, as shown in (a) of FIG. 33D, is 'fifth level', a mobile terminal is able to display a location of a location information providing terminal on a map image on a reduced scale of 1/100,000.

If a resolution level, as shown in (b) of FIG. 33D, is 'fourth level', a mobile terminal is able to display a location of a location information providing terminal on a map image on a reduced scale of 1/50,000.

If a resolution level, as shown in (c) of FIG. 33D, is 'third level', a mobile terminal is able to display a location of a location information providing terminal on a map image on a reduced scale of 1/10,000.

Figure 34A:
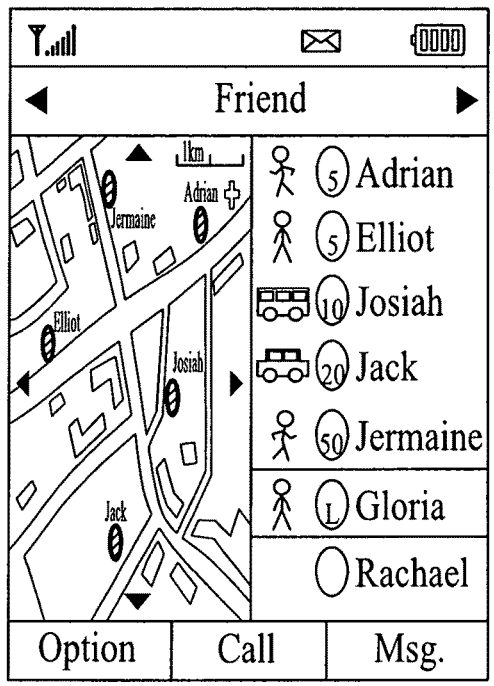
FIGS. 34A to 34C are state diagrams of a screen on which a location information displaying process is displayed in accordance with a mix mode.
Figure 34B:
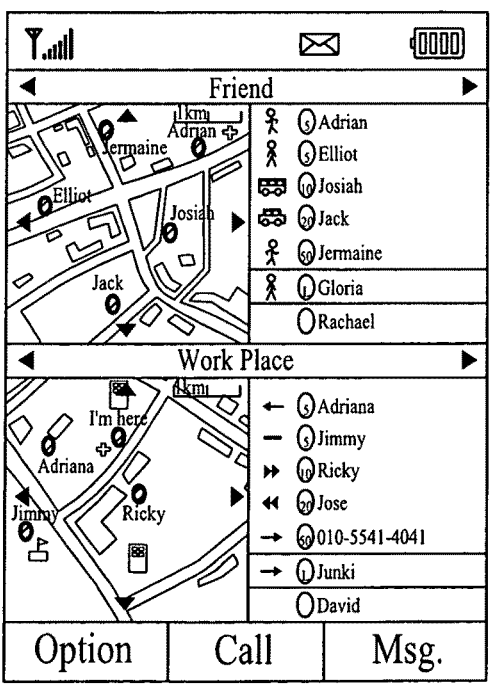
Figure 34C:
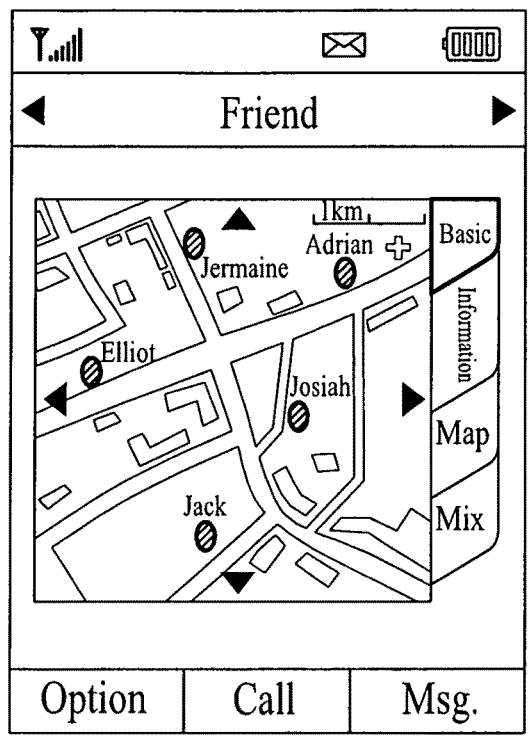

FIGS. 34A to 34C are state diagrams of a screen on which a location information displaying process is displayed in accordance with a mix mode. In this case, the mix mode means a mode fro providing information based on location in a manner of mixing the basic mode, the information providing mode, the map mode and the like with each other.

Referring to FIG. 34A, for a group 'friend', a mobile terminal is able to provide information based on location in a mixed type of a map mode and a basic mode.

Referring to FIG. 34B, for a group 'friend' and a group 'business connection' each, a mobile terminal is able to provide information based on location in a mixed type of a map mode and a basic mode.

Referring to FIG. 34C, in case that a display mode list is provided in a tag format, if a tag corresponding to a specific display mode is selected, a mobile terminal is able to provide information based on location in accordance with a display mode corresponding to the selected tag.

Figure 35:
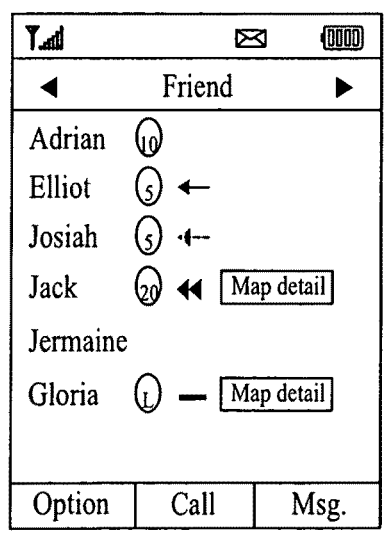
FIG. 35 is a state diagram of a screen on which a process for displaying information based on location hierarchically generated in accordance with resolution is displayed.

FIG. 35 is a state diagram of a screen on which a process for displaying information based on location hierarchically generated in accordance with resolution is displayed.

Referring to FIG. 35, in accordance with a resolution set for a location information providing terminal, a mobile terminal displays a distance from me only [Andrian], a distance and moving direction/speed from me [Elliot], a distance and moving direction from me [Josiah], a distance and moving direction/speed from me and a map image having a location displayed thereon if 'map detail' is activated [Jack, Gloria], or 'accessed' only [Jermaine].

Third Embodiment

In the following description, a method of using a supplementary service using a map, on which a location of a different terminal is displayed, in case of accessing a location information providing service according to one embodiment of the present invention is explained with reference to the accompanying drawings.

The mobile terminal 100 according to one embodiment of the present invention is able to display information on a correspondent terminal (hereinafter named 'correspondent terminal') mutually registered using a location information providing service as a medium. So, the mobile terminal 100 and the correspondent terminal can provide information containing location information to each other using the location information providing service as a medium.

Figure 36:
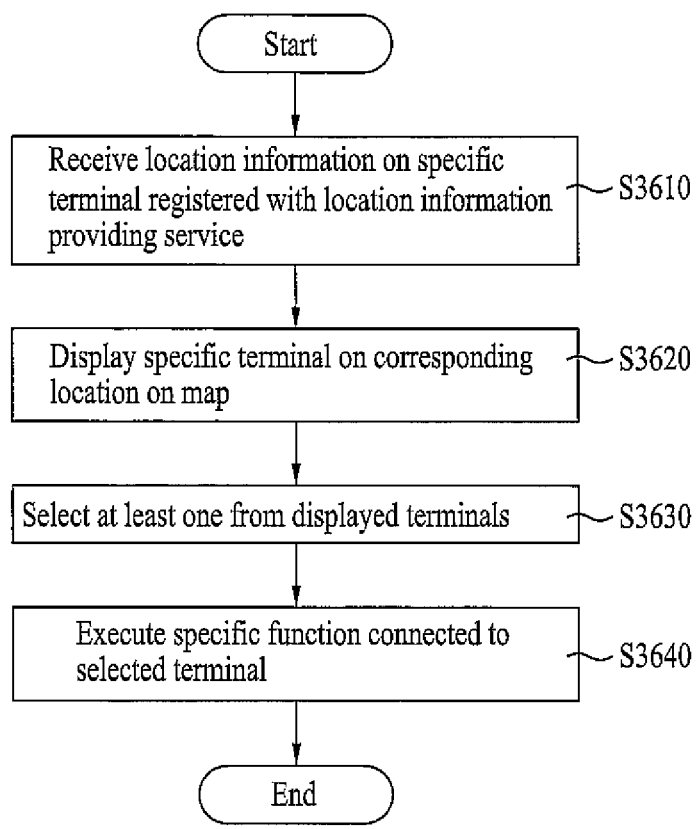
FIG. 36 is a flowchart for a method of performing a function in a mobile terminal according to one embodiment of the present invention.

FIG. 36 is a flowchart for a method of performing a function in a mobile terminal according to one embodiment of the present invention.

Referring to FIG. 36, the mobile terminal 100 is able to receive location information on a correspondent terminal via the wireless communication unit 110 [S3610]. The reception of the location information on the correspondent terminal can be performed by real time or with a prescribed time interval. In this case, the prescribed time can be decided based on resolution. For instance, if a resolution level is 1, location information on the correspondent terminal is received with 1-minute interval. If a resolution level is 5, location information on the correspondent terminal is received with 10-minute interval.

The controller 180 is able to display information, which contains the location information on the correspondent terminal, on the correspondent terminal on the display 151. The information on the correspondent terminal can be displayed in various ways. For instance, a location of the correspondent terminal can be displayed as an icon type on a map [S3620]. In particular, the controller 180 is able to display a map, on which the location of the correspondent terminal is displayed, on the display 151. The controller 180 is able to change a central point of the displayed map in accordance with a reference. As the central point is changed, a displayed correspondent terminal may vary.

FIG. 37 is a diagram of a map displayed on a screen of a mobile terminal according to one embodiment of the present invention, in which a location of a correspondent terminal is displayed on the map in accordance with a specific reference.

The specific reference can be determined in various ways. For instance, a current location of the mobile terminal 100, as shown in (a) of FIG. 37, can be the specific reference. Namely, a correspondent terminal located within a prescribed distance centering on the current location of the mobile terminal 100 can be displayed on the map. In this case, a user is able to know what kind of a correspondent party is located around the user.

Referring to (b) of FIG. 37, a location of one of a plurality of terminals registered with a location information providing service can become a specific reference. For instance, a correspondent terminal can be displayed on a map centering on a current location of a terminal that uses an ID 'Jermaine'. In this case, a user is able to know what kind of correspondent party is located around the correspondent party having the ID 'Jermaine'.

Referring to (c) of FIG. 37, a specific area can become a specific reference. For instance, a correspondent terminal located within a prescribed distance centering on 'A station' can be displayed on a map. In this case, a user is able to know what kind of a correspondent party is located around 'A station'.

According to one embodiment of the present invention, the controller 180 is able to group a plurality of correspondent terminals in accordance with a specific reference. And, a location of a corresponding terminal can be displayed on a map separate for each group formed by the grouping. In particular, a location of a correspondent terminal belonging to a first group is displayed on a first map and a location of a correspondent terminal belonging to a second group is displayed on a second map. This example is shown in FIG. 38.

Referring to FIG. 38, four groups are formed by the grouping. Each of the formed groups is represented as a tab on an upper end of a screen. If a specific one of the displayed tabs is selected, the controller 180 is able to display a map on which a location of a correspondent terminal belonging to a group connected to the selected tab is displayed.

Referring to (a) of FIG. 38, if a tab 'friend' is selected, a location of a correspondent terminal belonging to a group connected to the selected tab 'friend' is displayed on a map. In particular, a terminal belonging to the group 'friend' is selected from correspondent terminals located within a prescribed distance centering on a specific area and the selected terminal is displayed on a corresponding location on the map. The group 'friend' means one of groups managed by a location information providing service.

Referring to (b) of FIG. 38, if a tab 'A station' is selected, a location of a correspondent terminal belonging to a group connected to the selected tab 'A station' is displayed on a map. In particular, the correspondent terminal located within a prescribed distance centering on 'A station' is displayed on a corresponding location on the map.

Referring to (c) of FIG. 38, if a tab 'Chulsoo' is selected, a location of a correspondent terminal belonging to a group connected to the selected tab 'Chulsoo' is displayed on a map. In particular, the correspondent terminal located within a prescribed distance centering on a location of a terminal corresponding to an ID 'Chulsoo' is displayed on a corresponding location on the map.

According to (a) to (c) of FIG. 38, the controller 180 can display the selected tab in a manner of discriminating the selected tab from other tabs.

According to one embodiment of the present invention, if a specific condition is satisfied, the controller 180 groups correspondent terminals and automatically generates a map on which the grouped correspondent terminals are displayed. For instance, if at least five or more correspondent terminals are located within a radius 5 km centering on A station, the controller 180 automatically generates a map on which the at least five terminals are displayed. The controller 180 then displays the generated map on the display 151.

According to one embodiment of the present invention, a reduced scale of a map to be seen can be determined in accordance with a resolution. The resolution can be set different in accordance with an area. For instance, the resolution can be differentially set based on user's activity. For instance, a resolution level for an area having a relatively high activity time of user is set to 1, while a resolution level for an area having a relatively low activity time of user is set to 1.

It is able to determine the resolution based on information opening extent set per a terminal. The information opening extent can be determined based on intimacy/permission level with a correspondent terminal. The intimacy/permission level can be set per a correspondent terminal. If a correspondent terminal is managed as a group, the intimacy/permission level can be determined per the corresponding group. Namely, the resolution can be determined in accordance with the intimacy/permission level. For instance, if intimacy/permission level is 10, a resolution level is set to 1. If intimacy/permission level is 5, a resolution level is set to 3.

FIG. 39 is a diagram of a screen to depict that a reduced scale varies in accordance with a resolution in a mobile terminal according to one embodiment of the present invention.

Referring to (a) of FIG. 39, shown is a map having a large reduced scale due to a relatively high resolution level. Referring to (b) of FIG. 39, shown is a map having a small reduced scale due to a relatively low resolution level. The reduced scale is shown on a right upper end of a screen. A reduced scale of 1 to 20,000 is shown in (a) of FIG. 39 and a reduced scale of 1 to 40,000 is shown in (b) of FIG. 39. The reduced scale can be varied by a key manipulation of the user input unit 130. For instance, a reduced scale of a map can be varied using a scroll key. Yet, a reduced scale may not be varied by a key manipulation of the user input unit 130 unless a resolution is changed.

Meanwhile, the mobile terminal 100 according to one embodiment of the present invention selects a specific one of correspondent terminals and is then able to perform a specific function associated with the selected terminal [S3630, S3640]. Namely, if a specific terminal is selected from correspondent terminals, the controller 180 is able to perform a specific function associated with the selected terminal.

Figure 52:
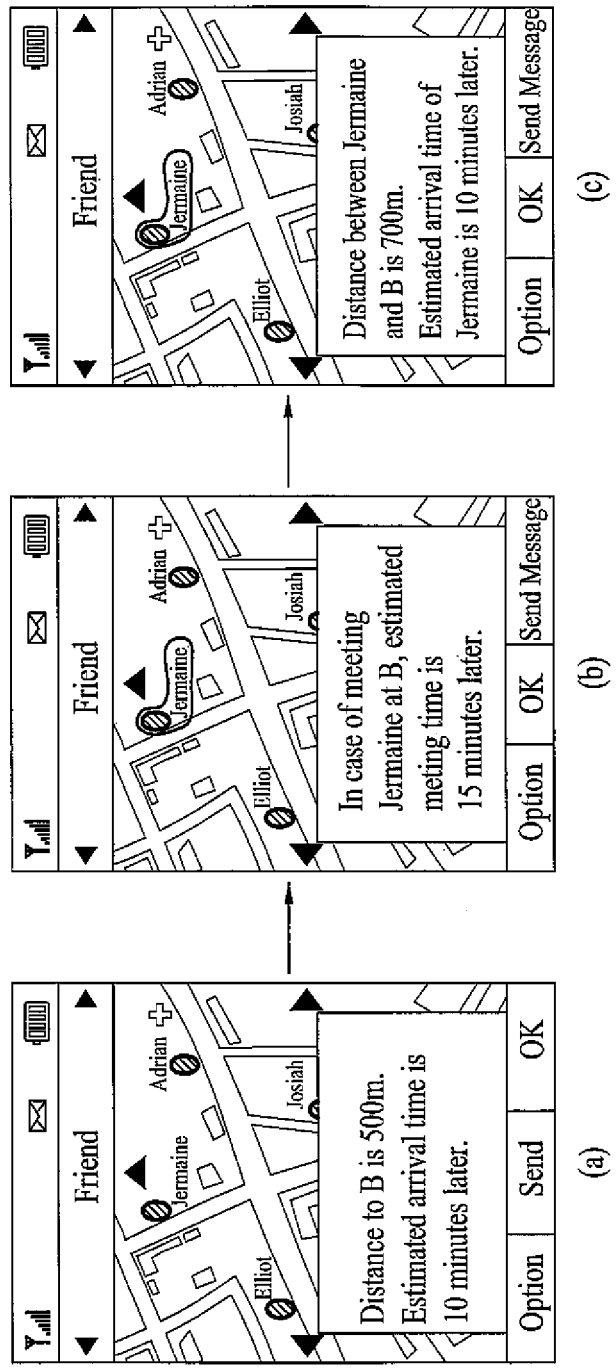

Meanwhile, the mobile terminal 100 may include a touchscreen. In this case, a selection for a specific terminal can be carried out by a touch input. Thus, a method of selecting a specific terminal via a touch input is shown in FIG. 52.

A screen, on which a correspondent terminal is represented as an icon type on a map, is shown in (a) of FIG. 40A. The icon represents identification information for identifying a prescribed correspondent party. It is able to know where a correspondent party is located via the icon displayed on the map. The mobile terminal 100 is able to selectively display a correspondent terminal that has accessed a location information providing service only.

A user of the mobile terminal 100 groups correspondent terminals and is then able to manage the grouped correspondent terminals. In this case, an icon corresponding to the correspondent terminal belonging to a specific group can be displayed on the map only. On the screen shown in the drawing, a correspondent terminal belonging to a group 'friend' is displayed only. In this case, a user is able to confirm a correspondent terminal belonging to another group by touching a direction key 4001 of a window representing a group name.

If a user touches a direction key 403 represented on the map, the controller 180 is able to shift a center of the displayed map. Through the shift of the map, it is able to confirm a correspondent terminal located at another area.

A user is able to enlarge/reduce the displayed map by touching '+'/'−' displayed on a lower end of the screen. Of course, the displayed map may not be enlarged or reduced unless a resolution of the map varies.

Besides, a specific terminal can be selected from correspondent terminals displayed on the map by a user's touch input.

Figure 40:
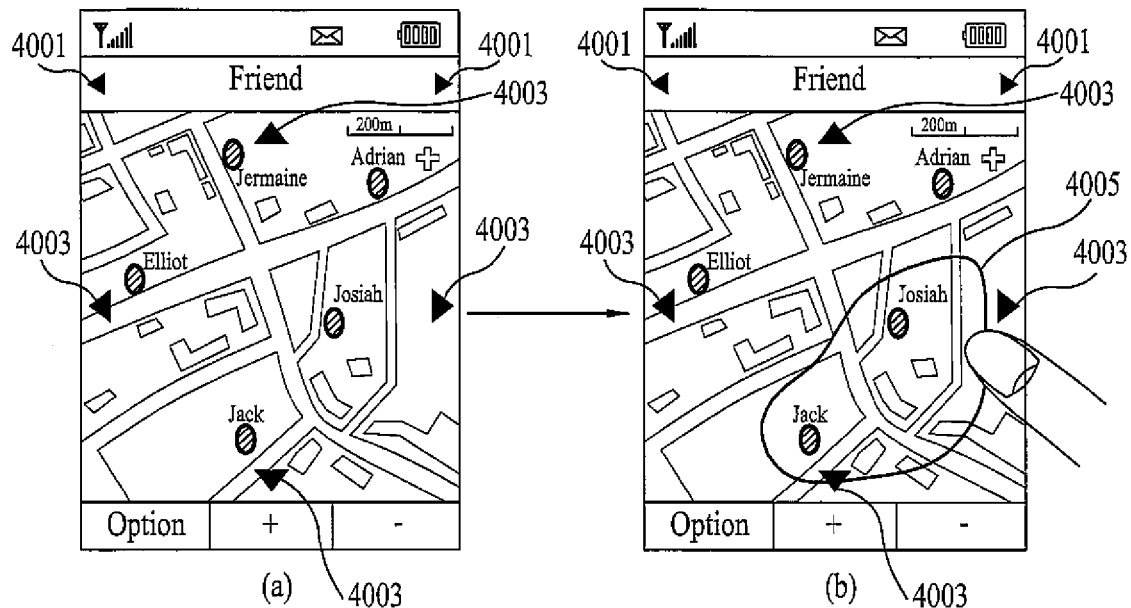

An example of selecting a specific terminal by a touch input is shown in (b) of FIG. 40. A user touches a screen having a map represented thereon and then draws a looped curve 4005, thereby selecting a specific terminal within the looped curve 4005. In particular, if the looped curve 4005 is drawn on the map by a user's touch input, a specific terminal existing within the looped curve 4005 is selected. In this case, a single specific terminal or a plurality of specific terminals may be selected.

The controller 180 is able to carry out a specific function associated with the selected specific terminal. For instance, while the specific terminal is selected, the controller enters 'option' to carry out a specific function associated with the selected specific terminal. And, there can exist various kinds of specific functions.

As examples of the specific functions, there are a voice call, a video communication, and a message or data transmission using SMS (short message service), MMS (multimedia message service), e-mail, IM (instant message), Bluetooth or the like. As examples of the specific functions, there exist an information display of an area where the selected specific terminal is located, a road guide to the selected terminal, etc.

Meanwhile, the controller 180 recognizes a specific character or symbol written on the screen and then carries out a specific function corresponding to the written specific character or symbol. This is shown in FIG. 41.

Figure 41:
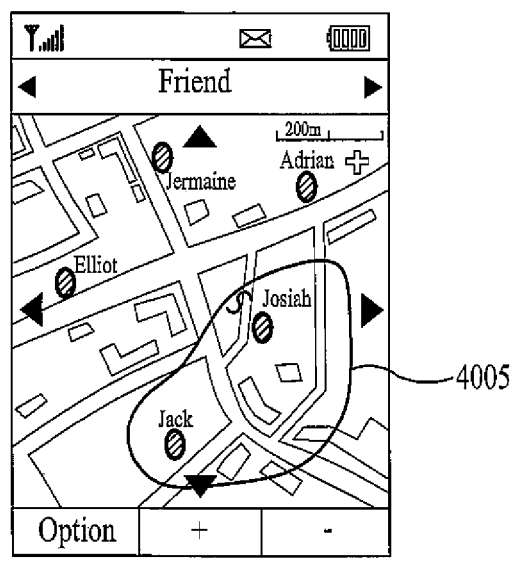

Referring to FIG. 41, a specific function can be performed in a manner of inputting a specific character or letter by handwriting to a screen on which a looped curve 4005 is drawn for a selection of a specific terminal. For instance, if 'S' is inputted by handwriting, the mobile terminal is able to send a message to the selected specific terminal using SMS (short message service). If 'C' is inputted by handwriting, the mobile terminal 100 is able to transmit a call signal to the selected specific terminal [not shown in the drawing]. In this case, the controller 180 is able to recognize user's handwriting as a signal for performing a specific function.

According to one embodiment of the present invention, the mobile terminal 100 is able to set a specific character to match a specific function. For instance, 'E' is set to match a use of e-mail. And, 'I' is set to match a use of IM (instant message).

Thus, if a specific character matches a specific function, a user is able to perform data transmission via e-mail in a manner of inputting 'E' to the looped curve 4005 by handwriting [not shown in the drawing]. In particular, if 'E' is inputted to the looped curve 4005 by user's handwriting, the controller 180 is able to carry out data transmission via e-mail.

A specific function connected to the selected terminal can be carried out in a following manner. For instance, the mobile terminal 100 is able to perform voice or video communication by transmitting a call signal to the selected specific terminal.

The mobile terminal 100 is able to send a message or data to the selected specific terminal as a receiving terminal using SMS (short message service), MMS (multimedia message service), e-mail or the like.

The mobile terminal 100 is able to perform chatting with a user of a selected terminal using IM (instant message). In particular, in case that a plurality of specific terminals are selected, the mobile terminal 100 is able to perform multi-user chatting.

In case that the selected specific terminal is located in a short distance from the mobile terminal 100, the mobile terminal 100 is able to perform short-range communication using Bluetooth.

The mobile terminal is able to announce information on an area where the selected specific terminal is located. For instance, if a selected terminal is located in a foreign country, the mobile terminal 100 is able to inform the selected terminal of weather, exchange rate, composite price index of stocks, local traffic information and local news of the corresponding country, etc. via sub-menus.

Meanwhile, the mobile terminal 100 according to one embodiment of the present invention is able to perform the specific functions by considering characteristics of the selected specific terminal.

For instance, in case of sending a message to a selected specific terminal using SMS (short message service), MMS (multimedia message service), e-mail, IM (instant message) or the like, the mobile terminal 100 is able to send the message by translating the written message into a language of a country where the selected specific terminal is located. This example is shown in FIG. 42.

Figure 42:
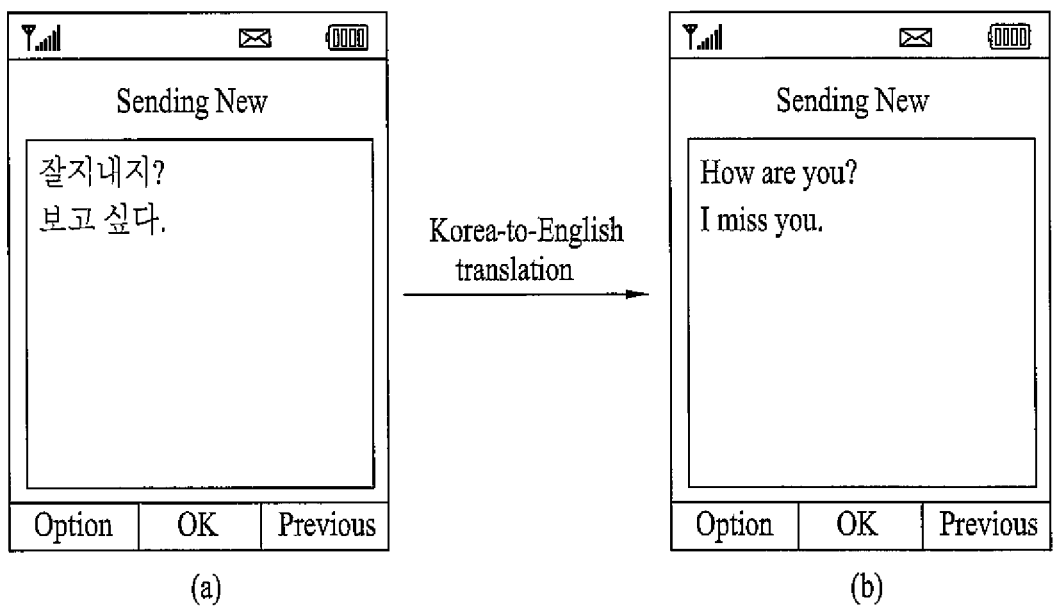

Referring to FIG. 42, message contents written in Korean can be translated into a language of a country where a selected terminal is located. The mobile terminal 100 is able to carry out the translating work using an automatic translation program. If a selected terminal is located in U.S.A., the mobile terminal 100 automatically translates contents of a message written in Korean into English and then sends it to the selected terminal.

Meanwhile, a function supported by the mobile terminal 100 may differ from that supported by a selected terminal. So, the mobile terminal 100 is able to perform a specific function by considering compatibility with the selected terminal. For instance, when a user attempts to send a message, if special characters, font and the like, which can be supported by the mobile terminal 100, are transmitted, an outgoing is successfully performed. Yet, if a message receiving side (i.e., selected terminal) fails to support the same function, the message is seen broken. So, a correspondent user (i.e., selected terminal user) is unable to confirm the message contents correctly. Assuming that the selected terminal is provided with a viewer for opening to view an image file, if a message is sent to a receiving terminal by being converted to an image, the selected terminal is able to correctly recognize contents of the message.

According to one embodiment of the present invention, in case of attempting to convert an extract message to an image, it is checked whether specific symbols are contained in the extracted message to decide whether the message will be converted to an image. The specific symbols may include non-English characters (e.g., Japanese characters: Hirakana, Katakana), symbols, figure images, fonts, special characters, symbols drawn by user's handwriting (if a mobile terminal includes a touchpad), etc. And, the symbols drawn by user's handwriting may include characters, numerals, signs, drawings and the like.

The presence or non-presence of the specific symbols included in the extracted message can be checked by user's eyes in direct. Alternatively, the presence or non-presence of the specific symbols included in the extracted message can be checked by the mobile terminal 100 and its result can be notified to a user.

When the mobile terminal 100 checks the specific symbol, the specific symbol can use a symbol defaulted in the mobile terminal 100 or a symbol set by a user. For instance, a special symbol may be defaulted as a specific symbol in the mobile terminal 100. In this case, if a special symbol is contained in an extracted message, the controller 180 is able to display a popup window for announcing that a specific symbol is contained. And, a user is able to set non-English characters (e.g., Japanese characters: Hirakana, Katakana) to specific letters. In this case, if the set non-English letters are contained in the extracted message, the controller 180 is able to display a popup window for announcing that specific symbols are contained.

The method of announcing that specific symbols are contained via the popup window is just exemplary, which does not put limitation on various implementations of the present invention. For instance, it is able to announce that specific symbols are contained in an extracted message via audio or vibration output.

In case that specific symbols are contained in an extracted message, it is able to convert the extracted message to an image. In this case, the extracted message can be made to contain contents of message only. For instance, it is able to convert a message to an image by extracting contents of the message only without containing an indicator and the like displayed on a display module. In this case, a message part converted to the image includes a message part viewed by a manipulation of a scroll key or a navigation key as well as a part currently displayed on a screen.

Subsequently, the image is transmitted. In this case, the controller 180 is able to transmit the image together with the message to send originally. The image transmission can be carried out using MMS or e-mail.

Figure 43:
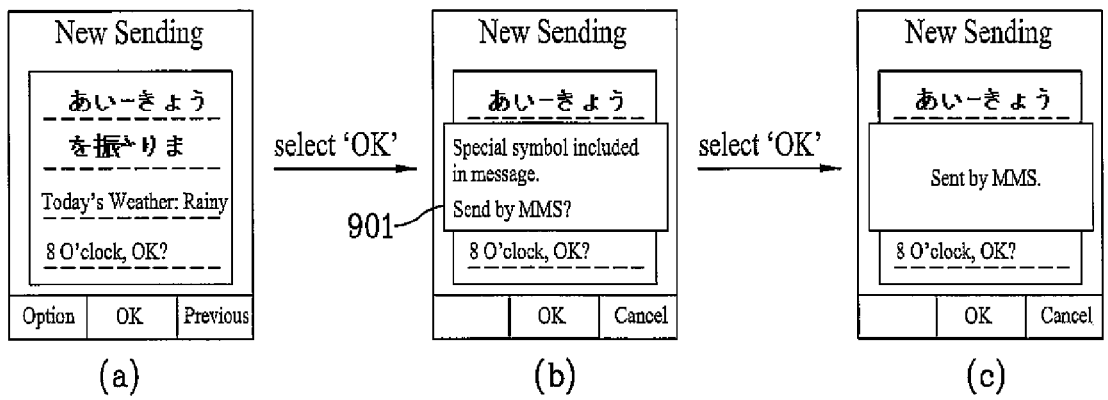

FIG. 43 is a diagram of a screen to depict a method of transmitting an image converted from a message in a mobile terminal according to one embodiment of the present invention.

Referring to (a) of FIG. 43, shown is an example that a message containing a specific non-English letter and a symbol (umbrella) is hand written. In this case, the non-English letter and/or the symbol may be recognized as specific symbols. If the 'OK' key displayed on a screen is inputted, the controller 180 analyzes whether a specific symbol is contained in the message. In particular, if 'OK' is selected from the screen shown in the drawing, an image shown in (b) of FIG. 43 is displayed.

Referring to (b) of FIG. 43, a popup window 4301 for announcing that a specific symbol is contained in the message is displayed. If 'OK' is selected from the screen shown in the drawing, the written message is converted to an image file. The image file is then transmitted [(c) of FIG. 43]. In this case, it is able to send an original message together with the image. The image file transmission can be carried out using MMS.

Meanwhile, if a selected terminal fails to recognize the message containing the symbols (including characters, numerals, figures, etc.) written by handwriting, the mobile terminal 100 converts the message to an image and then transmits the image to the selected terminal.

Figure 44:
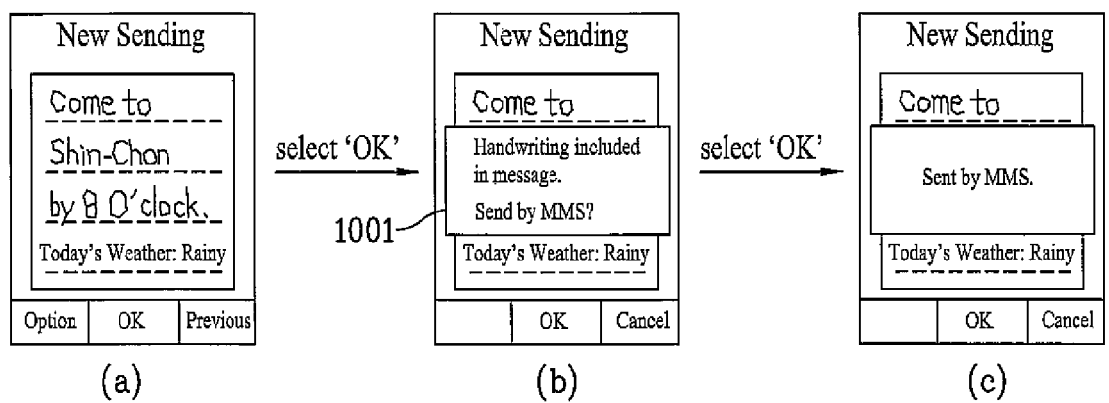

FIG. 44 is a diagram of a screen to depict a method of transmitting an image converted from a message written by user's handwriting in a mobile terminal according to one embodiment of the present invention.

Referring to (a) of FIG. 44, shown is an example of a message written by handwriting. In this case, symbols written by handwriting can be recognized as specific symbols. If 'OK' key displayed on a screen is inputted, the controller 180 can analyze whether a specific symbol is contained in the message. In particular, if 'OK' is selected from the screen shown in the drawing, an image shown in (b) of FIG. 44 is displayed.

Referring to (b) of FIG. 44, a popup window 4401 for announcing that a specific symbol is contained in the message is displayed. If 'OK' is selected from the screen shown in the drawing, the written message is converted to an image file. The image file is then transmitted [(c) of FIG. 44]. In this case, it is able to send an original message together with the image. The image file transmission can be carried out using MMS.

Meanwhile, according to one embodiment of the present invention, the specific function can be carried out by considering a location of a selected correspondent terminal.

Figure 45:
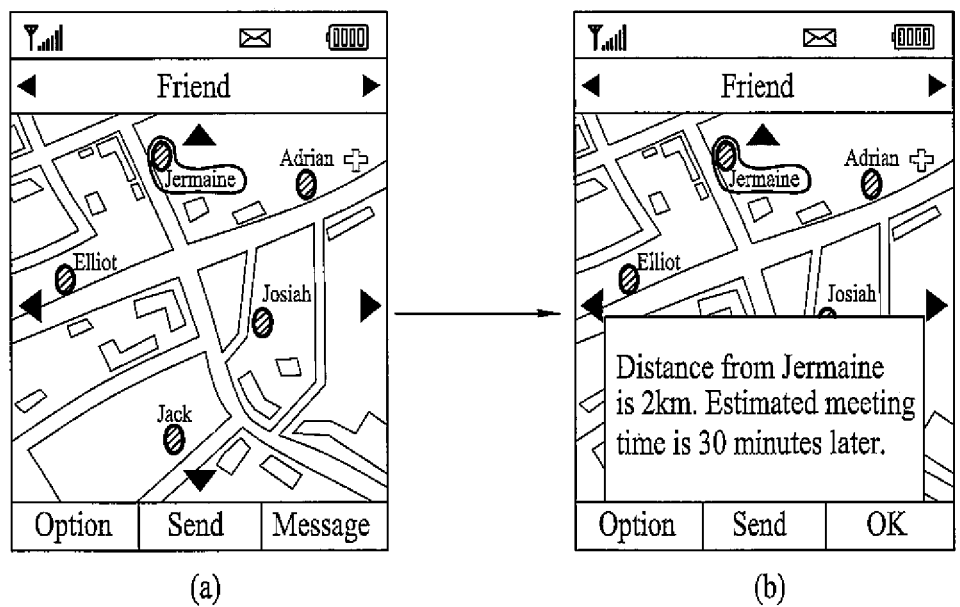

For instance, the mobile terminal 100 is able to display a distance from a selected terminal. This example is shown in FIG. 45. In (a) of FIG. 45, shown is a case that a terminal having an ID 'Jermaine' is selected. In this case, it is able to confirm a distance from a selected terminal through an option entry or the aforesaid specific character input. Referring to (b) of FIG. 45, a user can be informed of the distance from the selected terminal in a manner that the distance from the selected terminal is displayed as a popup window. And, the distance from the selected correspondent party can be notified to a user via an audio output.

Fourth Embodiment

Explained in the following description is a method of performing a road guide to a location of a specific correspondent terminal as a destination in a mobile terminal 100 according to one embodiment of the present invention. In this case, the specific terminal includes a prescribed one of a plurality of terminals mutually registered with a location information providing service as a medium.

Figure 46:
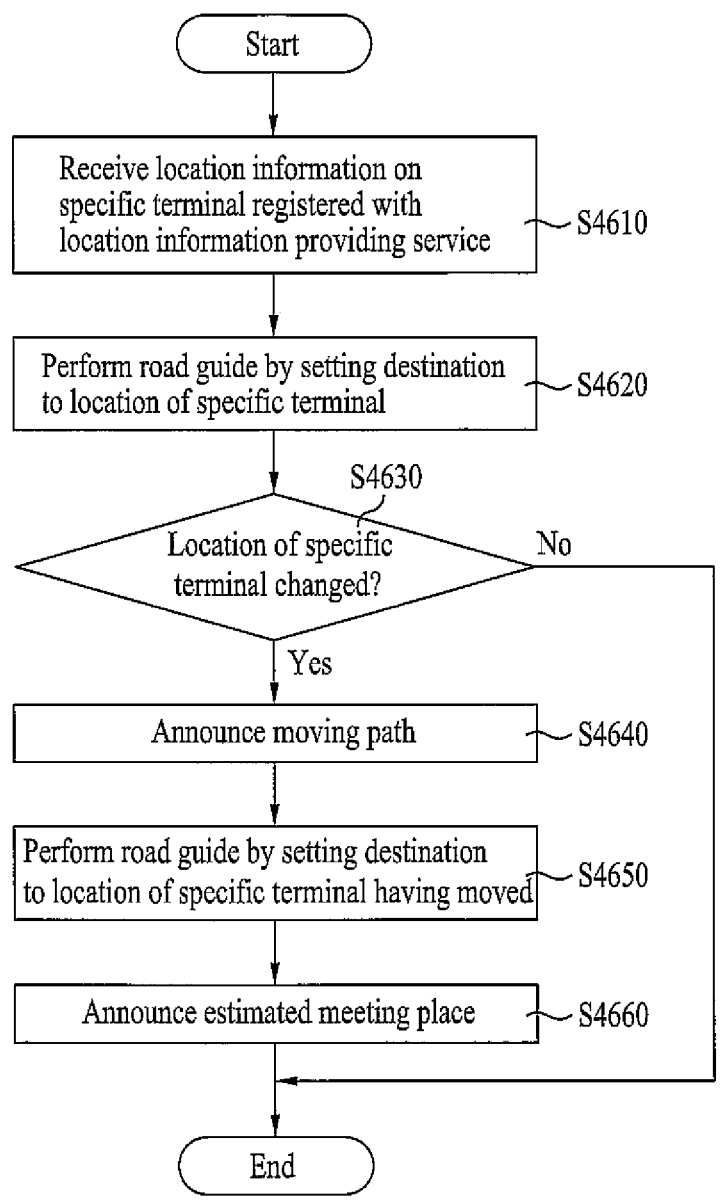
FIG. 46 is a flowchart for a road guiding method of a mobile terminal according to one embodiment of the present invention.

FIG. 46 is a flowchart for a road guiding method of a mobile terminal according to one embodiment of the present invention, in which a location of a specific terminal is a destination.

Referring to FIG. 46, the mobile terminal 100 is able to receive location information on a specific terminal registered with a location information providing service via the wireless communication unit 110 [S4610]. The location information reception of the specific terminal can be performed with a prescribed time interval. The location information reception of the specific terminal can be carried out with a prescribed time interval. The prescribed time can be determined based on a resolution. For instance, if a resolution level is 1, the location information on the specific terminal is received every 1 minute. If a resolution level is 3, the location information on the specific terminal is received every 10 minutes.

It is able to determine the resolution based on information opening extent set per a terminal. The information opening extent can be determined based on intimacy/permission level with a correspondent terminal. The intimacy/permission level can be set per a correspondent terminal. If a correspondent terminal is managed as a group, the intimacy/permission level can be determined per the corresponding group. Namely, the resolution can be determined in accordance with the intimacy/permission level. For instance, if intimacy/permission level is 10, a resolution level is set to 1. If intimacy/permission level is 5, a resolution level is set to 3.

The controller is able to perform a road guide using a location of the specific terminal as a destination [S4620]. The controller 180 is able to perform the road guide using the received location information on the specific terminal. And, the controller 180 is able to perform the road guide with the prescribed time interval as a period for receiving the location information on the specific terminal.

FIG. 47 is a diagram of a screen to depict a process for performing a road guide to a specific terminal as a destination in a mobile terminal according to one embodiment of the present invention.

Referring to (a) of FIG. 47, shown is a screen for performing a road guide to a terminal, which has an ID 'Jermaine' among a plurality of terminals registered with a location information providing service, as a destination. A displayed map can be enlarged/reduced using '+/−' menu displayed on a lower end of the screen. In particular, the controller 180 is able to enlarge/reduce the displayed map if a signal relevant to '+/−' is inputted.

A detailed road guide image is displayed on the screen through enlargement of the map, which is shown in (b) to (d) of FIG. 47. In particular, the controller 180 is able to enlarge the displayed map through a key input of '+'. Through the images shown in (b) to (d) of FIG. 47, it is able to confirm detailed road guide information for each specific section.

According to one embodiment of the present invention, if a location of a specific terminal set to a destination is changed, the mobile terminal 100 is able to announce a moving path of the specific terminal [S4630, S4640]. And, the mobile terminal 100 is able to perform a road guide in a manner of setting the moved location of the specific terminal to a new destination [S4650].

FIG. 48 is a diagram of a screen to depict a process for performing a road guide to a moving specific terminal as a destination in a mobile terminal according to one embodiment of the present invention.

Referring to FIG. 48, if a location of a specific terminal (having an ID 'Jermaine') set to a destination is changed, the controller 180 is able to display a popup window for announcing moving path and destination changes of the specific terminal [(a) of FIG. 48].

If 'OK' is selected from the screen shown in (a) of FIG. 48, the controller 180 performs a road guide by setting the destination to the changed location of the specific terminal [(b) of FIG. 48]. The controller 180 then displays an image of the road guide to the newly set destination.

Meanwhile, according to one embodiment of the present invention, the mobile terminal 180 is able to perform a road guide in a manner that a destination is changed only if a moving of the specific terminal exceeds a threshold range. Thus, the threshold range is determined. This is because the destination change is insignificant in case that a location of the specific terminal is changed little. Although a location of the specific terminal is changed little, if the destination is changed each time, an operation load of the controller 100 is heavily increased. For the same reason, the controller 180 is able to announce the moving path of the specific terminal only if the moving of the specific terminal exceeds the threshold range. In this case, the threshold range can be determined based on a resolution.

Meanwhile, the controller 180 is able to calculate a moving speed of the mobile terminal 100 using location information on the mobile terminal 100 received via the position-location module 115. And, the controller 180 is able to calculate a moving speed of the specific terminal using the received location information on the specific terminal.

The controller 180 is able to announce an estimated meeting place based on the calculated moving speed of the mobile terminal 100 and the moving speed of the specific terminal. And, the controller 180 is able to transmit road guide information to the estimated meting place to the specific terminal. This example is shown in FIG. 49.

Referring to FIG. 49, the controller 180 is able to display a popup window including an estimated meeting place determined based on a moving speed of the moving terminal 100 and a moving speed of a specific terminal [(a) of FIG. 49]. The estimated meeting place and an estimated meeting time are displayed on the popup window. Referring to (b) of FIG. 49, the controller 180 is able to display an image of a road guide to the estimated meeting place.

The controller 180 is able to transmit road guide information to the estimated meting place to the specific terminal. The road guide information can contain a moving path to the estimated meeting place and an estimated necessary time. And, the road guide information can contain road guide information to the estimated meeting place from a current location of the specific terminal.

Meanwhile, according to one embodiment of the present invention, if a moving path or speed of a specific terminal is changed to exceed a threshold range or if a moving path or speed of the mobile terminal 100 is changed to exceed a threshold range, it is able to change an estimated meeting place. The threshold range can be decided based on a resolution. In this case, the controller 180 informs a user of the changed estimated meeting place and road guide information to the changed estimated meeting place or transmits them to the specific terminal. This example is shown in FIG. 50.

Referring to (a) of FIG. 50, the controller 180 is able to display a popup window for representing the changed estimated meeting place and a time required for the changed estimated meeting place. Referring to (b) of FIG. 50, the controller 180 is able to display an image of a road guide to the changed estimated meeting place.

Meanwhile, the mobile terminal 100 according to one embodiment of the present invention is able to display information on a correspondent terminal (hereinafter named 'correspondent terminal') mutually registered with a location information providing service. So, the mobile terminal 100 and the correspondent terminal can provide information containing location information to each other using the location information providing service as a medium.

The mobile terminal 100 is able to support a function service for meeting a user of a selected terminal. For instance, the mobile terminal 100 is able to perform a function of a road guide to the selected terminal. If the selected terminal is moving, the mobile terminal 100 is able to inform a user that the selected terminal is moving. In particular, if a location of the selected terminal is considerably changed through moving, the mobile terminal 100 enables the user to recognize the considerable location change in a manner of informing the user of the considerable location change.

Figure 51:
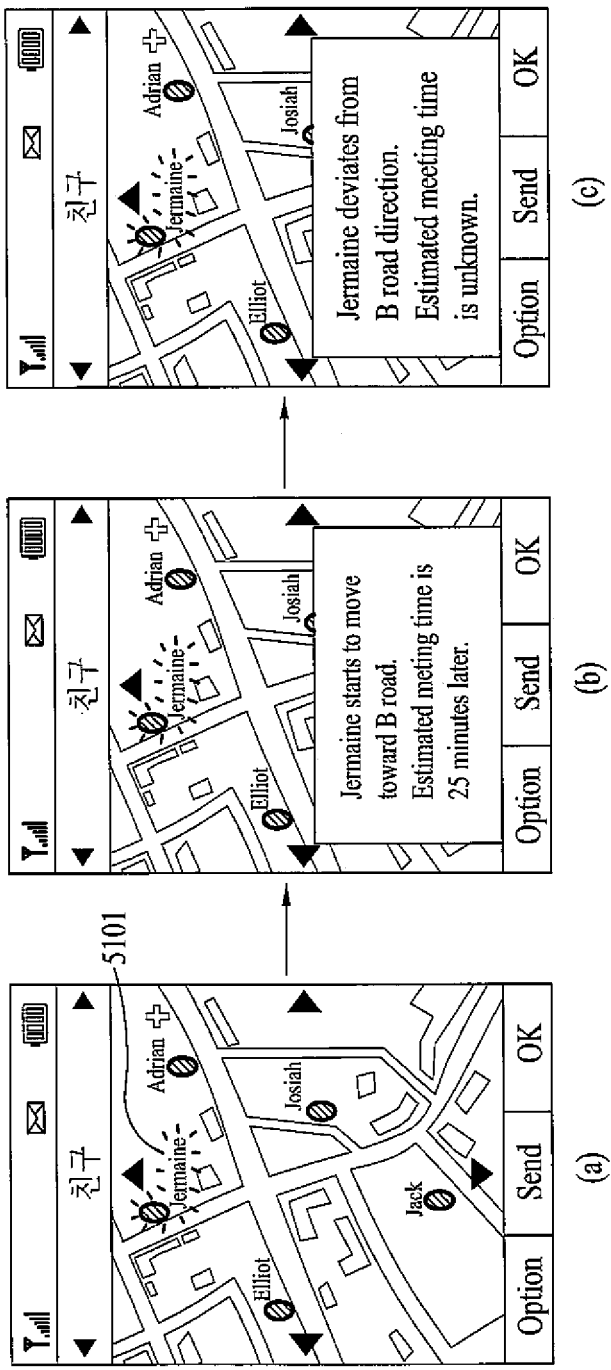

FIG. 51 is a diagram of a screen to depict a method of performing a service for meeting a selected correspondent party (user of a selected terminal) in a mobile terminal according to one embodiment of the present invention.

Referring to (a) of FIG. 51, in case that a selected terminal is moving, a fact that the selected terminal is moving is displayed on a screen. In case that the selected terminal, as shown in the drawing, is moving, a highlight 5101 can be displayed on an icon indicating the selected terminal. So, owing to the highlight 5101, a user is able to recognize that the selected terminal is moving.

The mobile terminal 100 is able to support a time service for meting a selected correspondent party (i.e., user of a selected terminal). This example is shown in (b) of FIG. 51. Referring to (b) of FIG. 51, if a correspondent terminal is moving, the mobile terminal 100 is able to inform a user of a moving direction and an estimated meeting time using a popup window. In this case, the estimated meeting time can be found using a current moving speed. And, the estimated meeting time can be directly found in a manner that a user directly inputs a moving speed.

In case that a selected correspondent terminal deviates from a moving path not to know its estimated meeting time, an image, as shown in (c) of FIG. 51, can be displayed on the screen.

The mobile terminal 100 is able to announce information on a specific location displayed on a map. This example is shown in FIG. 52.

Referring to (a) of FIG. 52, if a location of B displayed on a map is selected by a touch, the mobile terminal 100 displays a distance to a selected specific location and an estimated arrival time on a screen. If a user selects a location of B displayed on the map by a touch, the mobile terminal 100 is able to display a distance to B and an estimated arrival time via a popup window.

The mobile terminal 100 is able to recommend a meeting place with a selected correspondent terminal user. This example is shown in (b) of FIG. 52. Referring to (b) of FIG. 52, the mobile terminal 100 is able to display a recommended specific location and an estimated meeting time with a correspondent party (i.e., selected terminal user) for the meting at the recommended specific location using a popup window. In this case, a user is able to send a message displayed on the popup window to the correspondent terminal via 'send Message'.

Referring to (c) of FIG. 52, a user selects a specific location from a map and then confirms a distance between the selected specific location and a correspondent terminal. In particular, the mobile terminal 100 is able to display the distance between the selected specific location and the correspondent terminal and an estimated time for the correspondent terminal to arrive at the specific location using a popup window.

Figure 53:
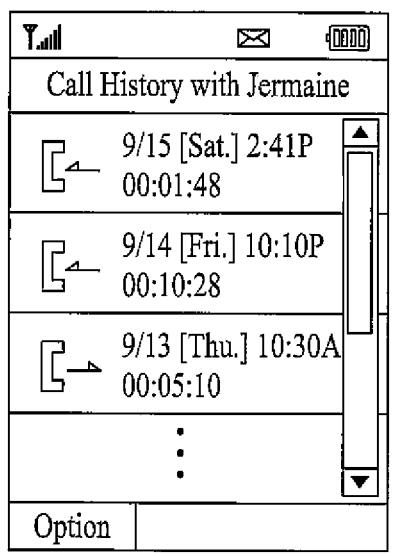
FIG. 53 is a state diagram of a screen on which a communication history with a specific correspondent party in a mobile terminal according to one embodiment of the present invention.

The mobile terminal 100 is able to confirm a recent call list with the selected correspondent terminal user (hereinafter named 'selected correspondent party'). FIG. 53 shows a call list with a selected correspondent party. Referring to FIG. 53, a call list is displayed in order of recent calls. On the displayed list, call times, call hours, outgoing calls and incoming calls are shown.

Fifth Embodiment

In the following description, a method of generating a moving history of a mobile terminal 100 according to one embodiment of the present invention is explained. The moving history can exist in various forms. For instance, the moving history can exist in a table form on which times and places are represented or a moving trace form on a map.

Figure 54:
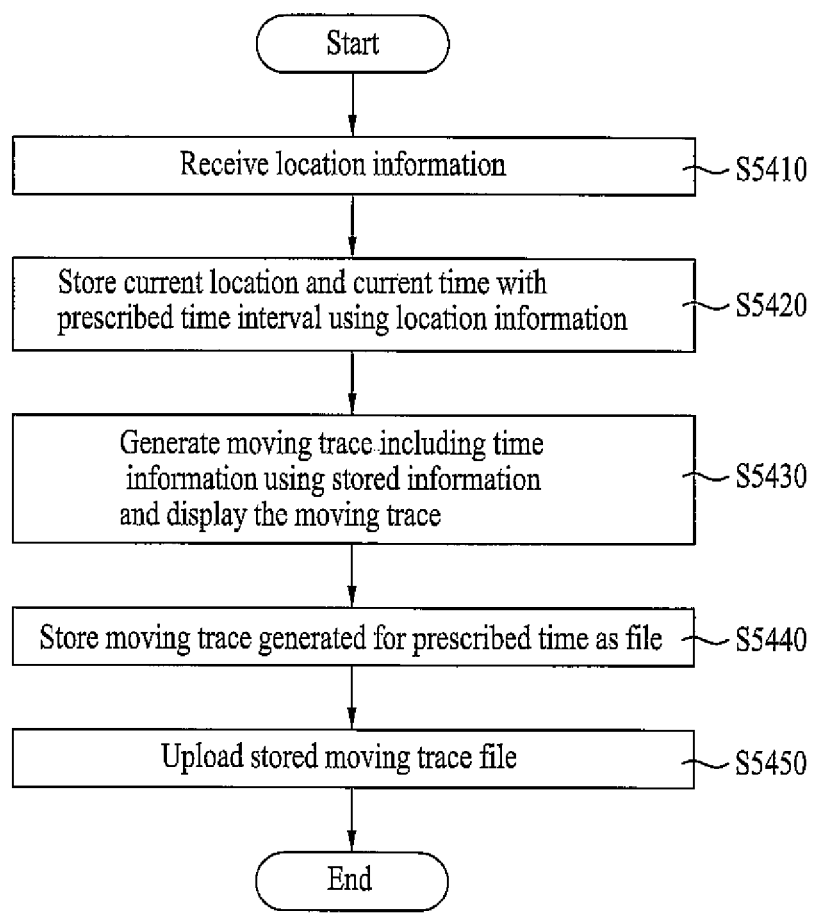
FIG. 54 is a flowchart for a method of generating a moving history of a mobile terminal according to one embodiment of the present invention.

FIG. 54 is a flowchart for a method of generating a moving history of a mobile terminal according to one embodiment of the present invention.

Referring to FIG. 54, the mobile terminal 100 is able to receive location information via the wireless communication unit 110 [S5410]. In this case, the location information can be received by real time or with a prescribed time interval.

The controller 180 is able to store a current location and a current time in the memory 160 with a prescribed time interval based on the received location information [S5420]. The controller 180 generates a moving trace for representing time information using information containing the current location and the current time with the prescribed time interval and then displays the generated moving trace on the display 151 [S5430].

Figure 55:
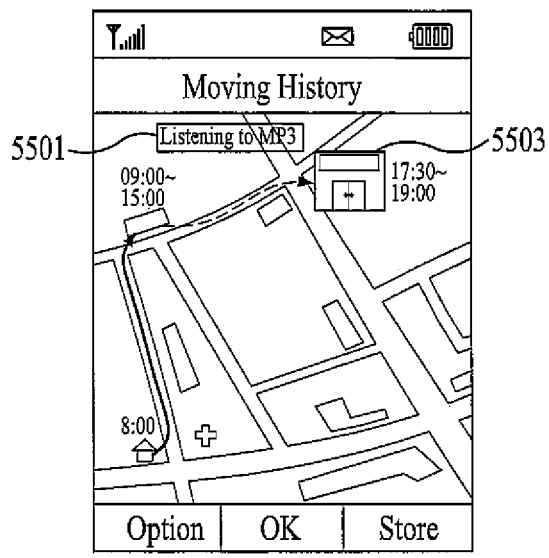

FIG. 55 is a diagram of a screen on which an example of generating a moving history of a mobile terminal according to one embodiment of the present invention is displayed.

Referring to FIG. 55, a moving trace of a mobile terminal is displayed on a map displayed on a screen. And, time information on the mobile terminal remaining on a specific place is displayed on the screen on which the moving trace is displayed. And, the moving trace is represented to be discriminated in accordance with a moving speed. In particular, the controller 180 is able to represent the moving trace to be discriminated in accordance with the moving speed. In this case, if the moving speed is greater than a specific speed, it can be indicated by a solid line. If the moving speed is smaller than the specific speed, it can be indicated by a dotted line. Meanwhile, the controller 180 grades the moving speed and then displays the moving speed to be discriminated via a display color of the moving trace for each corresponding grade [not shown in the drawing].

The controller 180 is able to generate a moving trace by having the moving trace contain a specific record as well as time information. In this case, the specific record may be relevant to a specific time. For instance, in case that the mobile terminal 100 plays a specific music file for a specific time, it is able to display a record 5501 about music file playback on the moving trace. And, a specific location having time information displayed on the moving trace can be represented as specific words or a specific image. Through the specific words or the specific image, a user can be reminded of what he had done at the corresponding place on the corresponding time. A specific image 5503 is displayed on the screen shown in the drawing. For example, the specific image 5503 is obtained from a location information provider (i.e., a GPS service provider), or is stored locally within the mobile terminal 100.

In case that a displayed specific record is selected by a key input, the controller 180 is able to play back a data file relevant to the specific record. This example is shown in FIG. 56.

Figure 56:
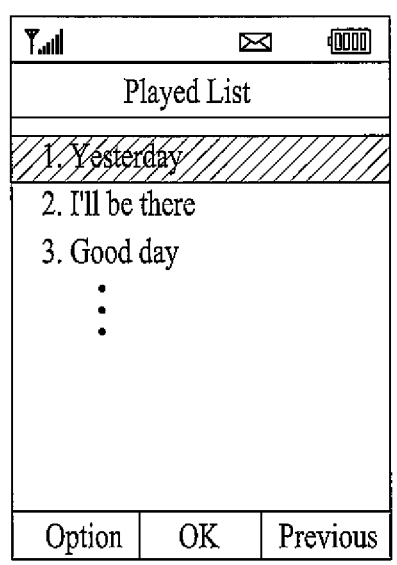

FIG. 56 shows a screen on which a music file list played in the course of moving is displayed by the controller if the specific record 5501 is selected from the screen shown in FIG. 55. If a specific music file is selected from the played music file list, the controller 180 is able to play back the selected specific music file. And, the controller 180 is able to display detailed information on the selected specific file. For instance, the controller 180 is able to display how long (i.e., how many minutes) the selected music has been played, when the selected music was played, where the selected music was exactly played, etc.

In case that a displayed specific record is selected by a key input, the controller 180 is able to link the selected specific record to a specific image relevant to the selected specific record. This example is shown in FIG. 57.

FIG. 57 shows that, if the specific image 5503 shown in FIG. 55 is selected, the selected image 5503 is linked to a specific image relevant to the selected image 5503. In this case, the specific image 5503 may include an image of a specific restaurant. And, the linked image (shown in FIG. 57) may include a homepage image about the specific restaurant.

Meanwhile, according to one embodiment of the present invention, the mobile terminal 100 generates the moving trace for a prescribed time and the stores the generated moving trace in the memory 160 as a data file [S540]. An example of storing the moving trace as a data file is shown in FIG. 58.

Referring to (a) of FIG. 58, shown is a moving trace of the mobile terminal 100 between 08:00 and 22:30. In case that the moving trace is stored via a key input of 'Store' key, an image shown in (b) of FIG. 58 can be displayed on the screen. In particular, if the 'Store' key is inputted, the controller 180 stores the moving trace for the above time as a data file. After completion of the storage, the controller 180 is able to display the image shown in (b) of FIG. 58 on the screen. Through the image, a user is able to confirm the stored data file. The controller 180 is able to default a name of the data file into a date corresponding to the moving trace. For instance, in case that a moving trace corresponds to Oct. 1, 2007, a file name is set to '2007/10/01' and then stored. A user is able to utilize the data file as a diary (hereinafter named 'moving diary', for convenience) indicating the moving trace.

The controller 180 is able to upload the stored moving diary to a specific website [S5450]. The upload is advantageous in utilizing a storage space of the mobile terminal efficiently and enabling the moving diary to be shared with other users.

Figure 59:
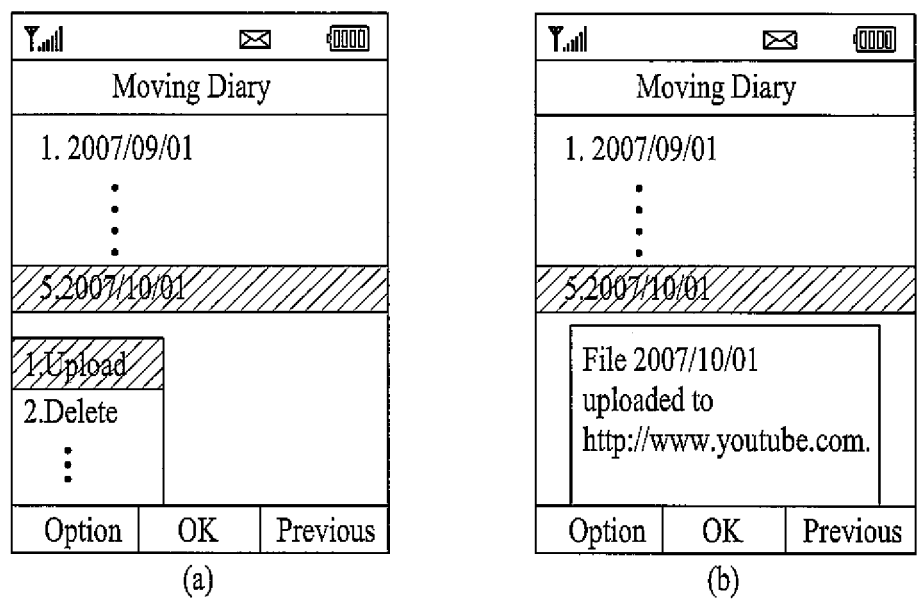

FIG. 59 is a diagram of a screen for an example of uploading a moving diary in a mobile terminal according to one embodiment of the present invention. If 'Upload' menu is selected while one of stored moving diaries is selected [(a) of FIG. 59], the selected moving diary is uploaded to a specific website. Referring to (b) of FIG. 59, an image, which represents that a selected moving diary has been fully uploaded to a specific website, is displayed on a screen.

Meanwhile, the mobile terminal 100 according to one embodiment of the present invention is able to further add a moving trace of a specific terminal registered with a location information providing service to a moving trace of the mobile terminal 100. This example is shown in FIG. 60.

Figure 60:
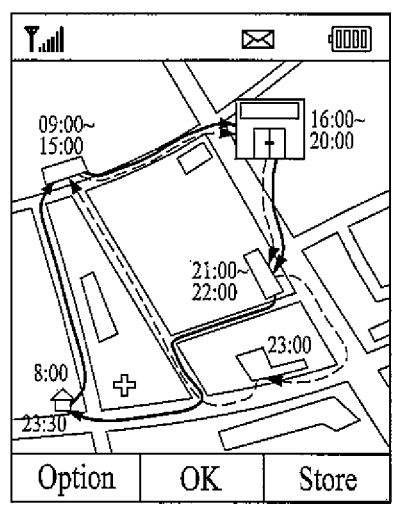

Referring to FIG. 60, a moving trace indicated by a solid line represents a moving trace of the mobile terminal 100. And, a moving trace indicated by a dotted line represents a moving trace of a specific terminal. Of course, in case that both of the mobile terminal 100 and the specific terminal move on the same time zone, the moving trace is indicated by both of the solid and dotted lines. A user is able to know how long and where the user acts together with a specific correspondent party through the moving trace shown in FIG. 60.

In the following description, a method of providing a history of a terminal location in accessing a location information providing service according to one embodiment of the present invention is explained with reference to the accompanying drawings.

The mobile terminal 100 according to one embodiment of the present invention displays a moving history of a specific terminal (hereinafter named 'correspondent terminal') mutually registered with a location information providing service or transmits its moving history to a specific terminal.

The moving history can be obtained using base station information and history information on the position-location module 115. In particular, the history information on the position-location module 115 can contain a history of GPS location information. And, the moving history can be represented by interconnecting with a map.

Figure 61:
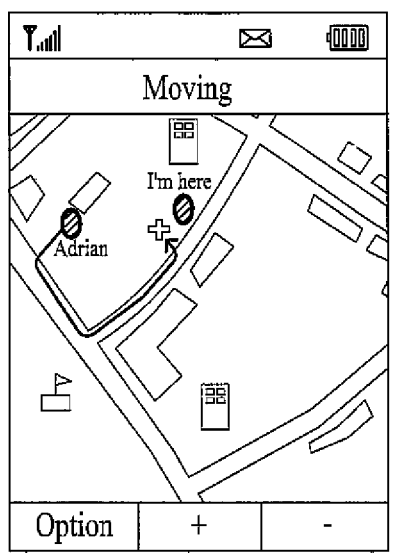
Figure 62:
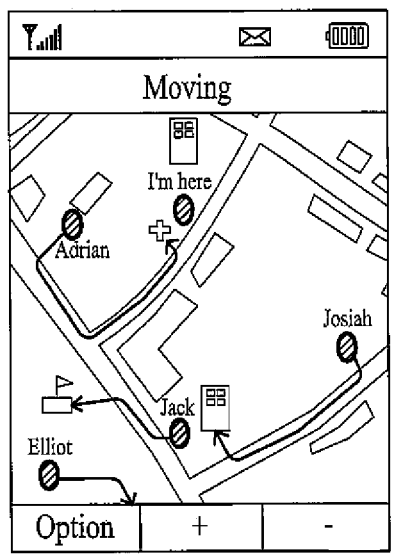

FIG. 61 and FIG. 62 are diagrams of screens on which a moving history of a specific terminal is displayed in a mobile terminal according to one embodiment of the present invention.

Referring to FIG. 61, the mobile terminal 100 is able to display a moving history of a selected terminal by interconnecting it with a map. On the screen shown in the drawing, a moving history of a terminal having an ID 'Adrian' is displayed. In this case, a user sets a specific time and then displays the moving history with reference to the set time. For instance, the user selects a terminal having an ID 'Adrian' and then confirms how the selected terminal moves on a specific time zone (e.g., 09:00 to 18:00, Aug. 15, 2007). In this case, a map can be enlarged/reduced using a key signal input of '+/−'.

Referring to FIG. 62, the mobile terminal 100 is able to display moving histories of a plurality of terminals on a single screen. In this case, a map can be enlarged/reduced using a key signal input of '+/−'. The mobile terminal 100 is able to display moving histories of a plurality of terminals with reference to a specific area. For instance, the mobile terminal 100 specifies a place nearby 'Yeoeui Island' and then displays moving histories of correspondent terminals moving within the specified area.

The mobile terminal 100 selectively picks a correspondent terminal located within a prescribed distance from the mobile terminal 100 only and then displays a moving history of the correspondent terminal. For instance, the mobile terminal 100 is able to display a moving history of a correspondent terminal located with a range of 1 km from the mobile terminal 100.

The mobile terminal 100 specifies a specific time and a specific place and then displays a moving history of a correspondent terminal passing through or located at the specified place on the specified time. For instance, the mobile terminal 100 is able to display a moving history of a correspondent terminal passing through or located at a place nearby Yeoeui Island between 15:00 and 21:00, Aug. 15, 2007.

The mobile terminal 100 selectively picks a correspondent terminal belonging to a specific group only and then displays a moving history of the selectively picked terminal. For instance, the mobile terminal 100 selectively picks a correspondent terminal belonging to a group 'friend' only and then displays a moving history of the selectively picked terminal.

The mobile terminal 100 searches a specific area and then displays a frequency number of terminals having passed through the specific area. For instance, the mobile terminal 100 sets a search area to 'A station' and then finds a frequency number of terminals having moved through the A station area.

Figure 63:
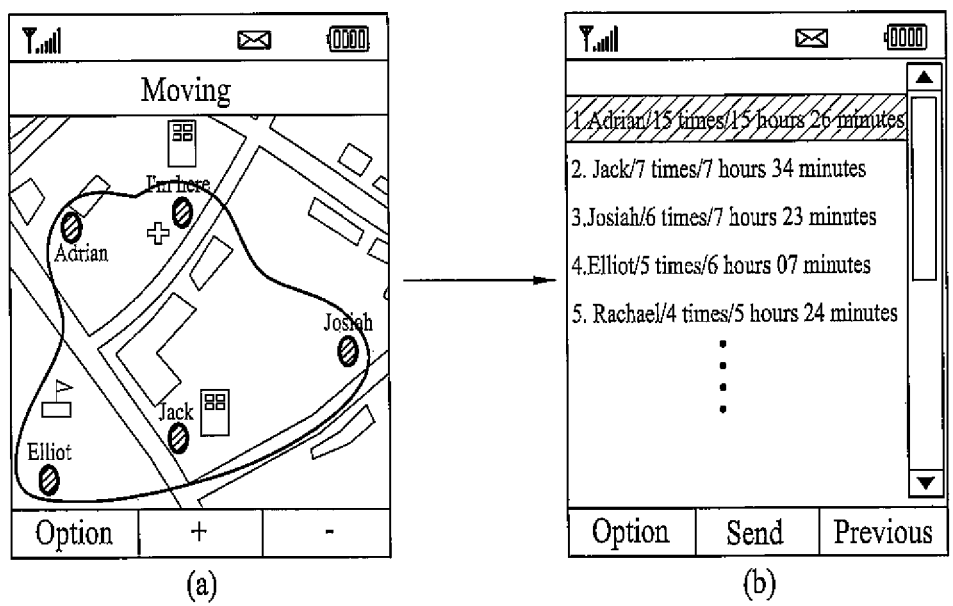

FIG. 63 is a diagram of a screen on which a frequency of terminals having moved through a searched area is displayed, in which a specific area is searched by a mobile terminal 100 according to one embodiment of the present invention.

Referring to (a) of FIG. 63, shown is a method of selecting a specific area by drawing a looped curve. In case that the mobile terminal 100 includes a touchscreen, a user is able to draw the looped curve through a touch input. And, the user is able to calculate a frequency number by considering a search period. For instance, the terminal calculates a frequency number of terminals having passed through a place nearby A station or located at A station area for a month of August, 2007 and then displays the calculated frequency number.

Referring to (b) of FIG. 63, correspondent terminals having located within or passed through an area searched for a search period are displayed on a screen with specific reference. On the screen, 'ranking/ID (phonebook name, location information providing service use ID) of correspondent terminal/total location count/total staying time' is displayed. The sorted ranking is based on total location count. Yet, the mobile terminal 100 is able to change the sorted ranking in accordance with a specific item. For instance, the mobile terminal 100 is able to change the sorted ranking of the correspondent terminal with reference to total staying time.

Sixth Embodiment

In the following description, a method of opening moving (or movement) information to a terminal registered with a location information providing service in a mobile terminal 100 according to one embodiment of the present invention is explained. The moving information may contain a moving history. In this case, the mobile terminal 100 may open its real moving information. And, the mobile terminal 100 may open virtual moving information to the terminal registered with the location information providing service due to privacy protection and the like.

Figure 64:
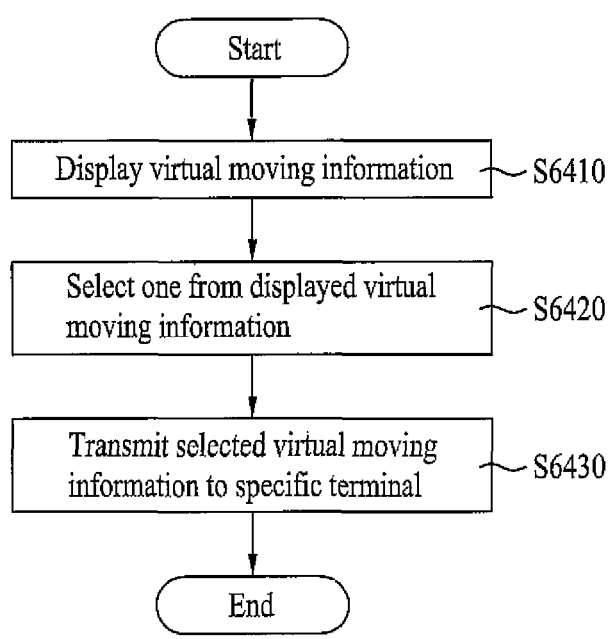
FIG. 64 is a flowchart for a method of transmitting information in a method of generating a moving history of a mobile terminal according to one embodiment of the present invention.

FIG. 64 is a flowchart for a method of opening virtual moving information to a terminal registered with a location information providing service in a mobile terminal according to one embodiment of the present invention.

The virtual moving information may mean virtual route data shared with another terminal (s) to hide real or true moving information of the mobile terminal 100. For example, a user of the mobile terminal 100 wants to send the virtual moving information to another terminal (s) for privacy protection.

Referring to FIG. 64, the controller 180 displays virtual moving information stored in the memory 160 [S6410]. The virtual moving information can be received from a specific website or may be generated by user setup. For instance, the controller 180 is able to generate virtual moving information for which a departure place is set to a current location of the mobile terminal 100 and for which a destination is set to a specific location. In this case, the specific location can be set by a manipulation of the user input unit 130. The controller 180 is able to transmit the virtual moving information to the terminal registered with the location information providing service with a prescribed time interval. The prescribed time can be determined based on a resolution. And, a quality or quality of the transmitted virtual moving information may vary in accordance with the resolution.

Meanwhile, the controller 180 is able to perform a road guide simulation, which uses the current location of the mobile terminal 100 as a departure place and which uses the set specific location as a destination. The road guide simulation facilitates a user to generate virtual moving information. In this case, the virtual moving information may contain a virtual moving speed and a virtual moving path.

Meanwhile, in case that a virtual speed is inputted, the controller 180 is able to perform the road guide simulation. The controller 180 generates a virtual current location based on the virtual moving speed and then transmits the generated virtual current location to the terminal registered with the location information providing service.

FIG. 65 is a diagram of a screen to explain an example of generating virtual moving information via a road guide simulation in a mobile terminal according to one embodiment of the present invention.

Referring to (a) of FIG. 65, if a specific location is selected by a key input of the user input unit 130, a destination of a specific time is set to the selected specific location. In case that the user input unit 130 includes a touchscreen, the specific location can be selected via a touch input. For instance, if a specific point displayed on a map is touched, the controller 180 is able to decide the touched point as the specific location.

Referring to (b) of FIG. 65, if 'Moving Simulation' menu is selected from the screen shown in (a) of FIG. 65, an image for inputting a time for staying at the specific point is displayed on the screen. In this case, a user is able to input a time for staying at the selected specific point. In particular, the controller 180 is able to perform a road guide simulation based on the time inputted by the user input.

Referring to (c) of FIG. 65, an image for inputting a moving means for each section is displayed on the screen. A virtual moving speed can be determined by the moving means. For instance, a virtual moving speed of 'bus' is set to 60 km/h, a virtual moving speed of 'on foot' is set to 5 km/h, and a virtual moving speed of 'subway' is set to 75 km/h. Thus, the road guide simulation can be carried out.

Referring to (d) of FIG. 65, an image for performing a moving simulation based on a time for staying at the specific point set by the input and a virtual moving means is displayed on the screen. A virtual moving trace having time information displayed thereon is displayed on the screen. And, a virtual moving path is displayed on the moving trace.

Meanwhile, the controller 180 generates a virtual moving trace based on the road guide simulation carried out by the method shown in FIG. 65 and then stores the generated virtual trace in the memory 160 as a data file format.

Figure 66:
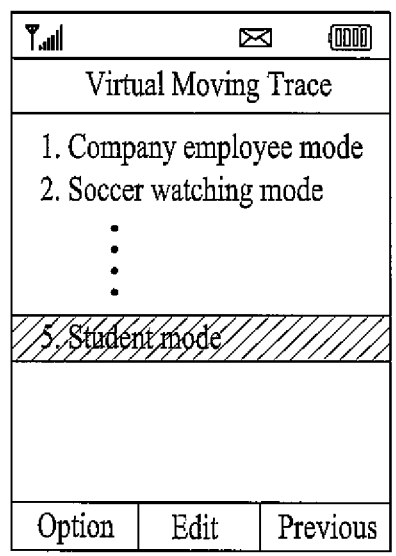

FIG. 66 is a diagram of a screen on which a virtual moving trace stored as a file format is displayed in a mobile terminal according to one embodiment of the present invention.

Referring to FIG. 66, a virtual moving trace generated based on a specific location set by a user is displayed on the screen.

If a specific virtual moving trace is selected, the controller 180 is able to modify or delete the selected virtual moving trace.

Figure 67:
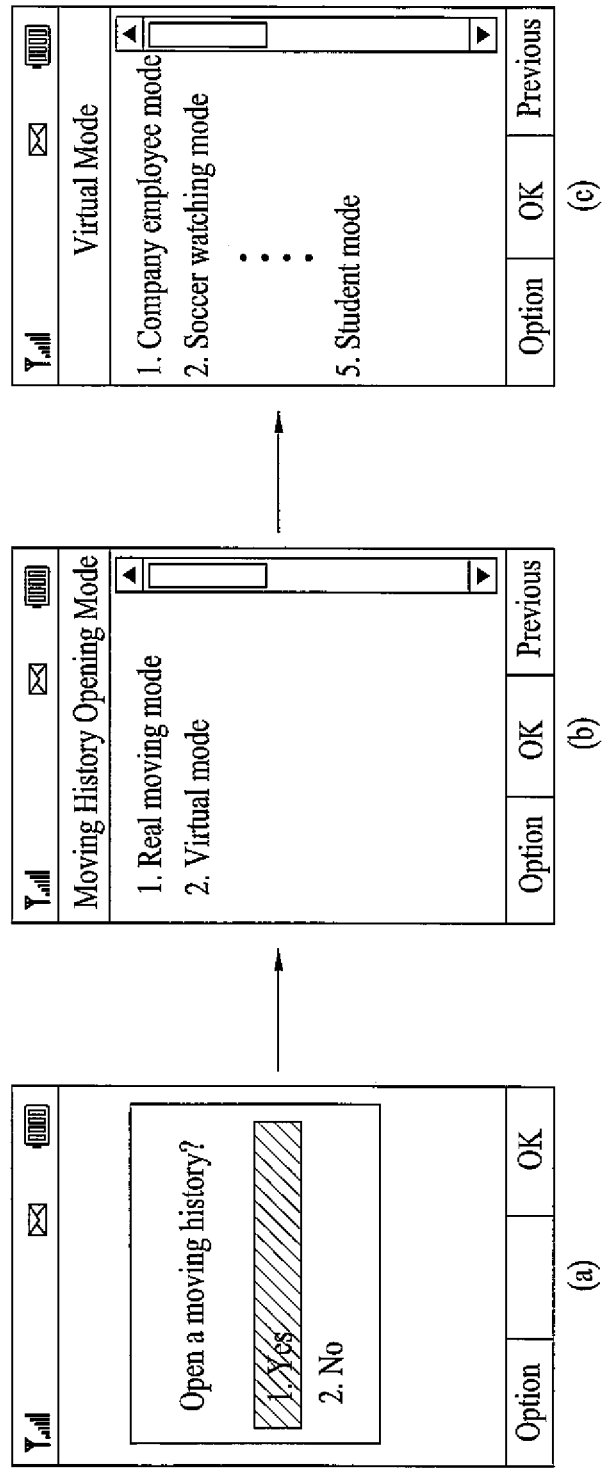

FIG. 67 is a diagram of a screen to explain an example of opening moving information on a mobile terminal 100 according to one embodiment of the present invention. In this case, the moving information can contain a moving history. And, the moving history can contain a moving history.

Referring to FIG. 67, the mobile terminal 100 is able to decide whether to open a moving history to a correspondent terminal or not [(a) of FIG. 67]. If it is decided to open the moving history to the correspondent terminal, a user can select a moving history opening mode [(b) of FIG. 67]. For instance, a user is able to provide a correspondent party with a real moving history ['1. Real moving mode' in (b) of FIG.

67] or a virtual moving history ['2. Virtual moving mode' in (b) of FIG. 67]. If '2. Virtual moving mode' is selected from the screen shown in (b) of FIG. 67, the controller 180 is able to display a virtual moving history (e.g., virtual moving trace) stored in the memory 160 [(c) of FIG. 67]. And, the virtual moving history can be added, amended or deleted.

Figure 68:
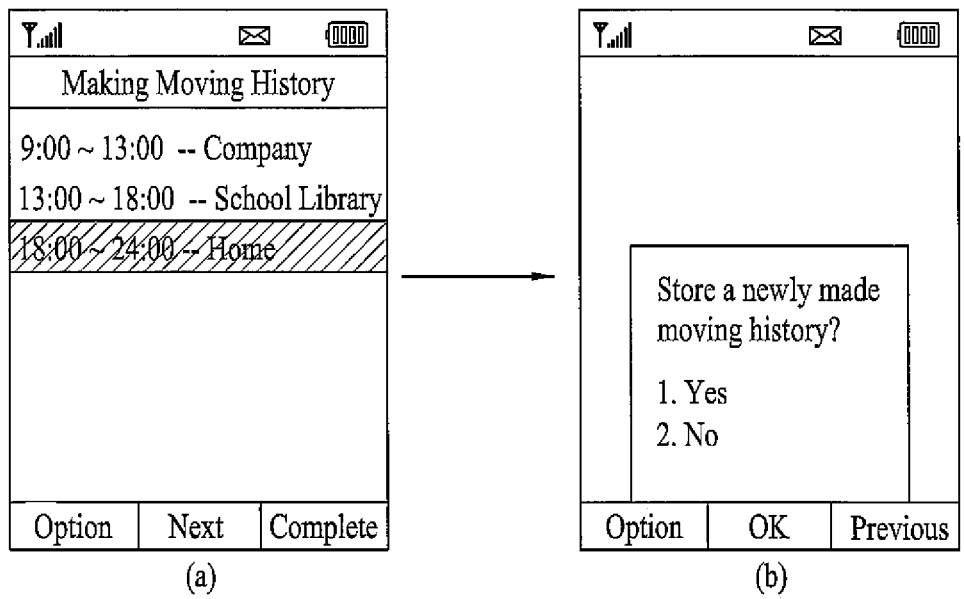

FIG. 68 is a diagram of a screen to explain a method of newly adding a virtual moving history template in a mobile terminal 100 according to one embodiment of the present invention.

Referring to FIG. 68, a user is able to input a place where the user was located on a corresponding time [(a) of FIG. 68]. If the input is completed, the user is able to select 'Complete' item. If the 'Complete' item is selected, it is able to decide whether to store a newly generated virtual moving history template [(b) of FIG. 68]. In this case, a user is able to input a name of the virtual moving history template as well.

Meanwhile, a user of the mobile terminal 100 is able to store its moving history in a diary format.

Figure 69:
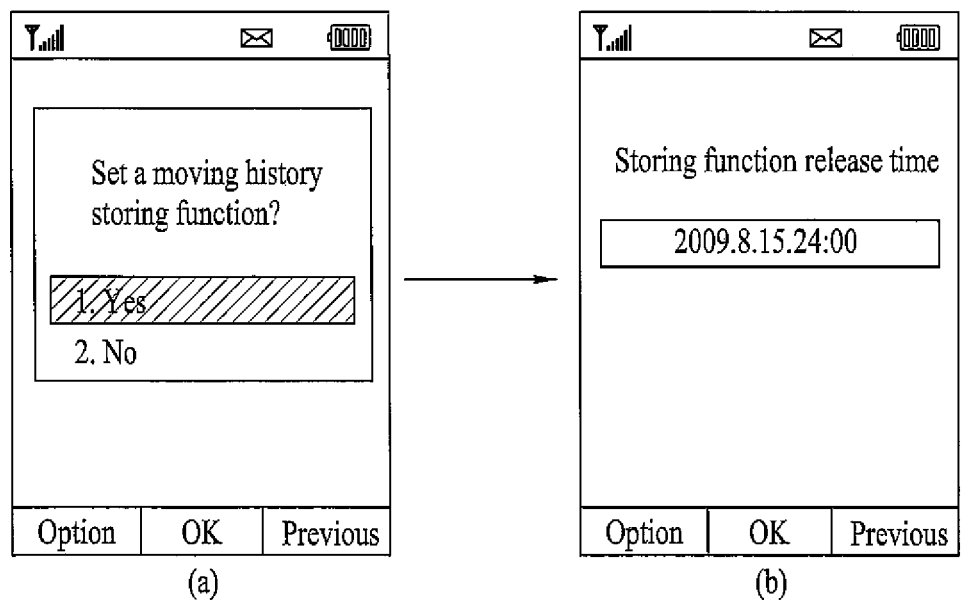

FIG. 69 is a diagram of a screen for a method of storing a moving history of a mobile terminal according to one embodiment of the present invention.

Referring to FIG. 69, a user is able to set a moving history storing function [(a) of FIG. 69]. If the function is set, a moving history of the mobile terminal 100 is automatically stored. In this case, a time for executing the function may be defaulted or ma be set by a user input [(b) of FIG. 69]. For instance, a time for releasing the function can be defaulted to be a midnight of a date of setting the function. And, a time for releasing the moving history storing function can be set to a midnight of a date set for storing a day schedule in a diary format by a user. Moreover, the moving history storing function can be iteratively executed every specific period. So, a single moving history template can be stored every specific period.

Meanwhile, according to one embodiment of the present invention, the mobile terminal 100 is able to confirm information on whether a correspondent terminal accesses a location information providing service via a moving history of the correspondent terminal. In particular, a user of the mobile terminal 100 is able to confirm what time and what point a correspondent terminal accesses the location information providing service or what point and what time the correspondent terminal is disconnected from the location information providing service.

In the following description, a method of displaying location information on a specific person in accessing a location information providing service according to one embodiment of the present invention is explained with reference to the accompanying drawings.

Through the mobile terminal 100 according to one embodiment of the present invention, a user is able to confirm real-time information on a terminal (hereinafter named 'correspondent terminal') mutually registered with a location information providing service as a medium. In this case, the mobile terminal 100 selects a specific terminal from the correspondent terminals and is then able to confirm real-time information on the selected terminal. The mobile terminal 100 selects a specific correspondent terminal and then transmits its real-time information to the selected terminal. In this disclosure, the real-time information means current state information on a terminal. For instance, real-time information on a correspondent terminal can contain a current distance between the mobile terminal 100 and the correspondent terminal, a moving speed of the correspondent terminal, weather information on a place where the correspondent terminal is currently located, etc.

Figure 70:
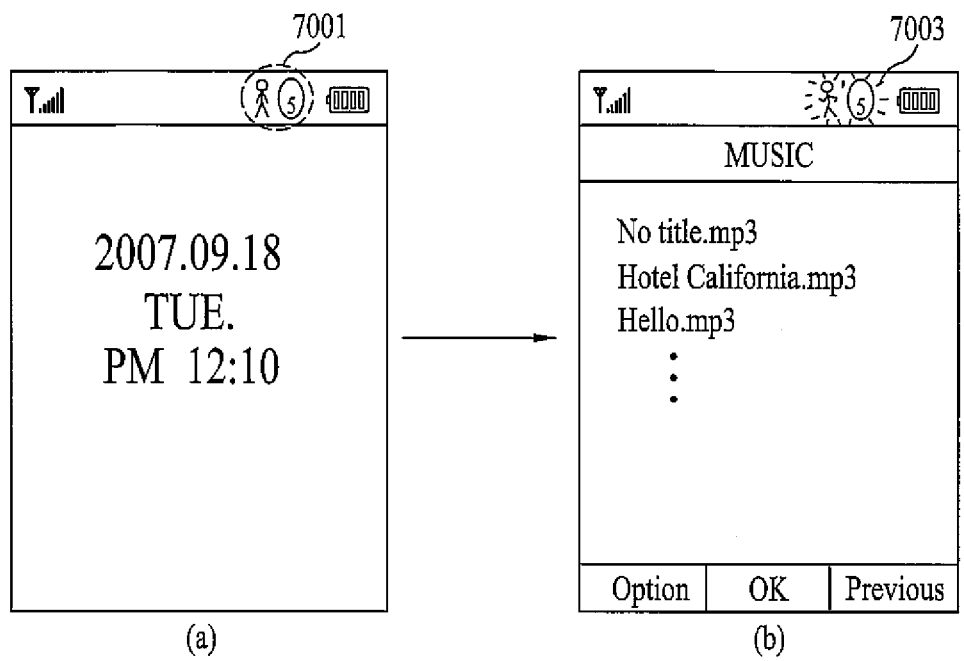
FIGS. 70 to 72 are state diagrams of a screen on which information on a specific terminal is displayed in an indicator area of a mobile terminal according to one embodiment of the present invention.
Figure 71:
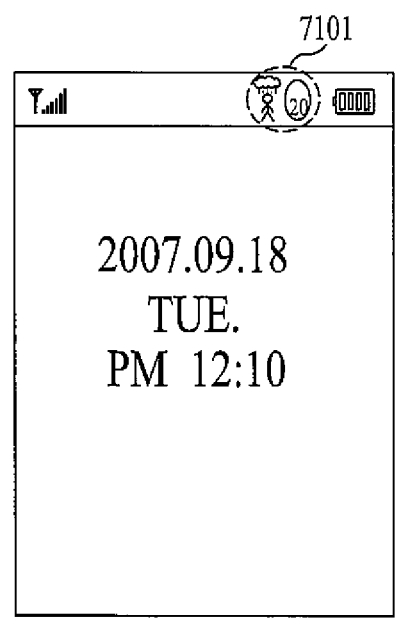
Figure 72:
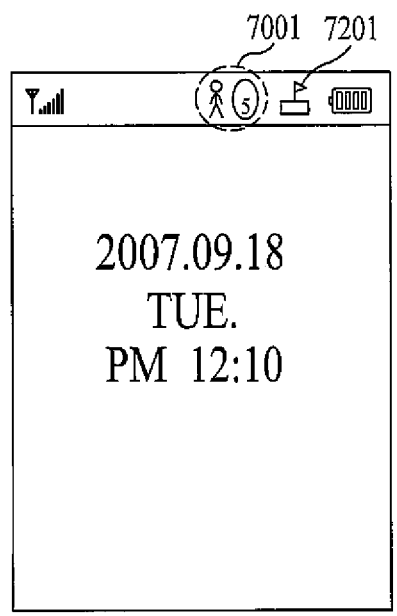

FIGS. 70 to 72 are state diagrams of a screen on which real-time information on a specific terminal is displayed in a mobile terminal according to one embodiment of the present invention.

Referring to (a) of FIG. 70, real-time information on a selected correspondent terminal is displayed on an indicator area of a screen in an idle mode. The real-time information can be represented as an icon 7001. By displaying the icon 7001 on the indicator area, a user is able to frequently confirm the real-time information on the selected correspondent terminal. Through the displayed icon 7001, a user is able to confirm a distance from a selected correspondent party and a moving speed. The distance from the selected correspondent party is within 5 km (represented as numeral) and the moving speed is below 5 km/h, which means that a moving speed is small or the correspondent terminal almost stops.

Referring to (b) of FIG. 70, real-time information on a correspondent terminal is displayed on a screen for which a specific application is being executed. In particular, the mobile terminal 100 is able to display real-time information on a selected correspondent party on the screen for which the specific application is being executed as well as on a standby screen. If the real-time information on the selected terminal is changed, the mobile terminal 100 enables a user to recognize that the real-time information is being changed. To enable a user to recognize that the real-time information is being changed, the mobile terminal 100 represents the real-time information as a light-emitting icon 7003. Through the represented icon 7003, the user is able to confirm a distance from the selected correspondent party and the moving speed. The mobile terminal 100 displays that the distance from the selected correspondent terminal is within 5 km (represented as numeral) and also displays that the selected correspondent terminal approaches the user at a speed of 5~20 km/h.

Meanwhile, the mobile terminal 100 is able to know weather information on an area where a selected terminal is located using GPS information on the selected terminal. This example is shown in FIG. 71.

Referring to FIG. 71, an icon 7101 indicates that a selected terminal is located in a heavy-rain alarm area.

Meanwhile, in case that a selected correspondent terminal moves away into an area previously stored as a GPS coordinate value, a mobile terminal 100 according to one embodiment of the present invention is able to display an icon having been set in storing the coordinate value. This example is shown in FIG. 72. For instance, in case that the correspondent terminal moves away into 'School-A, 100 A Road Suite 100 East, Falls Church, Va. 1000, U.S.A.' previously stored, the mobile terminal 100 is able to display a preset school icon 7201 on an indicator area of a screen.

Seventh Embodiment

In the following description, a method of providing location information in accordance with privacy protecting function setting and intimacy/permission level according to one embodiment of the present invention is explained with reference to the accompanying drawings.

A mobile terminal according to one embodiment of the present invention provides virtual location information or displays received location information conditionally, if a privacy protecting function is set. In this case, the privacy protecting function means a function to provide virtual location information not to reveal a location of the mobile terminal in providing location information or a function to prevent privacy interruption due to a location information reception announcing operation in receiving the location information.

In this case, the location information means coordinate information itself or may mean information based on location generated from coordinate information.

A process for providing location information in accordance with setting of a privacy protecting function is explained in detail with reference to FIGS. 73 to 78B as follows. For clarity and convenience of explanation, it is assumed that a location information providing terminal and a location information receiving terminal are named a first terminal 100A and a second terminal 100B, respectively. It is understood that there can exist at least two location information receiving terminals.

Figure 73:
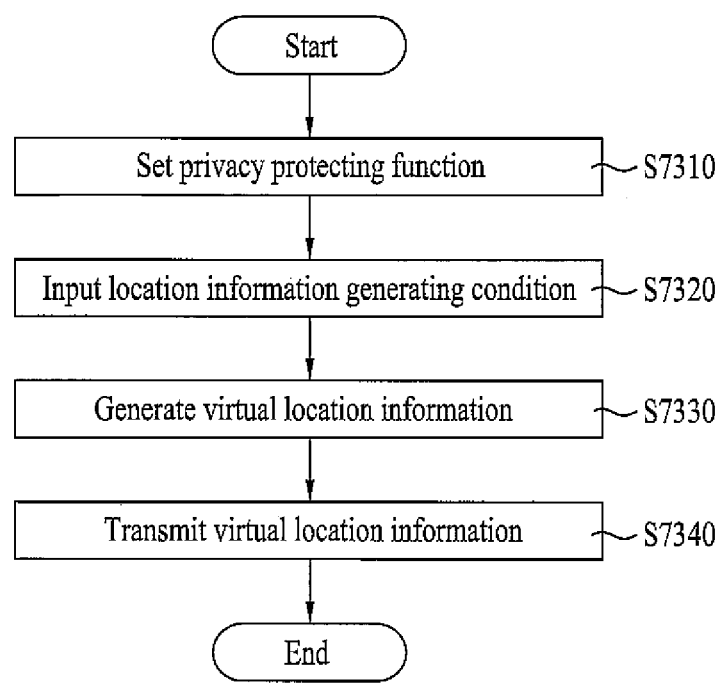
FIG. 73 is a flowchart for a method of providing virtual location information in accordance with setting of a privacy protecting function in a mobile terminal according to one embodiment of the present invention.

FIG. 73 is a flowchart for a method of providing virtual location information in accordance with setting of a privacy protecting function in a mobile terminal according to the seventh embodiment of the present invention.

Referring to FIG. 73, a first terminal 100A sets a privacy protecting function in accordance with a selection made by a user [S7310].

The setting step S7310 can be executed if the privacy protecting function configured as one of menu items relevant to a location information providing service is selected by the user.

In this case, the privacy protecting function can be set for a specific mobile terminal or a specific group. And, the privacy protecting function can be set for mobile terminals located in a specific distance or at a specific place. The specific mobile terminal, specific group, specific distance or specific place can be selected by the user.

If the privacy protecting function is set in the setting step S7310, a location information generating condition is inputted to the first terminal 100A by the user via the user input unit 130 [S7320].

Subsequently, the first terminal 100A generates virtual location information by the controller 180 to correspond to the location information generating condition inputted in the inputting step S7320 [S7330].

The first terminal 100A then transmits the virtual location information generated in the generating step S7330 to a server or a second terminal 100B [S7340].

In case that the virtual location information is transmitted to the server, the server receives the virtual location information from the first terminal 100A and then transmits the received virtual location information to the second terminal 100B. In this case, the first terminal 100A is able to transmit identification information on the second terminal 100B to the server together with the virtual location information.

FIG. 74 is a diagram of a screen on which a process for setting of a privacy protecting function in a mobile terminal according to one embodiment of the present invention is displayed.

Referring to FIG. 74, in case that a privacy protecting function is set by a user [a], a first terminal 100A displays a generation condition list constructed with location information generating conditions on a screen [b]. In this case, the generation condition list can include a distance, a location, a moving speed/direction, a virtual moving history, etc.

FIGS. 75A to 75D are diagrams of a screen for displaying a case that a distance is selected from a condition list in a mobile terminal according to one embodiment of the present invention.

Figure 75A:
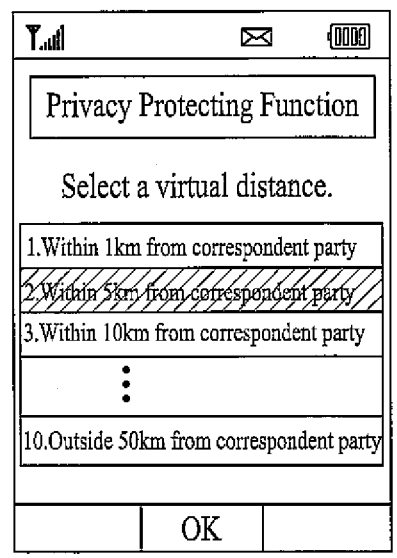

Referring to FIG. 75A, a first terminal 100A displays a virtual distance list. In this case, the virtual distance list includes a virtual distance with reference to a second terminal 100B and may include a virtual distance with reference to a specific place or a specific terminal.

Figure 75B:
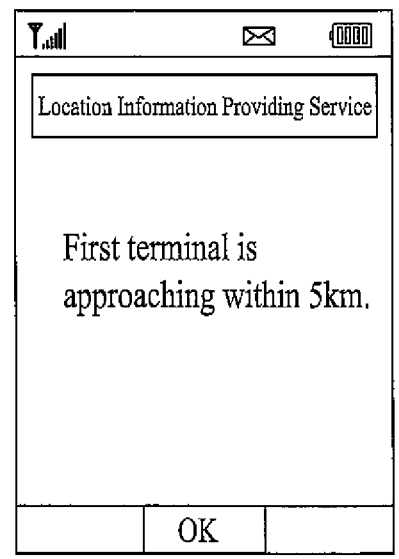

If '5 km from a correspondent party' is selected from the virtual distance list shown in FIG. 75A, the second terminal 100B announces that the first terminal 100A is approaching within 5 km from itself [FIG. 75B].

If 'Over 50 km outside a correspondent party' is selected from the virtual distance list shown in FIG. 75A, the first terminal 100A selects a point over 50 km outside the second terminal 100B [FIG. 75C]. First of all, the first terminal 100A, as shown in (a) of FIG. 75C, displays a list including 'per a country', 'per a state', 'per a city', and 'per a specific place'. If 'per a country' is selected from the list shown in (a) of FIG. 75C, the first terminal 100A displays a country list [(b) of FIG. 75C].

If 'U.S.A.' is selected from the country list shown in (b) of FIG. 75C, the second terminal 100B announces that the first terminal 100A is located at U.S.A. [FIG. 75D].

FIGS. 76A to 76I are diagrams of a screen for displaying a case that a location is selected from a condition list in a mobile terminal according to one embodiment of the present invention.

Figure 76A:
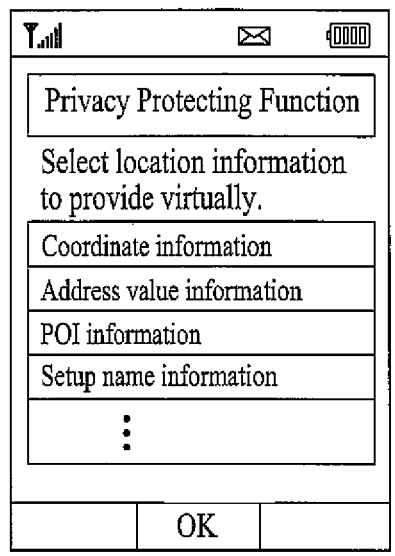
FIGS. 76A to 76I are diagrams of a screen for displaying a case that a location is selected from a condition list in a mobile terminal according to one embodiment of the present invention.

Referring to FIG. 76A, a first terminal 100A displays a list of a location information type to be provided virtually (hereinafter named 'location information type list'). In this case, the locate information type includes coordinate information, administrative (e.g., postal) address information, POI information, setup name information, etc.

Figure 76B:
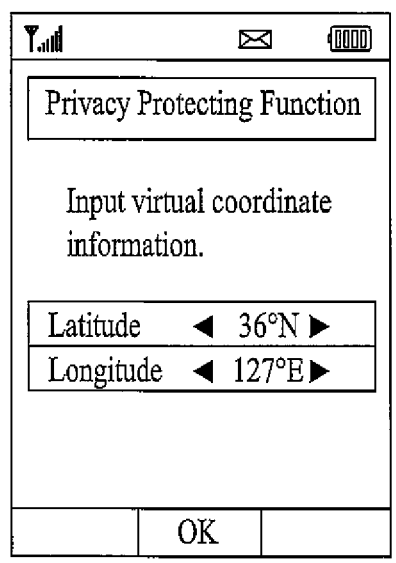
Figure 76C:
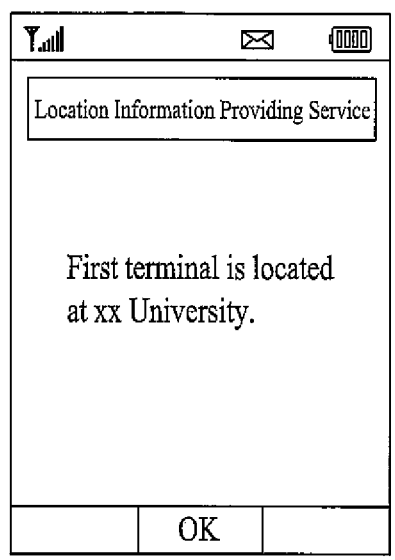

If the coordinate information is selected from the location information type list shown in FIG. 76A, a user inputs a latitude (e.g., 36° N) and a longitude (e.g., 127°) to the first terminal 100A via a coordinate information input window [FIG. 76B]. So, a second terminal 100B announces that the first terminal 100A is located at a location (e.g., xx University) corresponding to the latitude and the longitude inputted in FIG. 76B [FIG. 76C].

Figure 76D:
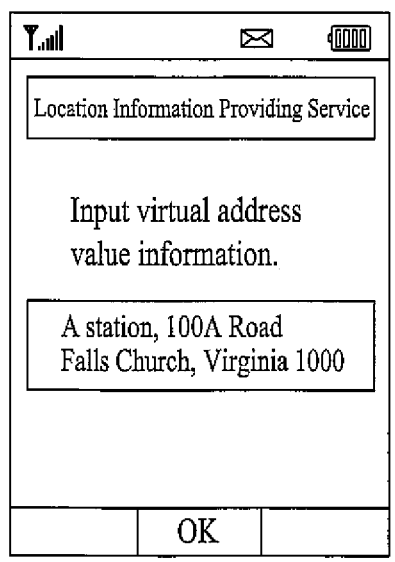
Figure 76E:
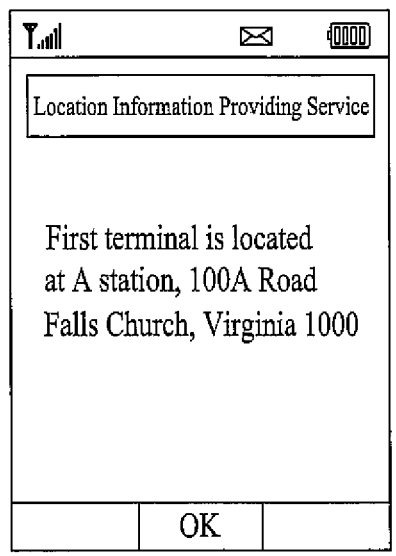
Figure 76F:
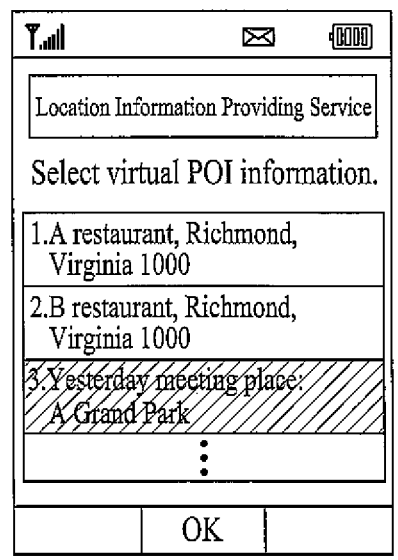
Figure 76G:
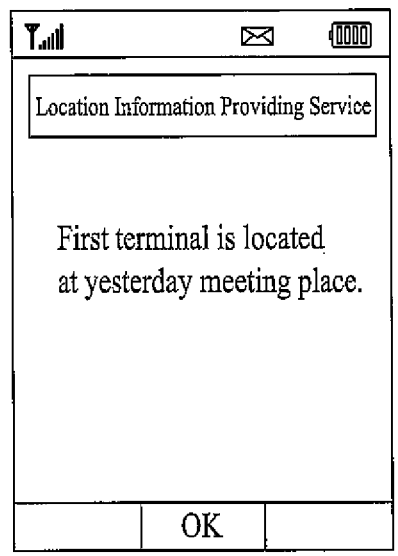
Figure 76H:
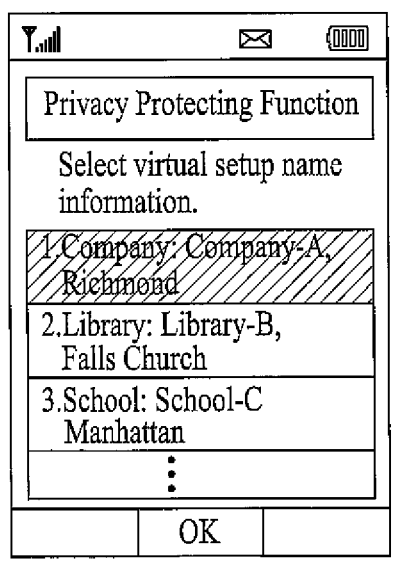
Figure 76I:
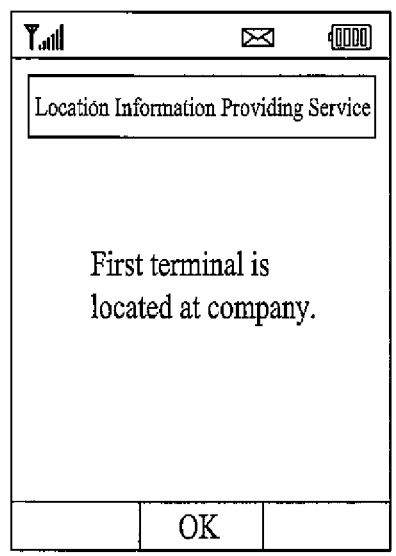

If the administrative (e.g., postal) address information is selected from the location information type list shown in FIG. 76A, a user inputs an address (e.g., A Station, 100 A Road, Falls Church, Va. 1000) via an address input window [FIG. 76D]. So, the second terminal 100B announces that the first terminal 100A is located at the address inputted in FIG. 76D [FIG. 76E].

If the POI information is selected from the location information type list shown in FIG. 76A, the first terminal 100A displays a POI list. A POI (e.g., yesterday meeting place) is selected from the POI list [FIG. 76F]. So, the second terminal 100B announces that the first terminal 100A is located at the POI (e.g., yesterday meeting place) selected in FIG. 76F or at an address (e.g., A Grand Park) corresponding to POI [FIG. 76G].

If the setup name information is selected from the location information type list shown in FIG. 76A, the first terminal 100A displays a setup name list. A setup name (e.g., company) is then selected from the setup name list [FIG. 76H]. So, the second terminal 100B announces that the first terminal 100A is located at the setup name selected in FIG. 76H or at an administrative (e.g., postal) address (e.g., Company-A, Richmond) corresponding to the setup name [FIG. 76I].

Figure 77A:
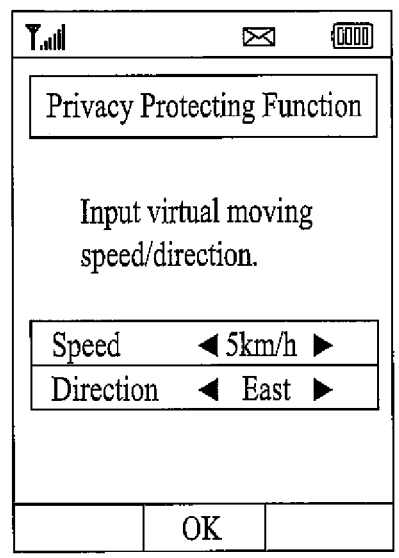
FIGS. 77A and 77B are diagrams of a screen for displaying a case that a moving speed and a direction are selected from a condition list in a mobile terminal according to one embodiment of the present invention.
Figure 77B:
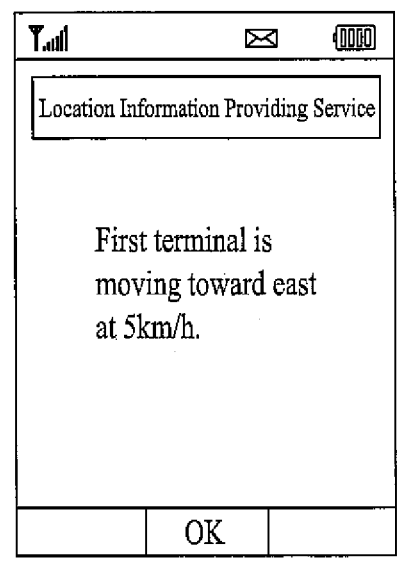

FIGS. 77A and 77B are diagrams of a screen for displaying a case that a moving speed and a direction are selected from a condition list in a mobile terminal according to one embodiment of the present invention.

Referring to FIG. 77A, a user inputs a virtual moving speed (e.g., 5 km/h) and a virtual moving direction (e.g., east) to a first terminal 100A via a moving speed input window and a moving direction input window, respectively.

So, a second terminal 100B announces that the first terminal 100A is moving in accordance with the moving speed and direction inputted in FIG. 77A [FIG. 77B].

Figure 78A:
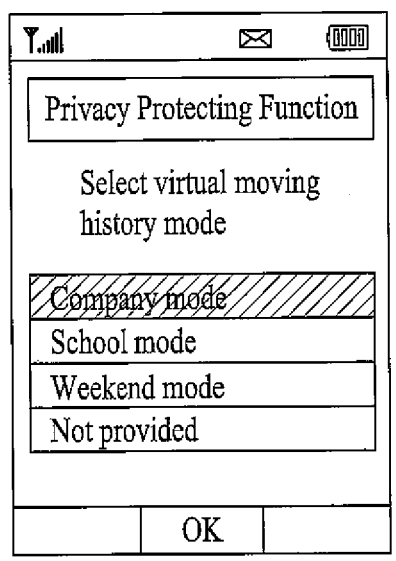
FIGS. 78A and 78B are diagrams of a screen for displaying a case that a virtual moving history is selected from a condition list in a mobile terminal according to one embodiment of the present invention.
Figure 78B:
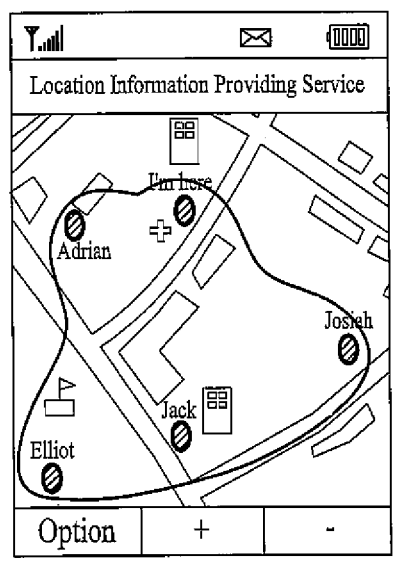

FIGS. 78A and 78B are diagrams of a screen for displaying a case that a virtual moving history is selected from a condition list in a mobile terminal according to one embodiment of the present invention.

Referring to FIG. 78A, a first terminal 100A displays a virtual moving history mode list. A virtual moving history mode (e.g., company mode) is then selected from the virtual moving history mode list. In this case, the virtual moving history mode list may include 'company mode', 'school mode', 'weekend mode' and 'not provided'.

So, a second terminal 100B displays a moving history, which corresponds to the virtual moving history mode selected in FIG. 78A, as a moving history of the first terminal 100A [FIG. 78B].

Eighth Embodiment

A process for announcing location information in accordance with setting of a privacy protecting function in a mobile terminal according to one embodiment of the present invention is explained in detail with reference to FIGS. 79 to 80 as follows.

Figure 79:
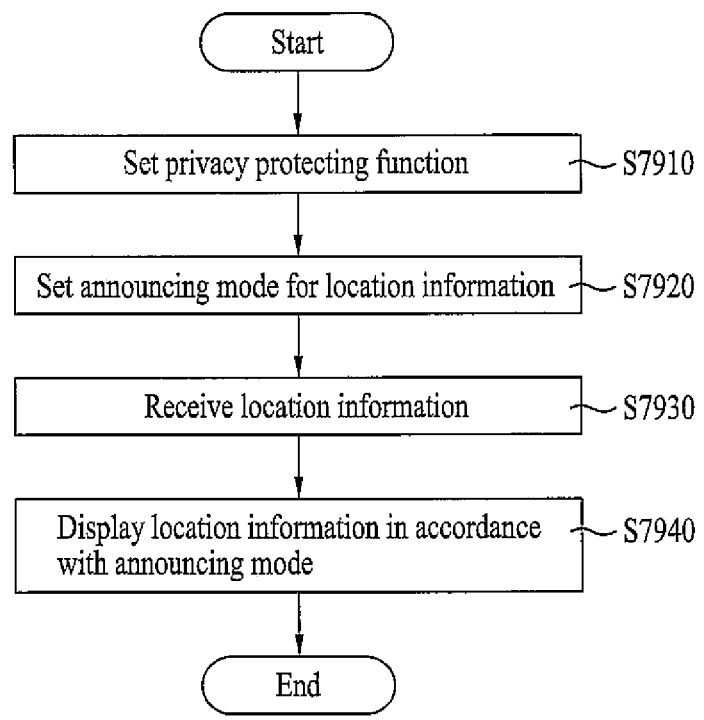
FIG. 79 is a flowchart for a method of announcing location information in accordance with setting of a privacy protecting function in a mobile terminal according to one embodiment of the present invention.

FIG. 79 is a flowchart for a method of announcing location information in accordance with setting of a privacy protecting function in a mobile terminal according to the eighth embodiment of the present invention.

Referring to FIG. 79, a mobile terminal sets a privacy protecting function in accordance with a selection made by a user [S7910]. The mobile terminal then sets a location information announcing mode in accordance with a selection made by the user [S7920].

The mobile terminal receives location information from a server or a different terminal [S7930] and then displays the received location information in accordance with the set location information announcing mode [S7980].

FIG. 80 is a diagram of a screen in accordance with setting of a privacy protecting function and an announcing mode in a mobile terminal according to the eighth embodiment of the present invention.

Referring to FIG. 80, if a setting of a privacy protecting function is selected by a user [a], a mobile terminal displays an announcing mode list including settable location information announcing modes on a screen [b]. In this case, the announcing mode list can include a distance, a place, an announcing method, an incoming-call rejection setting, etc.

If the distance is selected from the announcing mode list, the mobile terminal is able to set location information on a different terminal to be announced from a timing point that the different terminal approaches within a predetermined distance from me (e.g., within a radius of 1 km) [FIG. 81A].

Figure 81B:
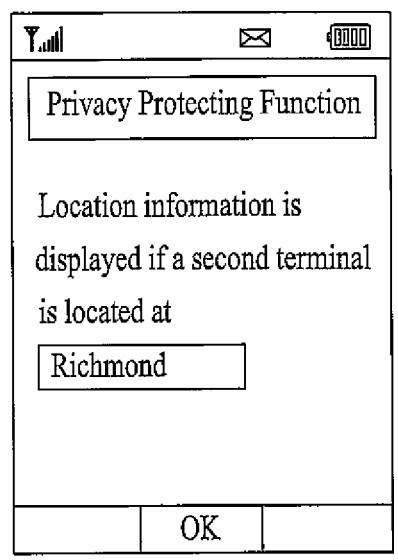

If the place is selected from the announcing mode list, the mobile terminal is able to set location information on a different terminal to be announced if the different terminal is located at a specific place (e.g., Richmond) [FIG. 81B].

Figure 81C:
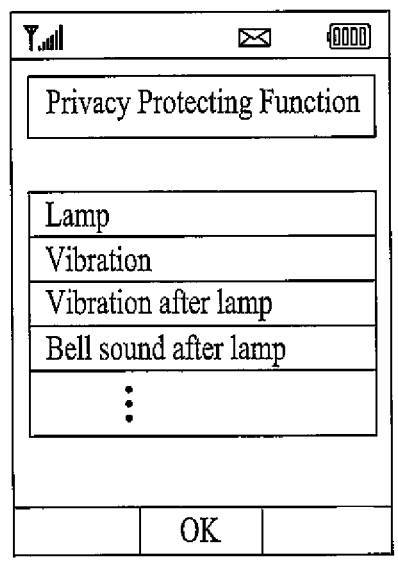

If the announcing method is selected from the announcing mode list, the mobile terminal displays a list constructed with schemes for announcing location information and is then able to set a reception of the location information on a different terminal to be announced by the scheme selected from the list [FIG. 81C].

Figure 81D:
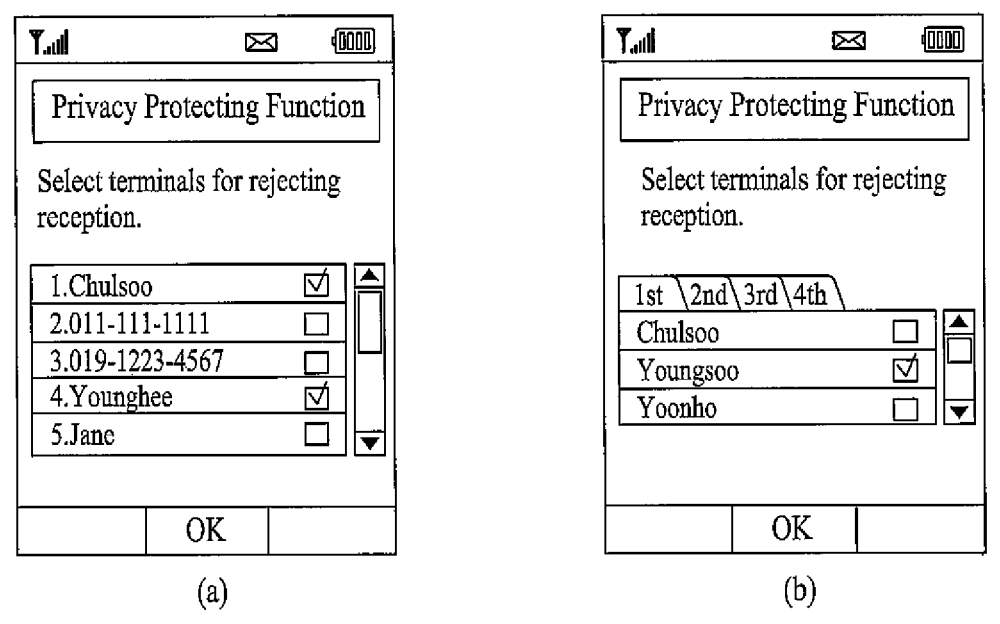

If the incoming-call rejection setting is selected from the announcing mode list, the mobile terminal displays a list of mobile terminals mutually exchanging location information with itself and is then able to set 'location information reception rejection' for the mobile terminal selected from the list [FIG. 81D]. In this case, the mobile terminal can use a whole list or a per-group list as a list display scheme. And, the mobile terminal may not receive location information on the reception-rejection-set mobile terminal or may not display the received location information on the reception-rejection-set mobile terminal.

Ninth Embodiment

A mobile terminal according to the ninth embodiment of the present invention is able to provide location information conditionally in accordance with per-terminal and/or per-group intimacy/permission level.

A method of providing location information in accordance with intimacy/permission level is explained in detail with reference to FIGS. 82 to 83B as follows.

Figure 82:
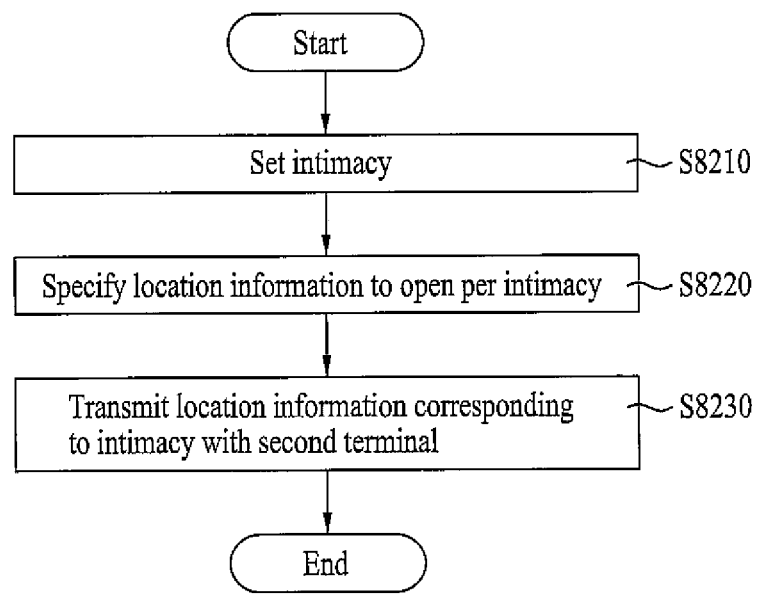
FIG. 82 is a flowchart for a method of providing location information in accordance with intimacy/permission level in a mobile terminal according to one embodiment of the present invention.

FIG. 82 is a flowchart for a method of providing location information in accordance with intimacy/permission level in a mobile terminal according to the ninth embodiment of the present invention.

Referring to FIG. 82, a mobile terminal sets intimacy/permission level per a terminal or per a group [S8210]. In this case, the intimacy/permission level may mean a reference to set an opening extent of its location information to a specific terminal or a specific group.

For instance, the intimacy/permission level can be set to 1 to 10 selectively. Of course, a range and count of the intimacy/permission level is stored as default in a terminal or can be set by a user.

In the setting step S8210, the mobile terminal sets the intimacy/permission level in accordance with a selection made by a user or may set the intimacy/permission level to correspond to a per-terminal or per-group use frequency (e.g., intimacy/permission level is set in proportion to a use frequency).

Figure 83A:
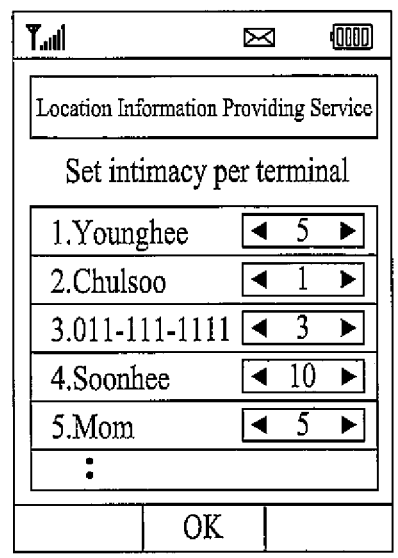
FIG. 83A and FIG. 83B are diagrams of a screen for displaying a process for setting intimacy/permission level per terminal/group in a mobile terminal according to one embodiment of the present invention.
Figure 83B:
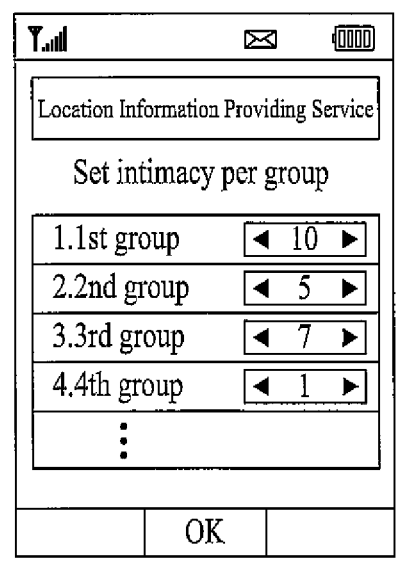

FIG. 83A shows per-terminal intimacy/permission level setting and FIG. 83B shows per-group intimacy/permission level setting.

The mobile terminal specifies location information to be opened to a different terminal per the intimacy/permission level set in the setting step S8210 [S8220]. In this case, the location information to be opened per the intimacy/permission level is specified by a user or may be specified as default by the mobile terminal.

In the specifying step S8220, the mobile terminal is able to specify an update period of location information per the intimacy/permission level. For instance, the update period of the location information is set in inverse proportion to the intimacy/permission level.

For instance, the location information to be opened per the intimacy/permission level can be specified in accordance with Table 3.

TABLE 3

| Intimacy/permission level | Opening Extent | Location Information to Open | Update Period |
|---|---|---|---|
| Intimacy/permission level 1 | Non-open | Identification information | No |
| Intimacy/permission level 2 | Minimum information opening | Identification information & location | 24 hours |
| Intimacy/permission level 3 | Basic information opening | Identification information, location, distance | 10 hours |
| ... | ... | | |

TABLE 3-continued

| Intimacy/permission level | Opening Extent | Location Information to Open | Update Period |
|---|---|---|---|
| Intimacy/permission level 10 | All | All information | Real time |

Of course, the specifying step S8220 can be executed prior to the setting step S8210. In this case, location information to be opened is firstly specified for prescribed intimacy/permission level and intimacy/permission level is then set for a specific terminal or group.

The mobile terminal transmits location information corresponding to the intimacy/permission level set per the terminal or group [S8230].

In the transmitting step S8230, the mobile terminal directly transmits the information to a different terminal (or second terminal 100B) or may transmit the information to a different terminal (or second terminal 100B) via a server.

If the mobile terminal has the intimacy/permission level 10 with a first different terminal and the intimacy/permission level 10 with a second different terminal, each of the first and second different terminals can be provided with location information of intimacy/permission level 10.

The above-described location information providing methods and embodiments can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a wireless communication unit configured to wirelessly communicate with at least one other terminal;
a touch screen display configured to receive a touch input and to display information; and
a controller configured to control the wireless communication unit and the touch screen,
wherein the controller receives location information including locations of mobile terminals of other users through a location information service,
wherein a list of the other users is displayed on the touch screen display, with each user including that user's mobile terminal respective location information,
wherein a touch selection of one of the other users displayed in the list of the other users is received via the touch screen display,
wherein a map with information about the selected one other user and a particular location of the mobile terminal of the selected one other user is displayed on the touch screen display,
wherein a direction menu option allowing the user of the mobile terminal to view directions from the location of the mobile terminal to the particular location is displayed on the touch screen display,
wherein an amount of time it will take to travel from the location of the mobile terminal to the particular location is displayed on the touch screen display,
wherein the displayed list of other users includes names and the location information of the mobile terminals of each other user,
wherein the location information of the mobile terminals of the other users includes a full postal address of the mobile terminals of the other users,
wherein the controller determines an intimacy level of the other users, and selectively displays only a first portion of the full postal address when the determined intimacy level is a first level among a plurality of levels, and displays a second portion of the full postal address when the determined intimacy level is a second level among the plurality of levels,
wherein the second portion of the displayed address includes the first portion and more details of the full postal address,
wherein the second intimacy level indicates a greater intimacy between the mobile terminal and the at least one other terminal than the first intimacy level, and
wherein the intimacy level is set based on an extent of call/message transmission/reception between the mobile terminal and the other mobile terminal or is directly set by the user.

2. The mobile terminal of claim 1, wherein the direction menu option further includes a walking or driving menu option allowing the user to select walking or driving directions from the location of the mobile terminal to the particular location.

3. The mobile terminal of claim 1, wherein the locations of the mobile terminals of the other users correspond to locations where the other users accessed the location information service to share the locations with other users.

4. The mobile terminal of claim 1, wherein the controller is further configured to store a moving history including a plurality of locations of the user of the mobile terminal, and to control the touch screen display to display the moving history including the plurality of locations of the user.

5. The mobile terminal of claim 1, wherein the controller is further configured to distinctly display the location of the mobile terminal and the particular location from other locations on the map.

6. The mobile terminal of claim 1, wherein the controller is further configured to display a map menu option allowing the user of the mobile terminal to select one type of map from a plurality of different types of maps to be displayed.

7. The mobile terminal of claim 1, wherein the displayed map is a street view map including the particular location.

8. The mobile terminal of claim 1, wherein the controller is further configured to display a distance from the location of the mobile terminal to the particular location.

9. The mobile terminal of claim 1, wherein the controller is further configured to display images of the list of other users on the map at the particular locations.

10. The mobile terminal of claim 1, wherein the displayed list of the other users with each user's mobile terminal respective location information includes icon information indicating whether the user is walking, driving or taking public transportation.

11. The mobile terminal of claim 10, wherein the displayed list of the other users with each user's mobile terminal respective location information further includes distance information indicating a distance of the user from the mobile terminal.

12. The mobile terminal of claim 11, wherein the displayed list of the other users with each user's mobile terminal respective location information further includes direction information indicating whether the user is moving towards or away from the mobile terminal.

13. The mobile terminal of claim 1, wherein a selection signal indicating a selection of a form of transportation for moving from the location of the mobile terminal to the particular location is received via the controller,
wherein the directions from the location of the mobile terminal to the particular location are highlighted, and
wherein the map is enlarged/reduced while displaying the directions from the location of the mobile terminal to the particular location.

14. The mobile terminal of claim 13, wherein the controller is further configured to display information about a change in the form of transportation for moving from the location of the mobile terminal to the particular location.

15. A method of controlling a mobile terminal, the method comprising:
allowing, via a wireless communication unit on the mobile terminal, wireless communication with at least one other terminal;
receiving, via a controller of the mobile terminal, location information including locations of mobile terminals of other users through a location information service,
wherein a list of the other users is displayed on a display unit of the mobile terminal, with each user including that user's mobile terminal respective location information,
wherein a touch selection of one of the other users displayed in the list of the other users is received,
wherein a map with information about the selected one other user and a particular location of the mobile terminal of the selected one other user are displayed on the display unit,
wherein a direction menu option is displayed on the display unit allowing the user of the mobile terminal to view directions from the location of the mobile terminal to the particular location,
wherein an amount of time it will take to travel from the location of the mobile terminal to the particular location is displayed on the display unit,
wherein the displayed list of other users includes names and the location information of the mobile terminals of each other user,
wherein the location information of the mobile terminals of the other users includes a full postal address of the mobile terminals of the other users,
wherein an intimacy level of the other users is determined, and only a first portion of the full postal address is displayed when the determined intimacy level is a first level among a plurality of levels, and a second portion of the full postal address is displayed when the determined intimacy level is a second level among the plurality of levels,
wherein the second portion of the displayed address includes the first portion and more details of the full postal address,
wherein the second intimacy level indicates a greater intimacy between the mobile terminal and the at least one other terminal than the first intimacy level, and
wherein the intimacy level is set based on an extent of call/message transmission/reception between the mobile terminal and the other mobile terminal or is directly set by the user.

16. The method of claim 15, wherein the direction menu option further includes a walking or driving menu option allowing the user to select walking or driving directions from the location of the mobile terminal to the particular location.

17. The method of claim 15, wherein the locations of the other users correspond to locations where the other users accessed the location information service to share the locations with other users.

18. The method of claim 15, further comprising:
storing, in a memory associated with the mobile terminal, a moving history including a plurality of locations of the user of the mobile terminal; and
displaying, on the touch screen display, the moving history including the plurality of locations.

19. The method of claim 15, further comprising:
distinctly displaying the location of the mobile terminal and the particular location from other locations on the map.

20. The method of claim 15, further comprising:
displaying a map menu option allowing the user of the mobile terminal to select one type of map from a plurality of different types of maps to be displayed.

21. The method of claim 15, wherein the displayed map is a street view map including the particular location.

22. The method of claim 15, further comprising:
displaying a distance from the location of the mobile terminal to the particular location.

23. The method of claim 15, further comprising:
displaying images of the list of other users on the map at the particular locations.

24. The method of claim 15, wherein the displayed list of the other users with each user's mobile terminal respective location information includes icon information indicating whether the user is walking, driving or taking public transportation.

25. The method of claim 24, wherein the displayed list of the other users with each user's mobile terminal respective location information further includes distance information indicating a distance of the user from the mobile terminal.

26. The method of claim 25, wherein the displayed list of the other users with each user's mobile terminal respective location information further includes direction information indicating whether the user is moving towards or away from the mobile terminal.

27. The method of claim 15, wherein a selection signal indicating a selection of a form of transportation for moving from the location of the mobile terminal to the particular location is received,
wherein the directions from the location of the mobile terminal to the particular location are highlighted, and
wherein the map is enlarged/reduced while displaying the directions from the location of the mobile terminal to the particular location.

28. The method of claim 27, further comprising:
displaying information about a change in the form of transportation for moving from the location of the mobile terminal to the particular location.

\* \* \* \* \*